United States Patent
Pestun et al.

(10) Patent No.: US 10,127,449 B2
(45) Date of Patent: Nov. 13, 2018

(54) CONDITION DETECTION USING IMAGE PROCESSING

(71) Applicant: Accenture Global Services Limited, Dublin (IE)

(72) Inventors: Vadim Pestun, Moscow (RU); Olga Eremina, Moscow (RU); Ekaterina Tyulyaeva, Moscow (RU)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 15/313,787

(22) PCT Filed: Aug. 6, 2015

(86) PCT No.: PCT/IB2015/001843
§ 371 (c)(1),
(2) Date: Nov. 23, 2016

(87) PCT Pub. No.: WO2017/021751
PCT Pub. Date: Feb. 9, 2017

(65) Prior Publication Data
US 2018/0260626 A1 Sep. 13, 2018

(51) Int. Cl.
*G06K 9/00* (2006.01)
*G08G 5/00* (2006.01)
*G05D 1/00* (2006.01)

(52) U.S. Cl.
CPC ....... *G06K 9/00657* (2013.01); *G05D 1/0094* (2013.01); *G06K 9/00637* (2013.01);
(Continued)

(58) Field of Classification Search
CPC .......... G06K 9/00657; G06K 9/00637; G05D 1/0094; G08G 5/0069; G08G 5/0086; G08G 5/0052
(Continued)

(56) References Cited

U.S. PATENT DOCUMENTS

2015/0134384 A1 5/2015 Heinonen et al.

FOREIGN PATENT DOCUMENTS

CN 103473734 A 12/2013
WO 2014147041 A1 9/2014

OTHER PUBLICATIONS

Li, Zhengrong, et al. "Toward automated power line corridor monitoring using advanced aircraft control and multisource feature fusion." Journal of Field Robotics 29.1 (2012): 4-24. (Year: 2012).*

(Continued)

*Primary Examiner* — Amandeep Saini
(74) *Attorney, Agent, or Firm* — Mannava & Kang, P.C.

(57) ABSTRACT

Condition detection using image processing may include receiving a mask generated from images and telemetry data captured by a vehicle, an altitude map, and alignment data for the mask. The images may be related to movement of the vehicle along a vehicle path and non-infrastructure entities along an infrastructure entity position of a corresponding infrastructure entity, and the telemetry data may include movement log information related to the movement of the vehicle along the vehicle path. Condition detection using image processing may further include using the mask related to the vehicle path and the non-infrastructure entities, and an infrastructure rule to detect a risk related to the infrastructure entity by analyzing the mask related to the vehicle path and the non-infrastructure entities, and the infrastructure rule, and determining whether the infrastructure rule is violated.

20 Claims, 36 Drawing Sheets

(52) U.S. Cl.
CPC ......... *G08G 5/0069* (2013.01); *G08G 5/0086* (2013.01); *G08G 5/0052* (2013.01)

(58) Field of Classification Search
USPC .......................................................... 382/190
See application file for complete search history.

(56) References Cited

OTHER PUBLICATIONS

Li, Zhengrong, et al. #2 "Advances in vegetation management for power line corridor monitoring using aerial remote sensing techniques." Applied Robotics for the Power Industry (CARPI), 2010 1st International Conference on. Ieee, 2010. (Year: 2010).*

International Search Report and Written Opinion dated Apr. 13, 2016, PCT Patent Application No. PCT/IB2015/001843, filed Aug. 6, 2015, European Patent Office, 13 pages.

Zhengrong Li et al, : "Toward automated power line corridor monitoring using advanced aircraft control and multisource feature fusion", Journal of Field Robotics, vol. 29, No. 1, Dec. 18, 2011, pp. 4-24.

Saari Heikki et al: "Unmanned Aerial Vehicle (UAV) operated spectral camera system for forest and agriculture applications", Remote Sensing for Agriculture, Ecosystems, and Hydrology XIII, SPIE, vol. 8174, No. 1, Oct. 6, 2011, pp. 1-15.

International Search Report and Written Opinion dated Apr. 13, 2016, PCT Patent Application No. PCT/IB2015/001843 filed Aug. 6, 2015, European Patent Office.

Zhengrong Li, et al., "Advances in Vegetation Management for Power Line Corridor Monitoring Using Aerial Remote Sensing Techniques", 2010 1st International Conference on Applied Robotics for the Power Industry, Montréal, Canada, Oct. 5-7, 2010, pp. 1-6.

Zhengrong Li, "Aerial Image Analysis Using Spiking Neural Networks with Application to Power Line Corridor Monitoring", May 2011, pp. 81.

Zhengrong Li, et l., "Towards automatic power line detection for a UAV surveillance system using pulse coupled neural filter and an improved Hough transform", Machine Vision and Applications, Sep. 1, 2009, pp. 677-686.

Brian Kurinsky, "Power Line Corridor Vegetation Management: Clearing a Path to Reliable Electric Service Using Lidar", Maryville, Missouri, October, 2013, pp. 117.

Mills, S.J., et al., "Evaluation of Aerial Remote Sensing Techniques for Vegetation Management in Power-Line Corridors", IEEE Transactions on Geoscience and Remote Sensing, vol. 48, No. 9, Sep. 2010, pp. 3379-3390.

\* cited by examiner

3200

```
RECEIVE AT LEAST ONE MASK GENERATED FROM IMAGES AND
TELEMETRY DATA CAPTURED BY A VEHICLE, AN ALTITUDE
MAP, AND ALIGNMENT DATA FOR THE AT LEAST ONE MASK
3202
```

```
USE THE AT LEAST ONE MASK RELATED TO THE VEHICLE PATH AND
THE AT LEAST ONE OF THE PLURALITY OF NON-INFRASTRUCTURE
ENTITIES ALONG THE INFRASTRUCTURE ENTITY POSITION OF THE
CORRESPONDING INFRASTRUCTURE ENTITY, AND AN
INFRASTRUCTURE RULE TO DETECT A RISK RELATED TO THE
INFRASTRUCTURE ENTITY
3204
```

FIG. 32

CONDITION DETECTION USING IMAGE PROCESSING

CLAIM FOR PRIORITY

The present application is a national stage filing under 35 U.S.C. § 371 of PCT application number PCT/IB2015/001843, having an international filing date of Aug. 6, 2015, the disclosure of which is hereby incorporated by reference in its entirety.

BACKGROUND

Unmanned vehicles (UVs), which may include unmanned aerial vehicles (UAVs), drones, unmanned land vehicles, even collaborative robots, etc., are typically operated without a human aboard. Manned vehicles such as aircraft, helicopters, manned land vehicles, etc., are typically operated with a human aboard. Vehicles, including unmanned and manned vehicles, with imaging systems, such as video cameras, infrared (IR) sensors, etc., may be used to capture images of an area of interest. The images may be analyzed with respect to entities that are disposed in the area of interest.

BRIEF DESCRIPTION OF DRAWINGS

Features of the present disclosure are illustrated by way of examples shown in the following figures. In the following figures, like numerals indicate like elements, in which:

FIG. 32 illustrates a method for condition detection using image processing, according to an example of the present disclosure;

DETAILED DESCRIPTION

Figure 1:
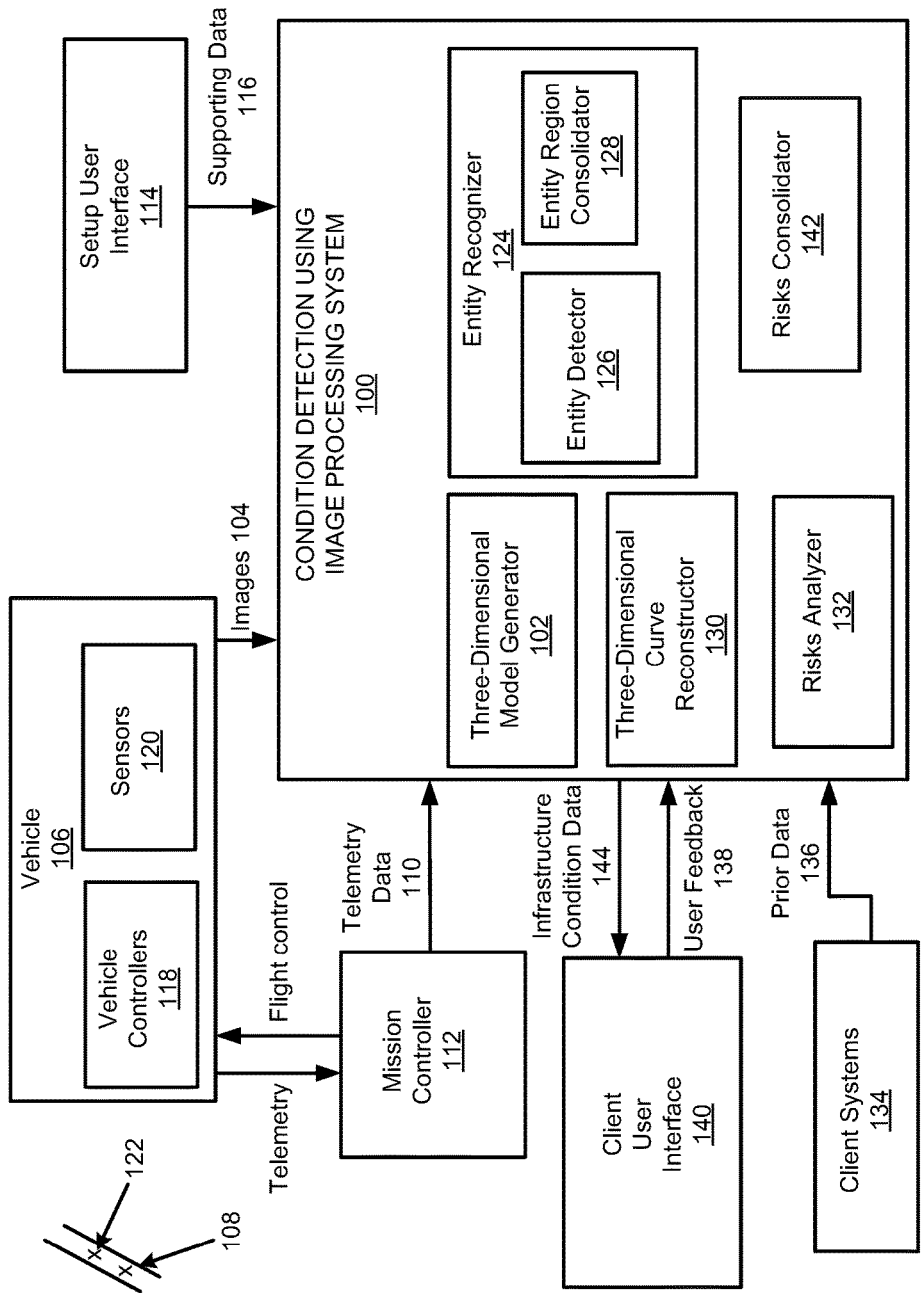
FIG. 1 illustrates a detailed architecture of a condition detection using image processing system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

With respect to vehicles generally (e.g., UAVs, drones, unmanned land vehicles, manned aircraft, manned helicopters, manned land vehicles, satellites, etc.), such vehicles may be used to perform condition detection using image processing as described herein. With improvements in sensors, data analytics capabilities, and programmatic mechanization components, vehicles may be used in a variety of ambiguous environments, and for performance of a variety of ambiguous tasks. For example, vehicles may be used for package delivery, agriculture, emergency services, pipeline inspection, electric tower inspection, etc. However, integration of vehicles with respect to monitoring of entities, and condition analysis of such entities using computer vision and predictive analytics is limited. Generally, an entity may be described as anything that is being monitored (e.g., pipelines, power grids, railways, motorways, vegetation, trees, objects, etc.). In this regard, entities may be described as infrastructure entities—entities, whose general condition checking may be a primary goal of the monitoring (e.g., towers for power grids, power lines for power grids, etc.), or as non-infrastructure entities—entities, which potentially may damage the infrastructure entities, or prevent infrastructure entities from performing their tasks (e.g., vegetation, anthropogenic objects, etc.).

According to an example, with respect to monitoring and condition analysis of entities such as power systems, power systems are responsible for generating, transmitting, and distributing energy to different regions, homes, industries, etc. For such power systems, problems may occur during the transmission of energy. For the transmission of energy, a pathway may be determined where electric lines that are used for the transmission of energy are located, with the pathway being denoted a right-of-way (RoW). This RoW may be used by utility companies to access transmission towers, for example, for the routine maintenance of towers and electric lines, for emergency access, to keep the electric lines region clear of vegetation and objects that may interfere with performance of electric lines, and/or to identify when there are any obstructions that may cause problems in the electric lines region. The term electric lines region may be used to describe the region that includes the electric lines and towers. The RoW may be described as the region that involves the electric lines region and the area near the electric lines that should be clear from vegetation, buildings, or other objects. The RoW may need to be clear to avoid risks, such as, flash-over or electrical arching, which may generate wide-spread power outages and fires, to ensure a reliable and secure power supply, and safety of the public and private areas that are around the RoW.

With respect to the example of the monitoring and condition analysis of entities such as power systems, existing transmission maintenance procedures may include periodic inspections that are performed by helicopter or on foot by maintenance personnel, which may be carried out in order to determine whether there exist any needed repairs. This type of strategy entails both significant maintenance costs and expenditure of time. Furthermore, if a sporadic incident occurs, such as a fallen tree as a consequence of a thunderstorm, it is challenging and time-consuming to precisely locate where the accident has taken place.

The challenges described herein with respect to the example of the monitoring and condition analysis of entities such as power systems may also be applicable to other industries and areas, such as the monitoring and condition analysis of buildings, railways, motorways, etc.

In order to address the aforementioned challenges with respect to the monitoring and condition analysis of entities, a condition detection using image processing system and a method for condition detection using image processing are disclosed herein. For the system and method disclosed herein, technologies, such as vehicles, computer vision, machine learning, pattern recognition, and advanced analytics may be integrated to assess whether there exist any types of risks with respect to the monitored entities. For example, with respect to power systems, the system and method disclosed herein may provide for the monitoring and condition analysis related to the RoW and/or the electric lines region. The system and method disclosed herein may provide relevant information in relation to detected risks, such as their global positioning system (GPS) position, size, etc. Based on the use of vehicles, the monitoring and condition analysis provided by the system and method disclosed herein may be performed in a time and cost effective manner, and in areas that may not be readily accessible by people.

With respect to the monitoring and condition analysis of entities, the monitoring and condition analysis may be used for other applications related to the operation of entities. For example, the results of the monitoring and condition analysis may be used to define and/or optimally use a budget associated with tasks related to monitoring and condition analysis. For example, with respect to power systems, the monitoring and condition analysis may be used to determine which areas of a RoW are most dangerous, and clear such areas. With respect to other applications, a flight in the vicinity of an entity that is being monitored may be used to verify whether a previous task related to the entity has been correctly performed. The results of historical data analysis related to the monitoring and condition analysis may also be used to optimize planned maintenance of entities, and to prolong the lifecycle of such entities.

According to examples, the system and method disclosed herein may generally utilize a mission controller to assign and manage a mission upon receipt of a work order. The mission controller may maintain knowledge of a fleet of vehicles, sensors, and crew, as well as information regarding work order status, and mission status. The mission controller may translate the work order into a mission request by assigning vehicles, sensors, and crew to the mission request, identifying a movement plan of the vehicle, and an objective for the mission. Once the mission is launched, the system disclosed herein may analyze communication data (e.g., telemetry data) received during the mission, and may generate alarms and/or other information based on the detection of risks.

With respect to the mission controller that tracks information regarding vehicles, sensors, and vehicle operation crew, vehicles may be tracked, for example, by type, availability, and ability to mount particular sensors. The mission controller may also track sensors by type, availability, and ability to be mounted on particular vehicles. Vehicle operation crews may also be tracked by availability and ability to operate particular vehicles.

The mission controller may receive a work order related to a vehicle mission. According to an example, work orders may be received from various enterprises and cover a variety of applications of vehicles. The mission controller may translate the work order into a mission request. A mission request may identify, for example, an operation for a vehicle, a type of a vehicle to complete the operation, at least one type of sensor to be mounted on the vehicle, a vehicle operation crew, a movement plan, and/or an objective for the mission. For example, a mission request may indicate that a fixed wing vehicle or quadcopter (i.e., types of vehicles) may be equipped with a photo camera to take images of a RoW for a plurality of towers. After launching the mission, the vehicle may follow the movement plan autonomously (e.g., for an unmanned vehicle), or with varying degrees of remote operator guidance from the mission controller. Sensors mounted onto the vehicle may transmit data in real-time to the mission controller, which may transmit relevant data to the system disclosed herein for further analysis. The transmission of the relevant data may occur either after vehicle landing (e.g., for aerial vehicles), mission completion, or in real-time based on bandwidth availability.

Although examples of the system and method disclosed herein have been described with respect to power systems (e.g., monitoring and condition analysis of towers and electric lines), the system and method disclosed herein may be used in a variety of environments and for a variety of purposes. For example, the system and method disclosed herein may be used to monitor a pipeline in the oil and gas industry. In the oil and gas industry, the system and method disclosed herein may be used in other scenarios, including other types of exploration (e.g., site survey, site drilling, etc.), development (e.g., pad placement, facility rendering, capital project, surveillance, etc.), production (e.g., flare/vent inspection, oil sheen detection, disaster prevention, etc.), manufacturing (flute/chimney inspection, tank/gas inspection, gas detection, etc.), and transportation (e.g., RoW monitoring, theft monitoring, etc.).

The system and method disclosed herein may be used in package delivery (e.g., food, medicine, equipment, etc.), aerial surveillance (e.g., police/fire department, cartography, photography, film, journalism, real estate, etc.), exploration (e.g., mine detection, site survey, etc.), research (e.g., wildlife, atmosphere, ocean, etc.), remote sensing (e.g., telecommunications, weather, maritime, construction, etc.), disaster relief (e.g., survivors, explore contaminated areas, etc.), environment (e.g., forest fires, threats, etc.), and agriculture (e.g., spray pesticides, crop growth, disease, irrigation level, wild animals, etc.).

The system and method disclosed herein may be used for scheduling of predictive maintenance to provide asset inspection, diagnostics, repair, and maintenance work. Further, the system and method disclosed herein may be used, for example, to identify and schedule environmental (e.g., terrain, vegetation, etc.) management. The system and method disclosed herein may also provide for enhancements in safety and environmental protection related to the various activities described herein. For example, with respect to power systems, the system and method disclosed herein may be used to protect assets from sabotage, and terrorist actions in an efficient and economical manner.

The system and method disclosed herein may be used to analyze data from a vehicle to determine tasks that may be both electronically and mechanically automated in a workflow, and to identify insights that may be obtained from the data. These insights may be used to drive operational decisions, such as shortening lead time to problem detection, or predictive maintenance with towers and electric lines, for example, in the power systems industry. The system and method disclosed herein may provide for the reduction of exposure to hazardous environments, increase efficiency and effectiveness with respect to condition detection using image processing, and optimize operations.

Generally, the system and method disclosed herein may be envisioned in a broad range of applications where automatic or automated assets based data analysis may be used to reduce cost, increase reliability, and increase productivity.

The system and method disclosed herein may account for aspects related to the state of vehicle technology, regulation and compliance, readiness, and safety and privacy. With respect to vehicle technology, the system and method disclosed herein may provide the hardware and software platform and setup for condition detection using image processing.

The condition detection using image processing system and the method for condition detection using image processing disclosed herein provide a technical solution to technical problems related, for example, to condition detection using image processing. The system and method disclosed herein provide the technical solution of a three-dimensional model generator to receive images captured by a vehicle during movement of the vehicle along a vehicle path, and telemetry data related to movement of the vehicle along the vehicle path. The telemetry data may include movement log information related to the movement of the vehicle along the vehicle path, and georeference data related to a plurality of ground control points (GCPs) along the vehicle path. The three-dimensional model generator may generate, based on the telemetry data and the images, a three-dimensional (or a two and a half-dimensional) model of entities along the vehicle path. The two and a half-dimensional model may represent a reduced three-dimensional (x, y, z) model representation, and include information related to a surface, for which one "depth" or "height" (z) value is present for every point in an (x, y) plane. For the three-dimensional model, every point (x, y) may include more than one "depth" or "height" (z), so that overhanging elements are possible. The three-dimensional model generator may use the three-dimensional (or the two and a half-dimensional) model to generate an orthophotomap that includes the vehicle path, altitude maps (i.e., images altitude maps, where each image altitude map represents an altitude map for an image), and images GPS alignment data (i.e., data for transformation of local image coordinates and corresponding altitude to GPS coordinates, and for transformation of GPS coordinates and altitude to the local image coordinates), related to the initial images. The alignment data may be generally referred to as world coordinates alignment data, for other types of coordinate systems. An entity recognizer may receive the images, corresponding altitude maps for the images, the images GPS alignment data, the telemetry data, and approximate infrastructure GPS location data. The entity recognizer may detect, based on the images, the corresponding altitude maps for the images, the images GPS alignment data, the telemetry data, and the approximate infrastructure GPS location data, entities in the images, and locations of the entities based on the images GPS alignment data. Further, the entity recognizer may consolidate locations of the same infrastructure entities detected in different images to determine consolidated locations for the same infrastructure entities. A consolidated location may represent a single determined location for an entity that may include different locations in different images. The entity recognizer may define regions (i.e., areas for subsequent analysis), based on the consolidated locations for the same infrastructure entities, and determine regions entities masks, regions altitude maps, and regions GPS alignment data (data for transformation of local region coordinates to GPS coordinates and back). A mask may be described as a matrix with the same dimensions as the initial image, where each element of the matrix indicates the classification results for a corresponding pixel. For example, for a given image including infrastructure and non-infrastructure entities, an infrastructure entity mask may include elements with value "1" for the pixels displaying parts of detected infrastructure entities, and value "0" for the background (for all the rest) pixels, and a non-infrastructure entity mask may include elements with value "1" for the pixels displaying parts of detected non-infrastructure entities, and value "0" for the background (for all the rest) pixels. Further, a ground mask of the same image may include elements with value "1" for the ground pixels, and value "0" for the non-ground pixels. A three-dimensional curve reconstructor may receive image masks (generated by the entity recognizer) of predetermined types of the entities (e.g., power lines) to reconstruct the three-dimensional (or two and a half-dimensional) model of the predetermined types of the entities, and generate a parameterized representation of the predetermined types of the entities. A risks analyzer may use the regions entities masks, the regions altitude maps, the regions GPS alignment data, the parameterized representation of the predetermined types of the entities, and infrastructure rules to detect risks related to the entities, by determining whether the infrastructure rules are violated. The risks analyzer may generate risk masks (i.e., masks for risky entities areas in regions' coordinate systems). A risks consolidator may use the risk masks and the regions GPS alignment data to merge risks of a same type located in different regions in a same GPS location, for example, to produce lists of risks and parameters for different types of risks.

Condition Detection Using Image Processing System

FIG. 1 illustrates a detailed architecture of a condition detection using image processing system 100, according to an example of the present disclosure. The condition detection using image processing system 100 may include a three-dimensional model generator 102, executed by at least one hardware processor (e.g., at least one hardware processor 3402 of FIG. 34), to receive images 104 captured during movement of a vehicle 106 along a vehicle path 108, and telemetry data 110 related to movement of the vehicle 106 along the vehicle path 108 to be monitored. The telemetry data 110 may include, for example, movement log information (e.g., flight log information for an aerial vehicle, and generally, movement log information for ground based or other types of vehicles) related to movement of the vehicle 106 along the vehicle path 108, and georeference data related to a plurality of GCPs along the vehicle path 108. The telemetry data 110 may be received from a mission controller 112, and/or from a setup user interface 114 in case of the georeference data. The mission controller 112 may be a component of the system 100, or disposed and/or operated separately as illustrated in FIG. 1.

A user of the system 100 may utilize a setup interface display of the setup user interface 114 to define georeference points to be utilized in the three-dimensional model generator 102 for higher georeference accuracy, and tune parameters to be used by various components of the system 100. Data related to the definition of the georeference points and tuning of the parameters to be used by various components of the system 100 may be received by the system 100 as supporting data 116.

The vehicle 106 may include various controls, such as autopilot control (e.g., if the vehicle 106 is an aerial vehicle), remote receiver control, etc., generally designated as vehicle controllers 118, and various sensors, such as flight sensors, temperature sensors, etc., and various imaging systems, such as photo or video cameras, IR sensors, etc., generally designated as vehicle sensors 120.

The three-dimensional model generator 102 may receive the images 104 captured by the vehicle 106, and generate, based on the telemetry data 110, the images 104, and additional information (e.g., configuration information related to the vehicle 106, etc.), a georeferenced three-dimensional (or a two and a half-dimensional) model that includes the vehicle path 108 and entities 122 along the vehicle path 108. The georeferenced three-dimensional model may be used to further generate an orthophotomap that includes the vehicle path 108, altitude maps (i.e., images altitude maps which represent altitude maps for a plurality of the images 104), and images GPS alignment data (i.e., data for transformation of local image coordinates and corresponding altitude to GPS coordinates, and for transformation of GPS coordinates and altitude to the local image coordinates), related to the initial images 104.

An entity recognizer 124 may receive the images 104, corresponding altitude maps for the images 104, the images GPS alignment data, the telemetry data 110, and approximate infrastructure GPS location data (i.e., predetermined information related to the vehicle path 108 and infrastructure entities along the vehicle path 108). The approximate infrastructure GPS location data may be generally included in the supporting data 116 that may include, for example, entity maps, training data, configuration information, etc.

An entity detector 126 of the entity recognizer 124 may detect, based on the images 104, the corresponding altitude maps for the images 104, the images GPS alignment data, the telemetry data 110, and the approximate infrastructure GPS location data, entities in the images 104, and locations (e.g., GPS locations) of the entities based on the images GPS alignment data. Further, the entity detector 126 may generate, based on the images 104, the corresponding altitude maps for the images 104, the images GPS alignment data, the telemetry data 110, and the approximate infrastructure GPS location data, image masks related to the images 104.

An entity region consolidator 128 of the entity recognizer 124 may consolidate locations of the same infrastructure entities detected in different images 104 to determine consolidated locations for the same infrastructure entities. The entity region consolidator 128 may define regions (i.e., areas for subsequent analysis), based on the consolidated locations for the same infrastructure entities, and determine regions entities masks, regions altitude maps, and regions GPS alignment data (data for transformation of local region coordinates to GPS coordinates and back).

A three-dimensional curve reconstructor 130 may receive the image masks of predetermined types of the entities (e.g., power lines) and images GPS alignment data to reconstruct the three-dimensional (or two and a half-dimensional) model of the predetermined types of the entities, and generate a parameterized representation of the predetermined types of the entities. The parameterized representation may be derived from the image coordinates of the same lines or curves that were identified in different images, based on an intersection of surfaces determined by the locations of detected entities in the image planes and respective cameras of the vehicle 106, or by a camera of the vehicle 106 that is used at different locations along the vehicle path 108 to capture the images 104.

A risks analyzer 132 may use the regions entities masks, the regions altitude maps, the regions GPS alignment data, the parameterized representation of the predetermined types of the entities, and infrastructure rules (e.g., from client systems 134) to detect risks related to the entities, by determining whether the infrastructure rules are violated. The risks analyzer may generate risk masks (i.e., masks for risky entities areas in regions' coordinate systems). The risks analyzer 132 may utilize prior data 136 related to previous monitoring and condition analysis missions performed by the system 100 and/or by other systems from the client systems 134, and feedback 138 for example, from users of the system 100 and/or other systems to determine whether the detected risk related to the entity was correctly identified. The feedback 138 may be received from a client user interface 140.

A risks consolidator 142 may use the risk masks and the regions GPS alignment data to merge risks of a same type located in different regions in a same GPS location, for example, to produce lists of risks and parameters for different types of risks.

A user of the system 100 may utilize a client user interface display of the client user interface 140 to view and interact with the lists of risks of different types, the orthophotomap, and cartographical representations of entities 122, which may be derived from risk masks during data transfer to the client user interface. The lists of risks of different types, the orthophotomap, and the cartographical representations of entities may be forwarded to the client user interface 140 as part of infrastructure condition data 144.

Condition Detection Using Image Processing System 100—General Execution

Figure 2:
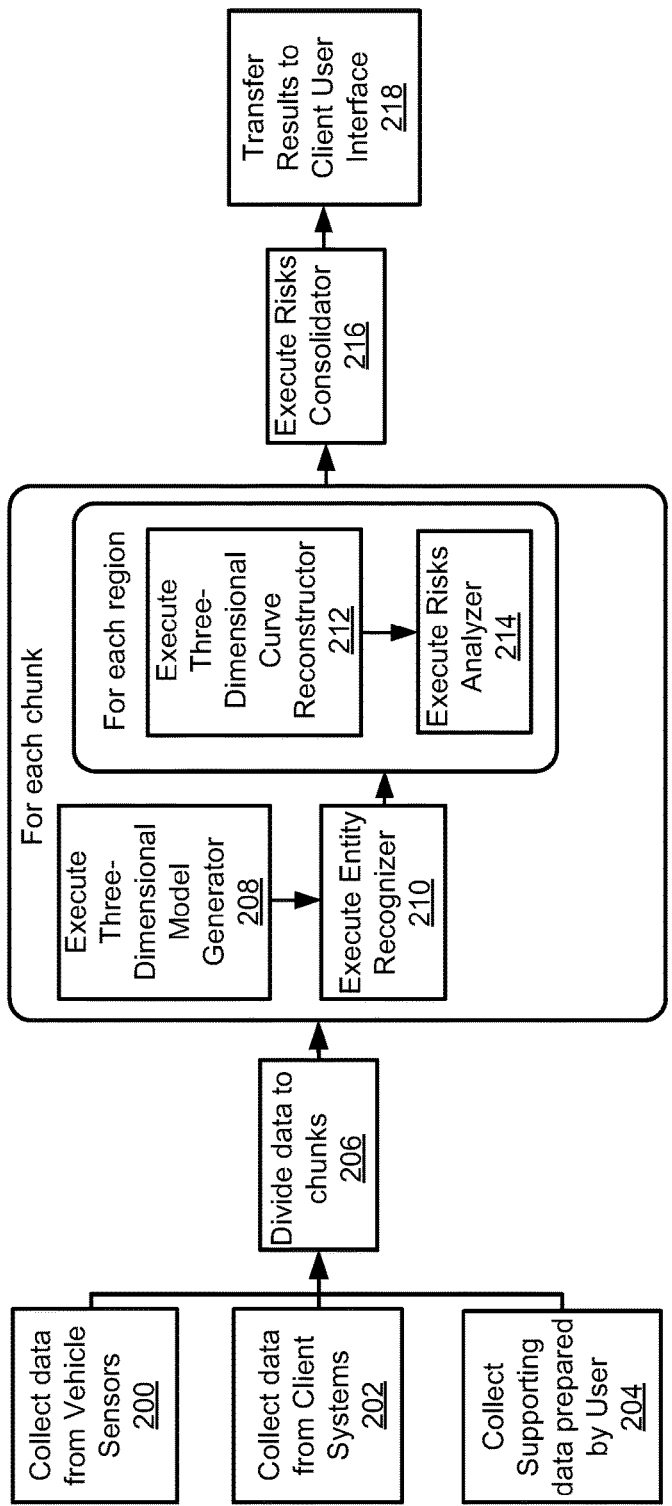
FIG. 2 illustrates general execution for the condition detection using image processing system of FIG. 1, according to an example of the present disclosure.

FIG. 2 illustrates general execution for the system 100, according to an example of the present disclosure.

Referring to FIG. 2, with respect to general execution for the system 100, at block 200, data may be collected from vehicle sensors 120, at block 202, data may be collected from the client systems 134, and at block 204, supporting data (e.g., the supporting data 116, including GPS referencing data) prepared by a user may be collected.

The data from blocks 200, 202, and 204 may be divided into chunks at block 206 based on an infrastructure entities map, such that each chunk starts and ends with an infrastructure entity that is marked as a chunk division point.

For each of the chunks, at block 208, the three-dimensional model generator 102 may be executed to generate the georeferenced three-dimensional model. The georeferenced three-dimensional model may include the three-dimensional details of the vehicle path 108 and the entities 122 needed to generate the orthophotomap. The three-dimensional model generator 102 may process each of the chunks to align the images 104, and generate the three-dimensional model based on the alignment, export the orthophotomap, and export images altitude maps and images GPS alignment data.

At block 210, the entity recognizer 124 (i.e., entity detector 126 of the entity recognizer 124) may be executed to detect an entity in the images 104, and locations (e.g., GPS locations) of the entity based on the images GPS alignment data. Further, at block 210, the entity recognizer 124 may be executed to generate image masks related to the images 104. Further, at block 210, the entity region consolidator 128 of the entity recognizer 124 may consolidate locations of the same infrastructure entities detected in different images 104 to determine consolidated locations for the same infrastructure entities, establish regions around the consolidated locations, and build consolidated region entities masks.

At block 212, for each region, the three-dimensional curve reconstructor 130 may be executed to generate a parameterized representation of the predetermined types of the entities.

At block 214, the risks analyzer 132 may use the regions entities masks, the regions altitude maps, the regions GPS alignment data, the parameterized representation of the predetermined types of the entities, and infrastructure rules (e.g., from the client systems 134) to detect risks related to the entities, by determining whether the infrastructure rules are violated.

At block 216, the risks consolidator 142 may use the risk masks and the regions GPS alignment data from all of the chunks to merge risks of a same type located in different regions in a same GPS location, for example, to produce lists of risks and parameters for different types of risks, for example, for the entire area being monitored.

At block 218, the results of the analysis from blocks 200-216 may be transferred to the client user interface 140.

Figure 3:
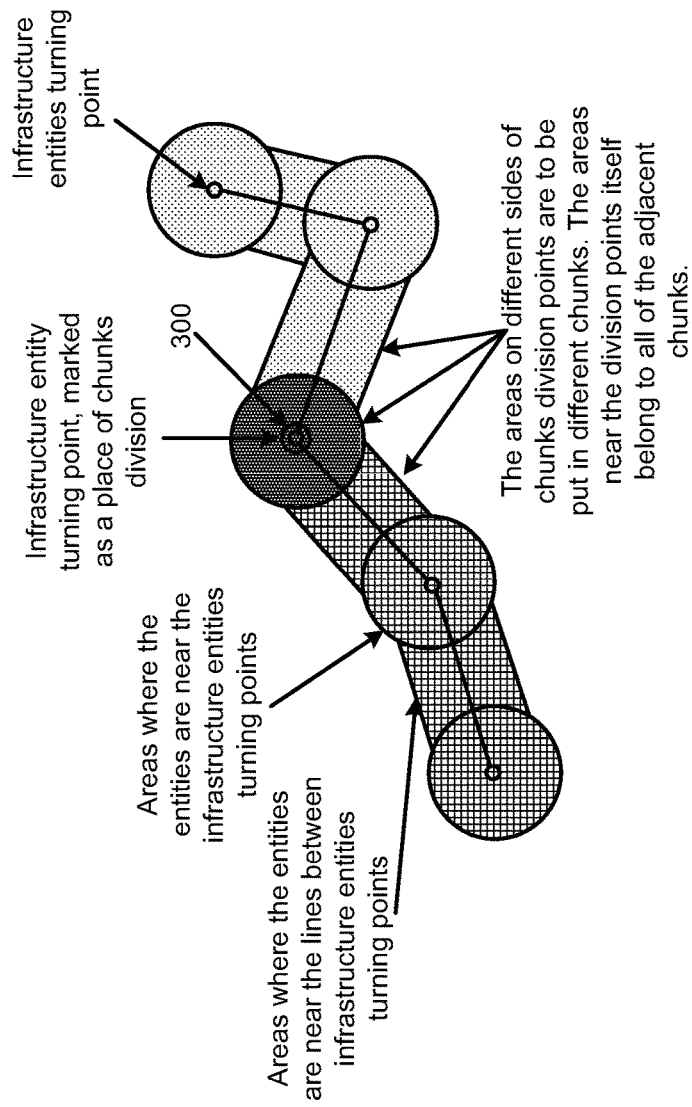
FIG. 3 illustrates division of data into chunks for the condition detection using image processing system of FIG. 1, according to an example of the present disclosure.

Condition Detection Using Image Processing System 100—Division of Data into Chunks FIG. 3 illustrates division of data into chunks for the system 100, according to an example of the present disclosure.

In the example of monitoring of linear infrastructure entities, the system 100 may divide the flight area of the vehicle 106 into chunks based on approximate infrastructure GPS location data and telemetry data, such as a vehicle flight log. For the example of the aerial monitoring of towers, the approximate infrastructure GPS location data (e.g., see FIG. 7) may be represented as a list of towers, with a tower identification (ID), a type of tower design (e.g., high-voltage for single-circuit three-phase transmission line, etc.), estimated GPS (e.g., longitude and latitude) of a tower, estimated altitude of a tower for each tower, and a list of power line segments, with the IDs of two end towers and a number of power lines for each segment. The vehicle flight log may include, for example, the name, timestamp, GPS (e.g., longitude and latitude), altitude, and camera orientation (e.g., pitch, roll, and heading) for each image of the images 104 acquired by the vehicle 106. The vehicle flight log may be generated by a flight operator associated with the mission controller 112 of the vehicle 106. The system 100 may locate the images that were captured near the infrastructure turning points (e.g., tower for monitoring of power lines, or oil pipe turning point for monitoring of oil pipelines), or near the line segments between a pair of consecutive infrastructure turning points, based on the vehicle flight log. The system 100 may divide the images into the chunks so that each chunk starts and ends with a single infrastructure entity point that is marked as a chunk division point or is an end point of a monitored infrastructure. For example, referring to FIG. 3, a chunk division point is illustrated as an infrastructure entity turning point at 300. The images 104 that are far from infrastructure turning points or from the line segments between a pair of consecutive infrastructure turning points may be discarded, because they do not include the monitored area.

Three-Dimensional Model Generator 102—Data Flow

Figure 4:
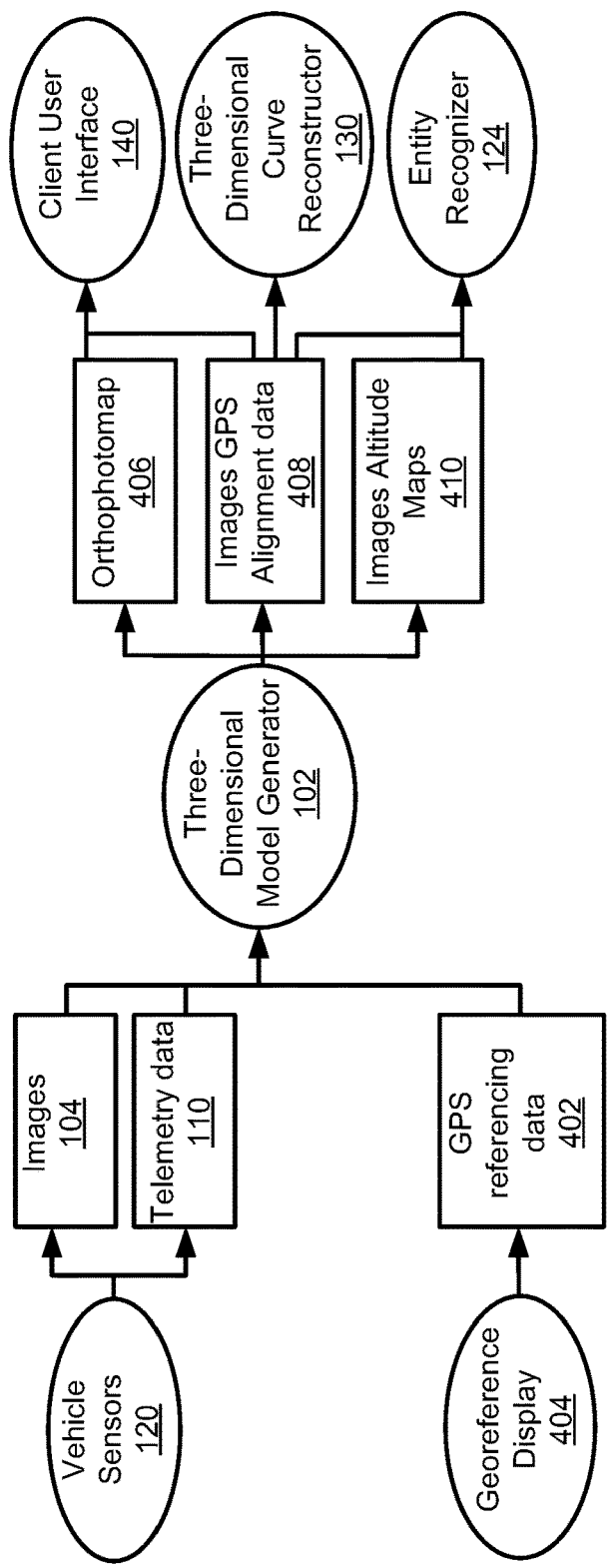
FIG. 4 illustrates data flow for a three-dimensional model generator of the condition detection using image processing system of FIG. 1, according to an example of the present disclosure.

FIG. 4 illustrates data flow for the three-dimensional model generator 102 of the system 100, according to an example of the present disclosure.

Referring to FIGS. 1 and 4, as described herein, the three-dimensional model generator 102 may receive inputs that include the images 104, the telemetry data 110 including a flight log, and GPS referencing data 402. The GPS referencing data 402 may be received from a georeference display 404. The images 104 may represent the original images taken by the vehicle 106, for example, during flight of the vehicle 106. The format of the images 104 may include, for example, .jpg, and other such formats. The GPS referencing data 402 may include, for example, GPS, altitude, image name, and pixel position for each GCP. The format of the GPS referencing data 402 may include, for example, .xml, and other such formats.

Various aspects of the three-dimensional model generator 102 may be implemented, for example, by using automation of three-dimensional reconstruction tools and/or by using C++, etc. The three-dimensional model generator 102 may generate a georeferenced three-dimensional model for each chunk of the chunks, where the georeferenced three-dimensional model may be used to obtain the needed output data for other components of the system 100 as described herein.

With respect to the chunks, each of the chunks may be processed to load the images 104 and the telemetry data 110, align the images 104 and add GCPs. Each of the chunks may also be processed to generate a three-dimensional model, based on images and their alignment. For each chunk, the orthophotomap and altitude maps may be generated using the three-dimensional model.

Referring to FIGS. 1 and 4, the outputs of the three-dimensional model generator 102, as described herein, may include an orthophotomap 406, images GPS alignment data 408, and images altitude maps 410.

The orthophotomap 406 may be generated for each chunk of the chunks, for visual representation of the relevant area and entities, risks, etc.

The images GPS alignment data 408 may be generated for each of the images 104, and include the needed matrices and coefficients for GPS-to-pixel and pixel-to-GPS projections. According to examples, the images GPS alignment data 408 may include the values $f_x$ (horizontal camera focal length in pixels), $f_y$ (vertical camera focal length in pixels), $c_x$ (adjusted horizontal center point in pixels), $c_y$ (adjusted vertical center point in pixels) and radial distortion correction coefficients $k_1$, $k_2$, $k_3$, $k_4$, $k_5$, $k_6$, $p_1$, and $p_2$, which may be used after other coordinates' transformations in the following equations:

$$x' = x\frac{1+k_1 r^2 + k_2 r^4 + k_3 r^6}{1+k_4 r^2 + k_5 r^4 + k_6 r^6} + 2p_1 xy + p_2(r^2 + 2x^2) \quad \text{Equation (1)}$$

$$y' = x\frac{1+k_1 r^2 + k_2 r^4 + k_3 r^6}{1+k_4 r^2 + k_5 r^4 + k_6 r^6} + p_1(r^2 + 2y^2) + 2p_2 xy$$

$$r^2 = x^2 + y^2$$

For Equation (1), x' and y' may represent corrected coordinates, and x and y may represent initial coordinates in the image coordinate system. The images GPS alignment data 408 may include values for camera coordinates to local three-dimensional model coordinates conversion represented, for example, in a 4×4 rotate-translate-scale matrix C. The images GPS alignment data 408 may include values for local three-dimensional model coordinates to geocentric Earth-Centered, Earth-Fixed (ECEF) coordinates conversion represented, for example, in another 4×4 rotate-translate-scale matrix L. The images GPS alignment data 408 may include $X_0$, $Y_0$, and $Z_0$ values for the ECEF position of the camera of the vehicle 106 when an image is taken by the camera of the vehicle 106. The values may be used in the subsequent analysis to transform GPS coordinates (latitude, longitude) and altitude (altitude above the sea level in the World Geodetic System 1984 (WGS84)) to pixel coordinates (x, y), and to transform pixel coordinates (x, y) and altitude for the corresponding pixel to GPS coordinates (latitude, longitude). In order to obtain pixel coordinates for GPS position (latitude, longitude) and altitude, the following set of equations may be used:

$$b = a*(1-f) \quad \text{Equation (2)}$$

For Equation (2), a may represent a semi-major axis of GPS Earth reference ellipsoid, 1/f may represent a reciprocal of flattening of GPS Earth reference ellipsoid, and b may represent a semi-minor axis of GPS Earth reference ellipsoid.

$$e^2 = 1 - \frac{b^2}{a^2} \quad \text{Equation (3)}$$

For Equation (3), $e^2$ may represent a first eccentricity squared of GPS Earth reference ellipsoid.

$$N(\phi) = \frac{a}{\sqrt{1 - e^2 * (\sin\phi)^2}} \quad \text{Equation (4)}$$

For Equation (4), $\phi$ may represent an initial latitude coordinate in radians, and $N(\phi)$ may represent a distance from the surface to the Z-axis along the ellipsoid normal. The Earth-Fixed (ECEF) coordinates $X_e$, $Y_e$, and $Z_e$ of the point being transformed may then be determined as follows:

$$X_e = (N(\phi)+h)*\cos\phi*\cos\lambda. \quad \text{Equation (5)}$$

$$Y_e = (N(\phi)+h)*\cos\phi*\sin\lambda \quad \text{Equation (6)}$$

$$Z_e = (N(\phi)*(1-e^2)+h)*\sin\phi \quad \text{Equation (7)}$$

For Equations (5)-(7), $\lambda$ may represent a longitude in radians, and h may represent altitude. The coordinates $X_c$, $Y_c$, and $Z_c$ in the coordinate system, fixed with respect to the camera, may then be derived as follows:

$$\begin{bmatrix} X_c \\ Y_c \\ Z_c \\ 1 \end{bmatrix} = C^{-1} * L^{-1} * \begin{bmatrix} X_e \\ Y_e \\ Z_e \\ 1 \end{bmatrix} \quad \text{Equation (8)}$$

The image coordinates x and y may then be derived as follows:

$$x = f_x * X_c/Z_c + c_x \quad \text{Equation (9)}$$

$$y = f_y * Y_c/Z_c + c_y \quad \text{Equation (10)}$$

In order to obtain the GPS coordinates from the pixel coordinates x, y and corresponding altitude h for the pixel, the intersection point between the Earth reference ellipsoid with added altitude value and the line connecting camera position and pixel in image plane may be determined. To determine this line's equation in ECEF coordinate system, a random point on a line, different from the camera position, may be determined. The random point coordinates $X_c$, $Y_c$ and $Z_c$ in the coordinate system, fixed with respect to the camera, may then be derived as follows:

$$\begin{bmatrix} X_c \\ Y_c \\ Z_c \end{bmatrix} = \begin{bmatrix} (x - c_x)/f_x \\ (y - c_y)/f_y \\ 1 \end{bmatrix} \quad \text{Equation (11)}$$

To further obtain the ECEF coordinates $X_e$, $Y_e$, and $Z_e$, the following equation may be applied:

$$\begin{bmatrix} X_e \\ Y_e \\ Z_e \\ 1 \end{bmatrix} = L * C * \begin{bmatrix} X_c \\ Y_c \\ Z_c \\ 1 \end{bmatrix} \quad \text{Equation (12)}$$

The line direction vector $V=[V_x, V_y, V_z]$ may then be retrieved as the subtraction of random point coordinates vector $[X_e, Y_e, Z_e]$ and camera point coordinates vector $[X_0, Y_0, Z_0]$. The Earth reference ellipsoid with added altitude may then include the semi-major axis $a_h$ and semi-minor axis $b_h$ determined as follows:

$a_h = a + h$      Equation (13)

$b_h = b + h$      Equation (14)

In order to determine the intersection between the line, on which the pixel contents are lying in the real-world ECEF coordinates, and Earth reference ellipsoid with added altitude, the following equation may be solved:

$a_t * t^2 + b_t * t + c_t = 0$      Equation (15)

For Equation (15), t may represent a desired direction vector coefficient for determining the intersection point, and the equation coefficients $a_t$, $b_t$ and $c_t$ may be determined as follows:

$a_t = b_h^2 * (V_x^2 + V_y^2) + a_h^2 * V_z^2$      Equation (16)

$b_t = 2 * (b_h^2 * (V_x * X_0 + V_y * Y_0) a_h^2 * V_z * Z_0)$      Equation (17)

$c_t = b_h^2 * (X_0^2 + Y_0^2) + a_h^2 * Z_0^2 - a_h^2 * b_h^2$      Equation (18)

To determine the value of t, the discriminant D of the Equation (15) may be determined as follows:

$D = b_h^2 - 4 * a_h * c_h$      Equation (19)

In the case that the discriminant is greater than or equal to zero, two possible values for t ($t_1$, $t_2$) may be determined as follows:

$$t_1, t_2 = \frac{-b_h \pm \sqrt{D}}{2 * a_h} \quad \text{Equation (20)}$$

The resulting intersection coordinate is the one nearest to the camera, and thus the lesser absolute value for t ($t_1$ if $|t_1| <= |t_2|$, and $t_2$ if $|t_2| < |t_1|$) may be considered to determine the desired point $[X_1, Y_1, Z_1]$ in the ECEF coordinate system as follows:

$$\begin{bmatrix} X_1 \\ Y_1 \\ Z_1 \end{bmatrix} = \begin{bmatrix} X_0 \\ Y_0 \\ Z_0 \end{bmatrix} + t * \begin{bmatrix} V_x \\ V_y \\ V_z \end{bmatrix} \quad \text{Equation (21)}$$

The resulting latitude $\phi$ and longitude $\lambda$ may be determined as follows:

$$\lambda = \tan^{-1}\left(\frac{Y_1}{X_1}\right) \quad \text{Equation (22)}$$

$$\phi = \tan^{-1} \frac{z_1 + ep^2 * b * (\sin th)^3}{\sqrt{X_1 + Y_1} - e^2 * a * (\cos th)^3} \quad \text{Equation (23)}$$

For Equation (23), $ep^2$ may represent the second eccentricity squared, and th may represent an auxiliary value:

$$ep^2 = \frac{a^2}{b^2} - 1 \quad \text{Equation (24)}$$

$$th = \tan^{-1} \frac{a * Z_1}{b * \sqrt{X_1 + Y_1}}. \quad \text{Equation (25)}$$

The images altitude maps 410 may be generated for each image of the images 104. According to examples, for the images altitude maps 410, each 32-bits pixel value may represent the altitude from sea level for the corresponding pixel position of an original image of the images 104.

The orthophotomap 406 and the images GPS alignment data 408 may be forwarded to the client user interface 140, the images GPS alignment data 408 may be forwarded to the three dimensional curve reconstructor 130, and the images GPS alignment data 408 and the images altitude maps 410 may be forwarded to the entity recognizer 124.

Three-Dimensional Model Generator 102—Alignment of Images

The three-dimensional model generator 102 may align the images 104 to determine the positions and calibration parameters of their corresponding cameras (e.g., virtual model of the real camera which was used to take the initial images 104) in a local three-dimensional model coordinate system. At this stage, the three-dimensional model generator 102 may search for points of interest in each image. The three-dimensional model generator 102 may match the located points of interest from different images to ensure which points of interest from different images represent the same point in a real-world surface. For each pair of images with a sufficient number of matched points, the fundamental matrix may be determined (e.g., 3×3 matrix which relates the corresponding pixels). Based on fundamental matrices, coordinates of images' cameras, images' planes, and points of interest in three-dimensional model space may be determined, for example, based on a Structure from motion technique (SFM). With respect to SFM, in incremental SFM, camera poses may be solved for and added one by one to the collection. In global SFM, the camera poses of all cameras may be solved for at the same time. An intermediate approach may include out-of-core SFM, where several partial reconstructions may be determined and are then integrated into a global solution. In the event if calculated rays from cameras to the center of corresponding image planes include a large deviation from perpendicular to the probable real-world surface, these images may be filtered out or re-aligned.

The local three-dimensional model coordinate system's relation to the geocentric coordinate system may be determined by applying the information of the GPS location of a camera at the time of taking of each image 104 from the telemetry data 110, and minimizing the resulting error in distances.

Three-Dimensional Model Generator 102—GPS Referencing/Georeferencing

Figure 5:
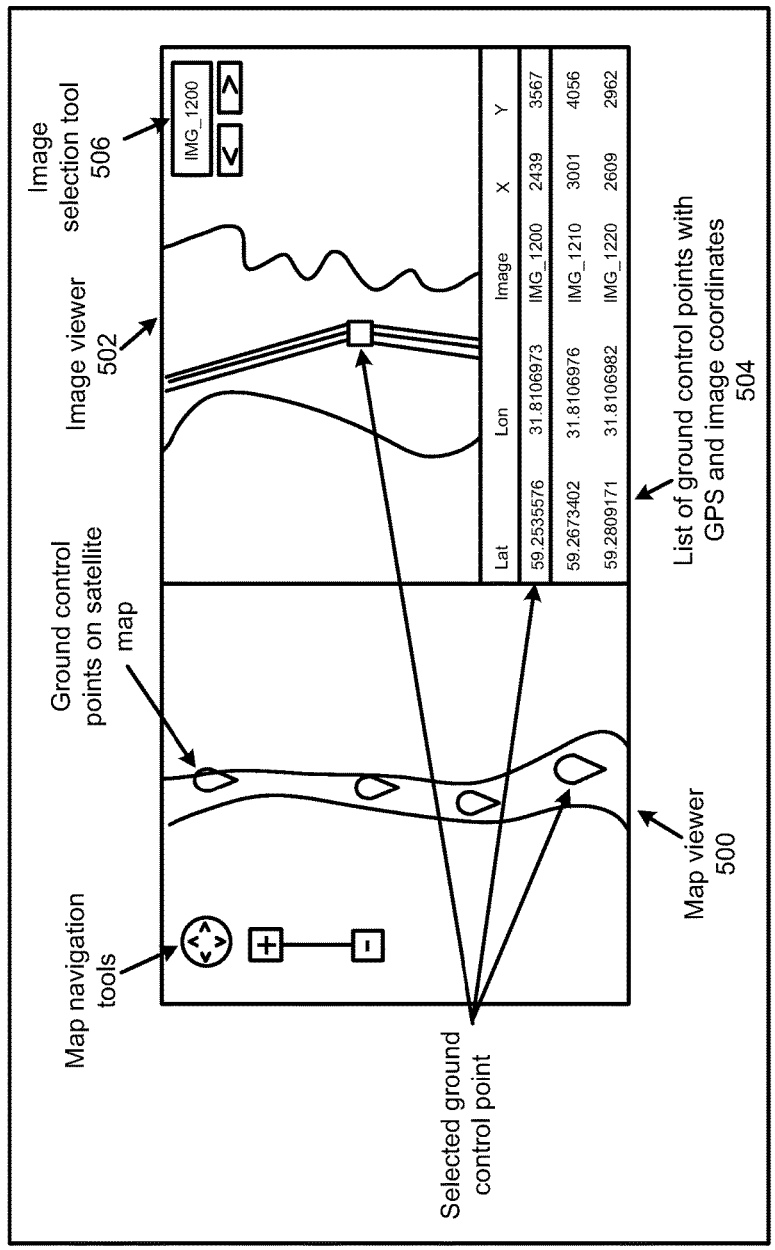
FIG. 5 illustrates the process of global positioning system (GPS) referencing data preparation for use in the three-dimensional model generator, according to an example of the present disclosure.

The accuracy of the relationship between the local three-dimensional model coordinate system and the geocentric coordinate system may be improved by introducing the GPS reference data, which includes a list of georeference points. Each georeference point may include a position of a single point in a real world coordinate system (i.e., GPS data (e.g., latitude and longitude) and altitude) and corresponding position in one or several images (i.e., image name, x and y coordinates in image coordinate system). The accurate real-world coordinates may be obtained on a real-world location by using relevant equipment, or based on accurately georeferenced satellite images. FIG. 5 illustrates the example of preparing GPS referencing data to be used in the three-dimensional model generator 102 with the use of satellite data, according to an example of the present disclosure.

Referring to FIGS. 1 and 5, a display with respect to GPS referencing and georeferencing may include a map viewer 500 that displays a satellite map, and an image viewer 502 that displays a current selected image. A GCP from the map display of the map viewer 500 may be displayed in the image displayed at the image viewer 502, and in the list of GCPs at 504. Different images may be displayed at the image viewer 502, for example, by using an image selection tool 506. The list of GCPs at 504 may include all added and existing GCPs. All fields may be editable in the map viewer 500 and the image viewer 502, for example, by double-clicking on the reference image ID (e.g. "IMG_1200" for the example of FIG. 5) to activate the reference image.

With respect to the map viewer 500, and/or the image viewer 502, a new GCP may be added, and/or a reference pixel position of an existing GCP may be changed by a single click at any pixel position. Thus, a single click on an image may create a new GCP, and add the new GCP to the end of the list of GCPs at 504.

With respect to the map viewer 500, satellite maps (i.e., available online satellite maps) may be displayed with the center point updated to the active image (i.e., the image displayed at the image viewer 502) when the active image changes, if this image's GPS alignment data is provided from the three-dimensional model generator 102, based on the flight log. Added currently and/or existing GCP markers may be shown, for example, as colored markers on the map, and the reference GPS positions may be changed by dragging the GCP markers.

With respect to modifying a GCP in the list of GCPs at 504, all the fields may be edited as needed, and the changes to the reference positions may be reflected in the active image at the image viewer 502 and the map viewer 500 accordingly. The reference pixel position may be changed by selecting a new position on the image, or the reference GPS position may be changed by dragging a GCP marker on the active image of the image viewer 502.

With respect to removing a GCP, in the view for the list of GCPs at 504, any existing GCP may be removed, for example, by selecting a corresponding X mark.

Three-Dimensional Model Generator 102—Three-Dimensional Model Reconstruction The three-dimensional model generator 102 may utilize the initial images 104 and corresponding images alignment data to build a dense point cloud. A dense point cloud may be described as a set of points in the local three-dimensional model coordinate system, with a large number of such points. Each point in a dense point cloud may represent a point in a real-world surface, reconstructed from similar pixels in several mutually aligned images. The points that are far from their neighbors may be considered outliers and discarded from future analyses.

The three-dimensional model generator 102 may utilize the dense cloud to build a three-dimensional mesh. A mesh may be described as a collection of vertices, edges and faces that define the shape of a polyhedral object. The three-dimensional model generator 102 may select neighbor points from a dense cloud to become a mesh's vertices and form edges and faces. The positions of vertices may be altered to smooth the resulting shape. The mesh with positions and calibration parameters of cameras may form the desired three-dimensional model of the monitored area.

Three-Dimensional Model Generator 102—Orthophotomap Generation

As described herein, the three-dimensional model generator 102 may receive the images 104 captured by the vehicle 106, and generate, based on the telemetry data 110, the images 104, and additional information (e.g., configuration information related to the vehicle 106, etc.), the georeferenced three-dimensional (or a two and a half-dimensional) model that includes the vehicle path 108 and entities 122 along the vehicle path 108. The georeferenced three-dimensional model may be used to further generate the orthophotomap 406 based on the three-dimensional mesh, images 104, and images GPS alignment data. For each face in the mesh the images (from the images 104) in which the face can be seen may be determine, and the face may be projected onto these images' planes. Using the projections, the texture (e.g., color information) may be determined for each of the faces. For orthophotomap generation, the entire mesh enriched with texture information may be projected onto the virtual smooth Earth's surface, and saved in a standard format capable of storing GPS referencing information, e.g., GOOGLE KMZ or georeferenced TIFF.

Three-Dimensional Model Generator 102—Altitude Maps Generation

Figure 6:
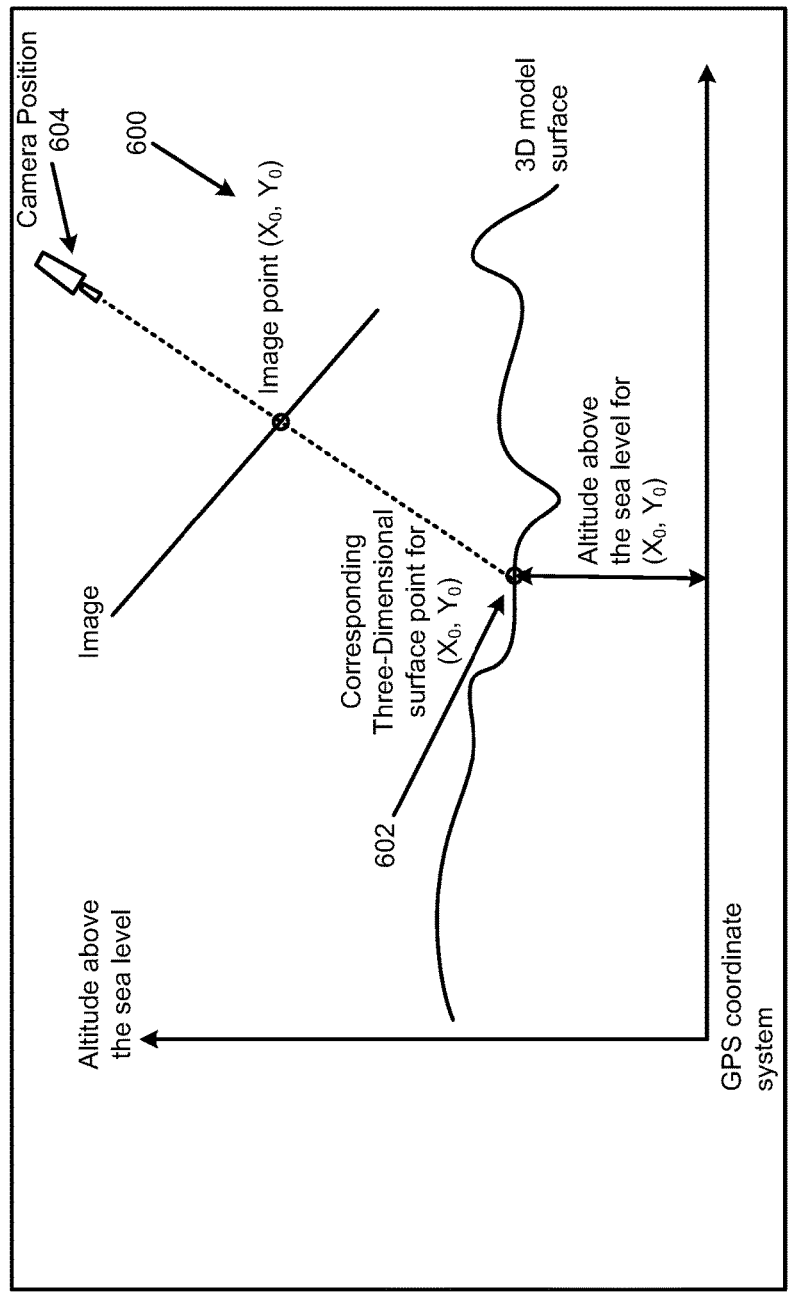
FIG. 6 illustrates altitude maps generation for the three-dimensional model generator, according to an example of the present disclosure.

FIG. 6 illustrates altitude maps generation for the three-dimensional model generator 102, according to an example of the present disclosure.

Referring to FIGS. 1 and 6, the three-dimensional model generator 102 may generate altitude maps. With respect to generation of altitude maps, a depth map may be described as an image representation where each pixel value for image point $(X_0, Y_0)$ at 600 is the distance from the camera position 604 to the corresponding three-dimensional surface point for $(X_0, Y_0)$ at 602. In this case, the depth map may be generated, for example, in a 32-bit TIF format, and the distance values may be specified within the local three-dimensional coordinate system of the application. Before the conversion, the depth map may be scaled to a smaller size for space conversion if a scale factor is provided as an input parameter.

With respect to the generation of the altitude maps, an altitude map may include an image representation where each pixel value for image point $(X_0, Y_0)$ at 600 is the altitude above the sea level in the World Geodetic System 1984 (WGS84). The three-dimensional model generator 102 may use given depth maps and images GPS alignment data, and apply conversions for each pixel point in the given depth map. The conversions may include converting an image point $(X_0, Y_0)$ at 600 in the depth map to a corresponding three-dimensional surface point for $(X_0, Y_0)$ at 602, converting the corresponding three-dimensional surface point for $(X_0, Y_0)$ 602 in the local three-dimensional coordinate system to a geocentric ECEF point, and converting the geocentric ECEF point to a WGS84 point. The altitude value from the determined WGS84 point may be stored in the final altitude map for each pixel.

Entity Recognizer 124—Data Flow

Figure 7:
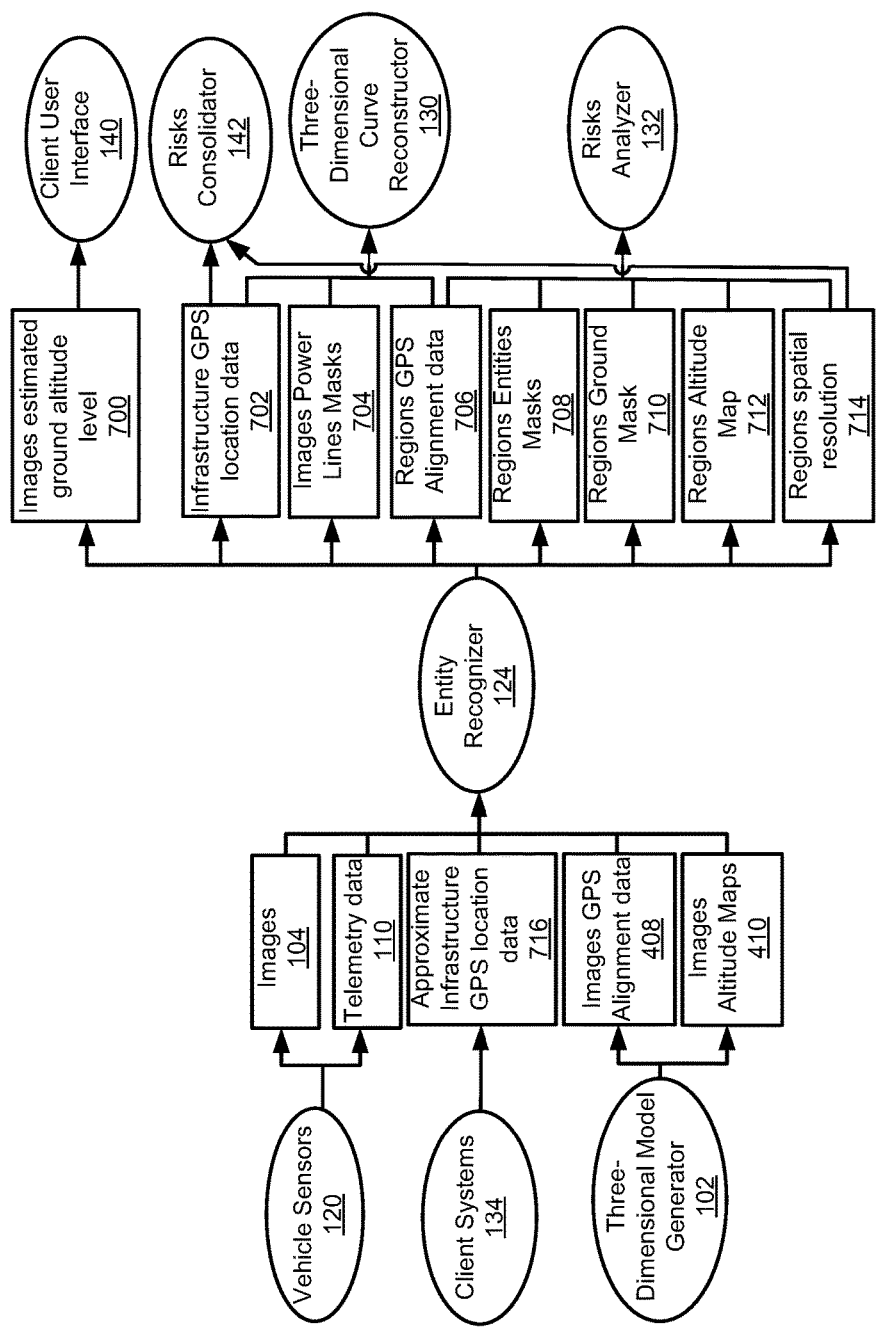
FIG. 7 illustrates data flow for an entity recognizer of the condition detection using image processing system of FIG. 1, according to an example of the present disclosure.

FIG. 7 illustrates data flow for the entity recognizer 124 of the system 100, according to an example of the present disclosure.

Referring to FIG. 7, with respect to data flow related to the entity recognizer 124, the entity recognizer 124 may analyze the images 104, the telemetry data 110, the approximate infrastructure GPS location data 716, the images GPS alignment data 408, and the images altitude maps 410 to generate an images estimated ground altitude level 700 for each image of the images 104, precise infrastructure GPS location data 702, images power lines masks 704, regions GPS alignment data 706, regions entities masks 708, a regions ground mask 710, a regions altitude map 712, and regions spatial resolution 714. The images estimated ground altitude level 700 may be forwarded to the client user interface 140. The precise infrastructure GPS location data 702 and the regions spatial resolution 714 may be forwarded to the risks consolidator 142. The infrastructure GPS location data 702, the images power lines masks 704, and the regions GPS alignment data 706 may be forwarded to the three-dimensional curve reconstructor 130. Further, the regions GPS alignment data 706, the regions entities masks 708, the regions ground mask 710, the regions altitude map 712, and the regions spatial resolution 714 may be forwarded to the risks analyzer 132.

The images estimated ground altitude level 700 may include, for example, a single line text including vector of altitudes (from sea level), where the $1^{st}$ value is ground altitude level for the entire image, $2^{nd}$ to $5^{th}$ values are ground altitude levels determined for each quarter of the image, and the $6^{th}$ value is for the center quarter of the image.

The infrastructure GPS location data 702 may include the precise infrastructure GPS location data for infrastructure entities (e.g., towers for power grids, etc.).

The images power lines masks 704 may represent masks for predetermined types of the entities (e.g., power lines). For example, a power lines mask may be used by the three-dimensional curve reconstructor 130 to reconstruct the three-dimensional (or two and a half-dimensional) model of the power lines, and generate their parameterized representation.

The regions ground mask 710 may be generated for each region of the regions. According to examples, for the regions ground mask 710, each pixel value may indicate whether the corresponding pixel position of the region is classified as a ground point or not (e.g., 0=ground, 255=non-ground).

The regions spatial resolution 714 may represent the spatial resolution (cm per pixel) for the regions.

Figure 8:
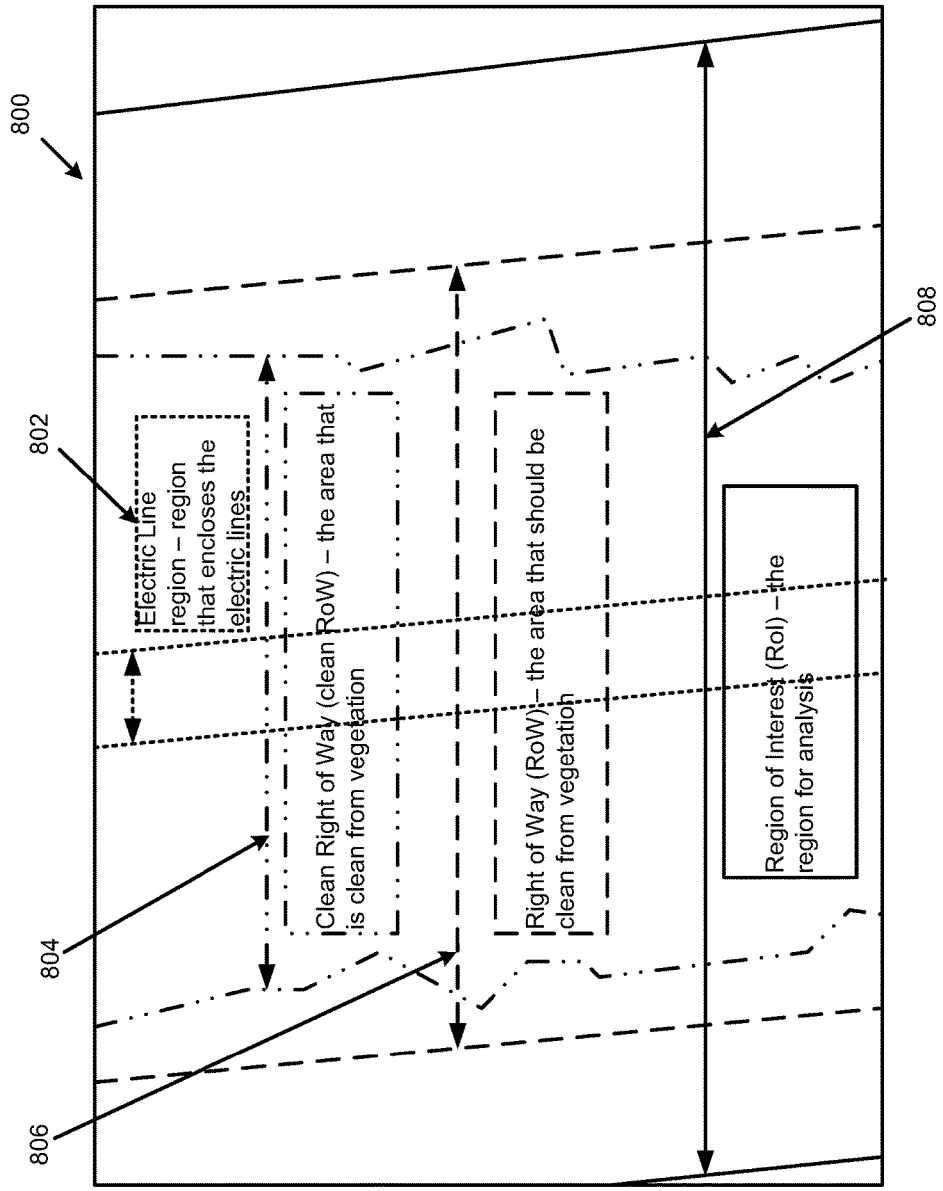
FIG. 8 illustrates a linear infrastructure entities area that is to be monitored by the condition detection using image processing system of FIG. 1, according to an example of the present disclosure.

Condition Detection Using Image Processing System 100—Monitoring Linear Infrastructure Entities Area FIG. 8 illustrates a linear infrastructure entities area 800 that is to be monitored by the system 100, according to an example of the present disclosure.

Referring to FIG. 8, a monitoring linear infrastructure entities area 800 may include an electric line region 802 that represents a region that encloses electric lines. A Clean RoW (Clean Right of Way) 804 may represent the area along a linear infrastructure entity that is clean in fact from vegetation and/or anthropogenic objects. A RoW (Right of Way) 806 may represent the area along a linear infrastructure entity that should be clean from vegetation and/or objects according to industrial standards of a client. A ROI (Region of Interest) 808 may represent the region for analysis by the system 100. The ROI 808 may be set wider than the ROW 806, e.g., it may be dangerous when the heights of trees are greater than a distance to the power lines.

Entity Recognizer 124—General Implementation and Execution

Figure 9:
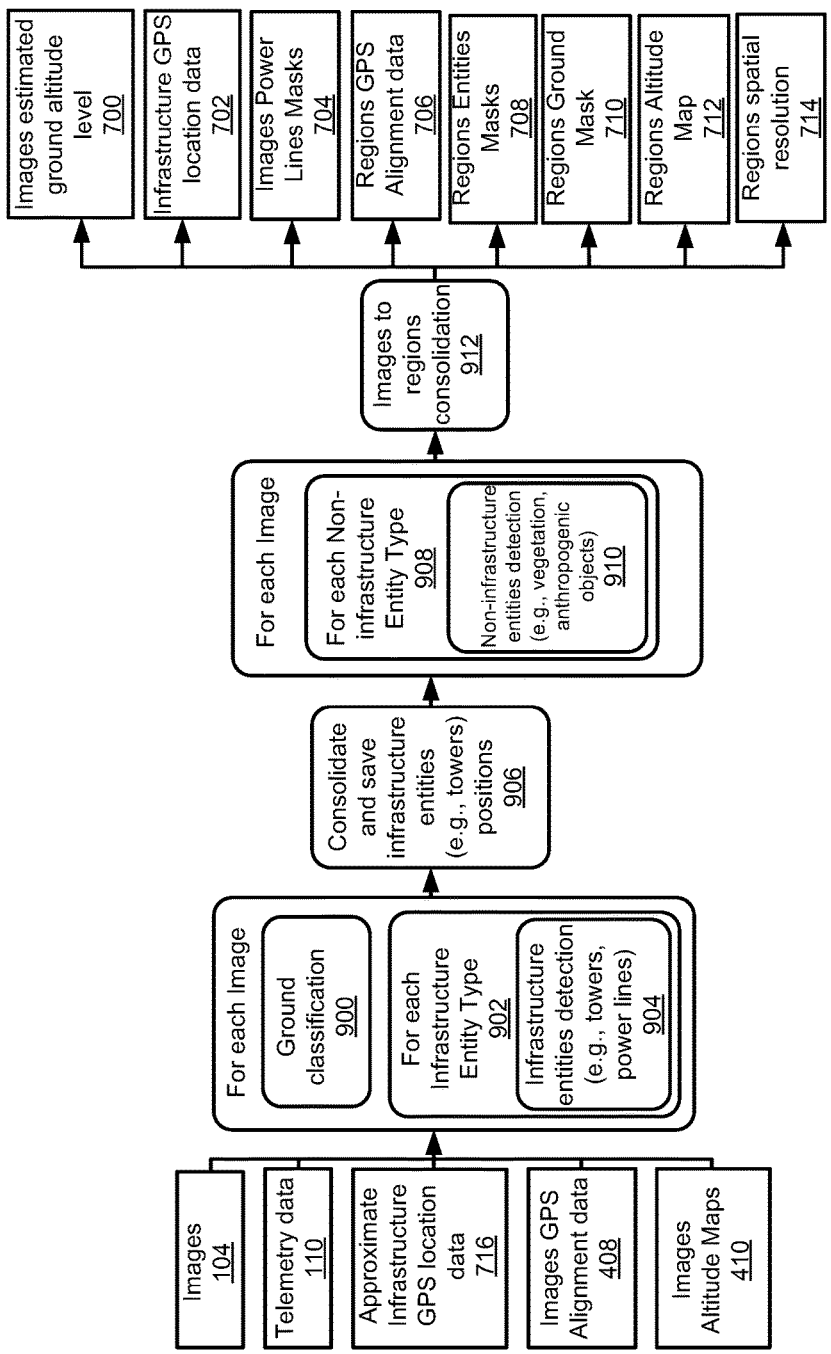
FIG. 9 illustrates general implementation and execution for the entity recognizer, according to an example of the present disclosure.

FIG. 9 illustrates general implementation and execution for the entity recognizer 124, according to an example of the present disclosure.

Referring to FIGS. 1, 7, and 9, the entity recognizer 124 may receive inputs that include the images 104, the telemetry data 110, the approximate infrastructure GPS location data 716, the images GPS alignment data 408, and the images altitude maps 410.

For each of the images 104, the entity recognizer 124 may implement ground classification 900 to classify each point of an image as ground or not. Further, for each of the images 104, for each infrastructure entity type 902, the entity detector 126 of the entity recognizer 124 may perform infrastructure entities detection (e.g., for towers, power lines, etc.) at 904.

The entity region consolidator 128 may consolidate detection results from several neighbor (according to GPS coordinates) images that are included in a current region, and save infrastructure entities positions at 906.

For each of the images 104, for each non-infrastructure entity type 908, the entity detector 126 of the entity recognizer 124 may perform non-infrastructure entities detection (e.g., for vegetation, anthropogenic objects, etc.) at 910.

The entity region consolidator 128 of the entity recognizer 124 may perform images to regions consolidation at 912 to consolidate image recognition results in regions.

As described herein with reference to FIG. 7, the entity recognizer 124 may output the images estimated ground altitude level 700, the infrastructure GPS location data 702, the images power lines masks 704, the regions GPS alignment data 706, the regions entities masks 708, the regions ground mask 710, the regions altitude map 712, and the regions spatial resolution 714.

Various aspects of the entity recognizer 124 may be implemented, for example, by using C++, and implemented as an executable from the main PYTHON scripts for each of the chunks. For each of the images 104, the entity region consolidator 128 may consolidate and save infrastructure entity positions. For the example of the aerial monitoring of towers, for each of the images 104, the entity region consolidator 128 may consolidate and save tower positions. The entity recognizer 124 may group the images 104 into regions, where each region starts and ends with an infrastructure entity (e.g., a tower). Once regions are identified, the entity recognizer 124 may detect the non-infrastructure entities on images, consolidate the recognition results of the images inside each region, and store consolidated detection results into masks for each of the regions. For the example of the aerial monitoring of towers, examples of classes in the output image recognition masks generated by the entity recognizer 124 may include region of interest (ROI), tower, power lines, vegetation, object, and ground. The entity recognizer 124 may convert (e.g., map) image specific data to region specific data (i.e., altitude maps and alignment data). The image masks may be consolidated to the region masks to generate outputs specific to the entity recognizer 124.

The regions entities masks 708 may be generated for each of the regions. For the example of the aerial monitoring of towers, the size of a region mask may be dependent on the distance covered between towers from both sides of a region, and number of towers inside a region. For the example of the aerial monitoring of linear infrastructure objects, for example, for the energy industry, according to an example, each classification result may be assigned to a bit in each 8-bit pixel value as follows:

| | |
|---|---|
| Indeterminate region = | 0 (0000 0000 in binary) |
| Ground = | 2 (0000 0010) |
| Line Region = | 4 (0000 0100) |
| Region of Interest = | 8 (0000 1000) |
| Anthropogenic Object = | 16 (0001 0000) |
| Vegetation = | 32 (0010 0000) |
| Tower = | 64 (0100 0000) |
| Power Line itself = | 128 (1000 0000) |

The regions altitude maps 712 may include a similar format as the images altitude maps 410 generated by the three-dimensional model generator 102. The regions altitude maps 712 may be generated for each region, instead of each image compared to the images altitude maps 410 generated by the three-dimensional model generator 102. For the regions altitude maps 712, the data for each region may be consolidated in a logical manner per region. For the example of the aerial monitoring of towers, the size of the regions altitude maps 712 may be dependent on the size of the current region.

For the example of the aerial monitoring of towers, for each detected tower, the output report generated by the entity recognizer 124 may further include the tower ID, the type of tower and a consolidated position of the tower (e.g., GPS (longitude and latitude), and altitude). The output report may also include tower tilting angles and angle of power lines rotation.

The image recognition masks may include the same format as the region masks, but may be implemented for each image of the images 104. The clear right-of-way mask may be generated for each of the regions, and each non-zero pixel value may refer to a clear from vegetation point in the right-of-way.

For the example of the aerial monitoring of towers, the entity recognizer 124 may use predetermined information about approximate infrastructure entities positions for towers detection. Machine learning techniques, for example, fully supervised learning framework (classifiers, such as neural networks, convolutional neural networks, random forests, support vector machine techniques, boosting techniques, k-nearest neighbors algorithm, etc.), may be used for images recognition for entities detection. Different machine learning techniques may be used for different types of entities. For the example of the aerial monitoring of towers, according to an example of the present disclosure, the parameters of the classifiers 1304 (or parameters of other machine learning techniques) may be defined for each classifier (or other machine learning technique) in the corresponding files. In order to facilitate recognition of entities, predefined information may be used (e.g., infrastructure entities positions, results, and data from previous monitoring, etc.), for example, to narrow the search area. For each of the images 104, if the closest infrastructure entity is located, the respective image may be loaded, and shadow removal may be performed before entity detection. For each of the images 104, in order to detect an entity within an image, a relatively small entity search area may be identified within the image based on expected pixel projection of the estimated entity GPS position, and the entity recognizer 124 may attempt to detect an entity within this search area. For each of the images 104, if an entity is not located, the search area may be expanded (e.g., to twice the size of the original search area) to attempt to locate an entity. If an entity is located, the results of the entity location may be stored for further consolidation.

The entity recognizer 124 may generate the regions (e.g., by grouping the images 104 into regions) based on the infrastructure entities detection results (e.g., the tower detection results). Recognition may be applied only for regions including a linear infrastructure entity, all other regions may be filtered. For each of the regions, the entity recognizer 124 may identify which ones of the images 104 belongs to the respective region.

For the example of the aerial monitoring of linear energy infrastructure objects, with respect to generation of the regions entities masks 708, for each image that belongs to a region, the entity recognizer 124 may detect electric lines, save the electric lines image mask and draw the electric lines mask to an appropriate one of the regions entities masks 708.

For the example of the aerial monitoring of linear energy infrastructure objects, with respect to generation of the regions entities masks 708, for each image that belongs to a region, the entity recognizer 124 may detect anthropogenic objects and trees (e.g., vegetation), and draw the detected objects and trees to an appropriate one of the regions entities masks 708.

The entity recognizer 124 may map and add an image altitude map (of the images altitude maps 410) to a region altitude map (of the regions altitude maps 712).

After processing of all of the images 104 belonging to a region, the entity recognizer 124 may perform images to regions consolidation at 912. With respect to the process of adding all of the image masks to the region mask, for any conflicts (e.g., the same pixel has been detected both as vegetation and as an object), the consolidation of the region mask may be used to decide the final value (type) of each region mask. The decision of the final value may be based, for example, on a weighted average of the several images results.

With respect to region mask generation, the entity recognizer 124 may save the regions entities masks 708 and the regions altitude maps 712.

The entity recognizer 124 may use different functions for entity detection based on environmental changes, such as changes related to winter versus summer conditions. Different techniques may be used for different conditions. For example, in winter, a winter-specific function may be used, and otherwise, a summer-specific function may be used.

The entity recognizer 124 may perform preprocessing before recognition (e.g., suppress shadows, light corrections for each of the images 104, etc.).

Entity Recognizer 124—Ground Classification and Ground Mask Generation

Figure 10:
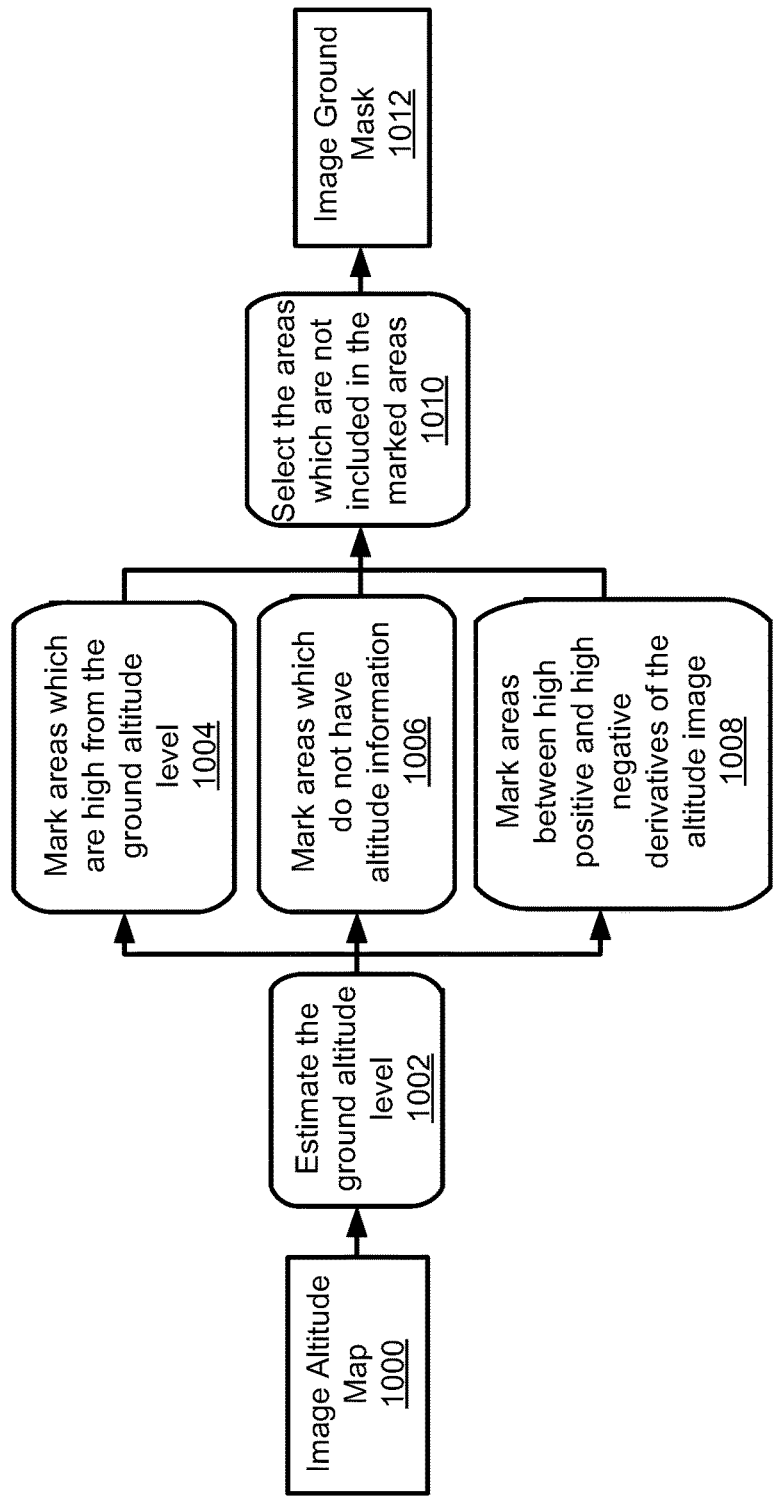
FIG. 10 illustrates ground classification and ground mask generation for the entity recognizer, according to an example of the present disclosure.

FIG. 10 illustrates ground classification and ground mask generation for the entity recognizer 124, according to an example of the present disclosure.

Referring to FIG. 10, with respect to ground classification and ground mask generation (e.g., for the regions ground mask 710), the entity recognizer 124 may receive an image altitude map (of the images altitude maps 410) 1000, and at block 1002, the entity recognizer 124 may estimate the ground altitude level for the image altitude map 1000. For example, ground classification may be implemented by the following technique. At block 1004, the entity recognizer 124 may mark areas which are high from the ground altitude level. At block 1006, the entity recognizer 124 may mark areas which do not have altitude information. At block 1008, the entity recognizer 124 may mark areas between high positive and negative derivatives of the altitude image, which may represent the possible tall objects in the image. At block 1010, the entity recognizer 124 may exclude the marked areas from the mask, covering the whole image, and generate an image ground mask 1012. Thus, the marked areas may be considered as non-ground, and the non-marked areas may be considered as ground.

Entity Recognizer 124—Ground Altitude Level Estimation

Figure 11:
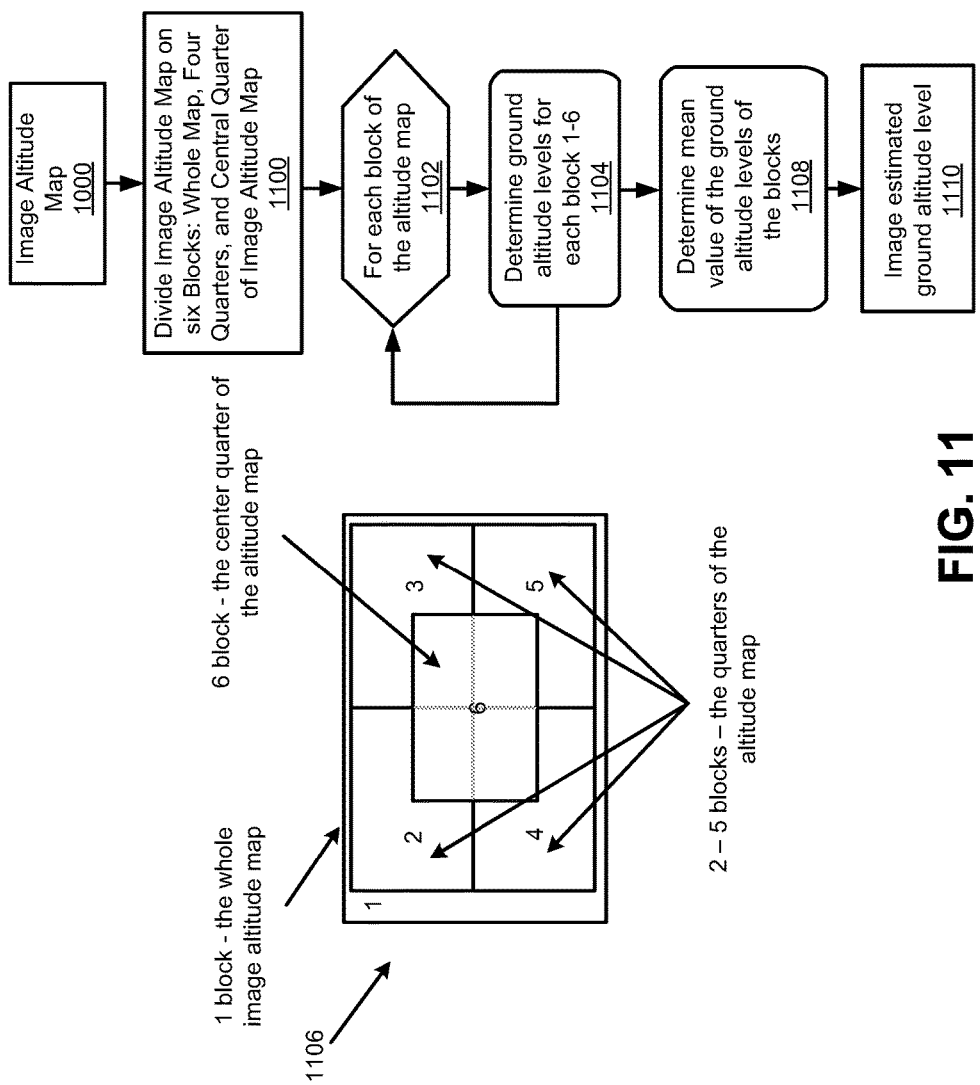
FIG. 11 illustrates ground altitude level estimation for the entity recognizer, according to an example of the present disclosure.

FIG. 11 illustrates ground altitude level estimation for the entity recognizer 124, according to an example of the present disclosure.

Referring to FIG. 11, with respect to ground altitude level estimation (e.g., for the images estimated ground altitude level 700), the entity recognizer 124 may receive the image altitude map (of the images altitude maps 410) 1000. At block 1100, the image altitude map 1000 may be divided, for example, into six blocks: whole altitude map, four quarters, and central quarter of the altitude map. At block 1102, for each block of the altitude map, at block 1104, the entity recognizer 124 may determine ground altitude levels for each block 1-6 (e.g., as shown at 1106). At block 1108, the entity recognizer 124 may determine a mean value of the ground altitude levels of the blocks 1-6. Based on the mean value of the ground altitude levels of the blocks 1-6, the entity recognizer 124 may determine an image estimated ground altitude level 1110.

Training Data Preparation

Figure 12:
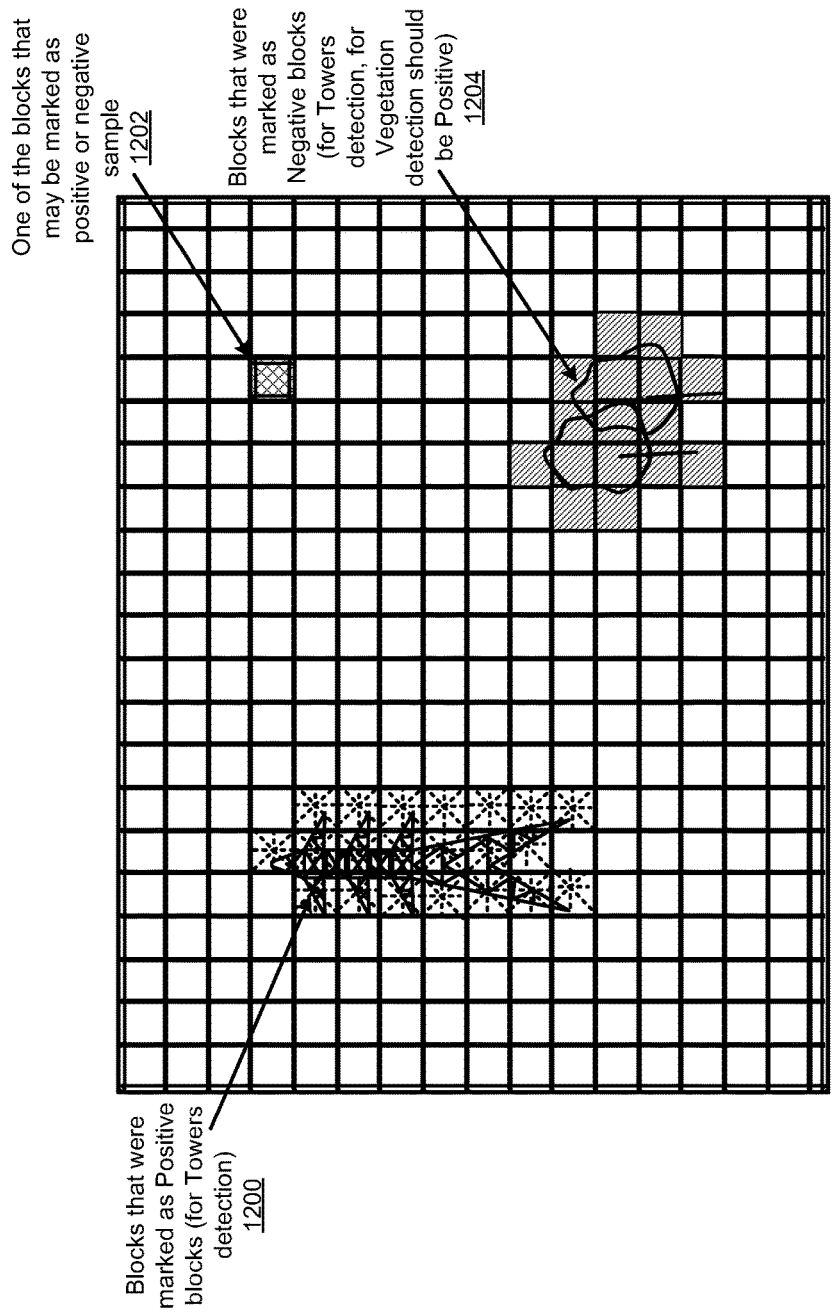
FIG. 12 illustrates training data preparation for the condition detection using image processing system of FIG. 1, according to an example of the present disclosure.

FIG. 12 illustrates training data preparation for the system 100, according to an example of the present disclosure.

Referring to FIG. 12, with respect to training data preparation, the training data may include a training data file for each classifier that is to be used for the purpose of entities recognition. In this regard, a training data preparation module may be created. For the example of the aerial monitoring of entities, a fully supervised learning framework may be used. Images that were selected for training data creation may be divided into the blocks of the definite size (or sizes). Each block may be marked to be related to some type of entity, e.g., a block may be positive, negative or neutral according to each type of entity. At 1200, blocks that were marked as positive blocks (e.g., for towers detection). At 1202, the entity recognizer 124 may identify blocks that may be marked as a positive or a negative sample. Further, at 1204, the entity recognizer 124 may identify blocks that were marked as negative blocks (e.g., for towers detection, where such blocks should be positive for vegetation detection). Features of each block may be determined (e.g., using Histogram of Oriented Gradients (HOG) descriptor, Local Binary Patterns (LBP) descriptor, Bag of Visual Words techniques, colors histogram descriptors, histogram of detected corners descriptor, or other texture features) after marking of blocks. Then the fully supervised learning framework may be trained on this data, with the results being saved in the files with parameters of the classifiers 1304. The training process may be accomplished at least once before the processing of the data with the condition detection using image processing solution to enable the use of the machine learning techniques.

Figure 13:
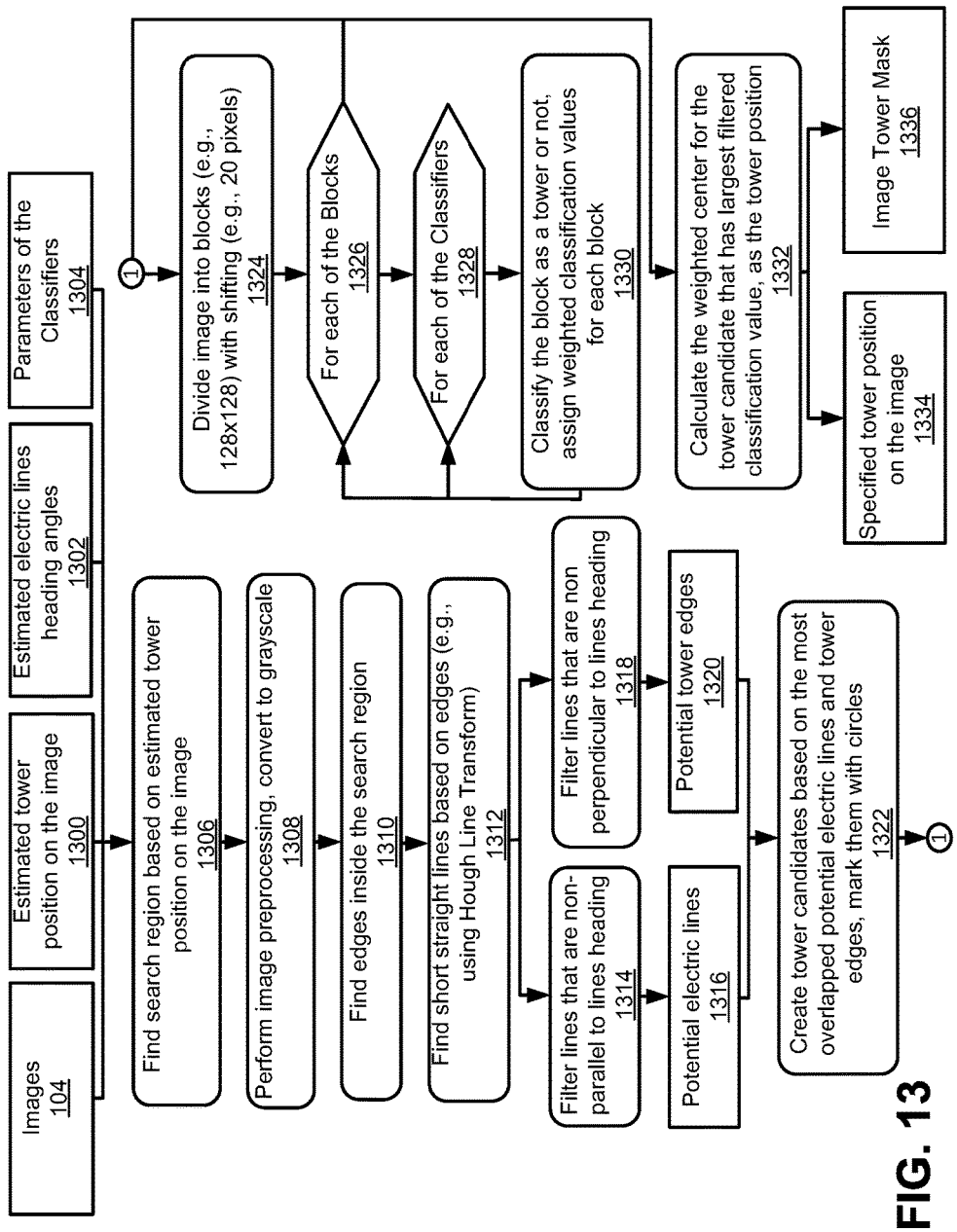
FIG. 13 illustrates towers detection and towers mask generation for the entity recognizer, according to an example of the present disclosure.

Entity Recognizer 124 (Entity Detector 126)—Towers Detection and Towers Mask Generation FIG. 13 illustrates towers detection and towers mask generation for the entity recognizer 124, according to an example of the present disclosure.

For the example of the aerial monitoring of towers, with respect to towers detection and towers mask generation by the entity recognizer 124, the entity recognizer 124 may receive the images 104, and further receive the estimated tower position on the image 1300, the estimated electric lines heading angles 1302, and parameters of the classifiers 1304. The entity detector 126 of the entity recognizer 124 may detect the center point of an entity (e.g., a tower) in a given image, where the estimated entity position, estimated entity width, and for the example of the aerial monitoring of towers, other aspects such as estimated incoming and outgoing electric line heading angles are known (based on approximate GPS coordinates of towers). Further, mask generation for an entity may be performed based on consolidation of entity detection results from multiple images.

At block 1306, the entity detector 126 may determine a search region based on estimated tower position on a corresponding image. The detection may start by determining, for example, a rectangular entity search region inside an image. The size of the search region may depend on the line heading, for example, the size may be of 4×4 meters. A cmperpixel (i.e., cm per pixel) value of an image may be used to obtain the search region dimensions in pixels, and the remaining processing may be performed inside this search region.

At block 1308, the entity detector 126 may perform image preprocessing, for example, by converting the image to grayscale, shadow removal, light corrections, etc. For different seasons or for detection of different types of entities different preprocessing may be used.

At block 1310, the entity detector 126 may locate edges (e.g., for towers) inside the search region. With respect to detection of the center point of an infrastructure entity, the entity detector 126 may use edge or ridge detection and line detection for determining potential lines and entity edges according to estimated heading angles, and create infrastructure entity candidates based on the most overlapped potential lines and entity edges. In this regard, the entity detector 126 may extract the edges that are along the line and infrastructure entity headings. The entity detector 126 may perform, for example, a Canny or a Sobel detector for edges detection, and the relatively strong edges within the heading limits may be preserved as a binary edge image after thresholding.

At block 1312, the entity detector 126 may locate short straight lines based on edges by using techniques, such as, for example, Hough Line Transform, or Line Segment Detector (LSD). In this regard, based on edge data, the entity detector 126 may identify potential electric lines and infrastructure entity (e.g., tower) edges. For the example of the aerial monitoring of towers, with respect to identification of potential electric lines and tower edges, electric lines and tower edges may be assumed to include straight lines, where tower edges may be considered generally perpendicular to the electric lines.

At block 1314, the entity detector 126 may filter lines that are non-parallel to lines heading.

At block 1316, based on the filtering of lines that are non-parallel to lines heading, the entity detector 126 may identify potential electric lines. For the example of the aerial monitoring of towers, with respect to detection of electric lines, lines that are at most d degrees (e.g., 6°) deviated from the estimated incoming or outgoing electric line angles may be marked as potential electric lines.

At block 1318, the entity detector 126 may filter lines that are non-perpendicular to lines heading.

At block 1320, based on the filtering of lines that are non-perpendicular to lines heading, the entity detector 126 may identify potential tower edges. For the example of the aerial monitoring of towers, lines that are within a predetermined deviation (e.g., 90°+/−35°) from the incoming or outgoing electric line angles may be marked as potential tower edges.

At block 1322, the entity detector 126 may create tower candidates based on the most overlapped potential electric lines ridges and tower edges from blocks 1316 and 1320, and mark the tower candidates with circles. Since circle marks may overlap, the entity detector 126 may perform blob detection to obtain connected entity marks that are considered as potential infrastructure entity regions. From the detected blobs, blobs which are a predetermined percentage wider (e.g., two times wider) or a predetermined percentage narrower (e.g., three times narrower) than estimated infrastructure entity width may not be considered. Further, for the remaining blobs that are within predetermined size limits, a predetermined number of blobs (e.g., three) may be selected based on the largest overlap with potential electric lines and/or with the filtered result of corners detection (e.g., by using a Harris corner detector).

At block 1324, the entity detector 126 may divide each of the images 104, for example, into K×K pixels (e.g., K=128 for image of size 7360×4912 pixels, and with 1 cm per pixel resolution) blocks with shifting (e.g., 20 pixels). With respect to detection of the center point of an infrastructure entity, the entity detector 126 may perform block based classification (e.g., by fully supervised learning framework) based on different features for infrastructure entity candidates. Weighted classification values may be assigned for each block. According to an example, the entity detector 126 may use several classifiers. For example, classifiers may be trained on the Local Binary Patterns (LBP) features, Histogram of Oriented Gradients (HOG) features, histogram of detected corners (e.g. detected by Harris technique) features, etc. Some features may be omitted for appointed conditions. The classifiers used by the entity detector 126 may use training data. According to an example, training samples may include K×K pixels blocks from images. The use of generally equal amounts of positive and negative entity samples in the training data may facilitate the use of a radial basis function (RBF) kernel for support vector machine (SVM). Each classifier may include its own parameters, where the parameters may be determined based on trials, and further tuning based on testing.

The entity detector 126 may interpret, and implement different decisions for the results for winter and summer conditions based on multiple classifier results for each block. Different techniques may be used for combining of the classifiers results, e.g., if classifiers are binary, then their positive results may be added, then filtering may be applied. According to another example, for summer and/or spring conditions, instead of a binary prediction result, a distance measurement may be obtained from the classifier, and a classification factor may be assigned based on the distance. Further, a thresholding may be applied on the combined classification factor based on the number of positive classifiers and the particular season.

After all blocks are processed, the blob that has the largest sum of classification factors may be designated as the final detected infrastructure entity, if the sum is greater than a predetermined threshold. In this regard, this threshold may be determined based on the estimated infrastructure entity width and season. For the detected center points, the entity detector 126 may identify the detected center points by using circles with the radius of the blob width on the corresponding image infrastructure entity mask.

If no infrastructure entity is detected within the search region, the search region may be enlarged and processing may be re-performed. For example, the search regions may be doubled in size. If no infrastructure entity is located in the enlarged search regions, the entity detector 126 may indicate that no infrastructure entity is present in the relevant image.

At block 1330, for each of the image blocks at block 1326, and for each of the classifiers at block 1328, the entity detector 126 may classify the block as a tower or not, and assign weighted classification values for each block. In this regard, with respect to detection of the center point of an infrastructure entity, the entity detector 126 may apply corner based filtering to remove the positive classifications without corners nearby.

At block 1332, the entity detector 126 may determine the weighted center for the tower candidate that has a largest filtered classification value, as the tower position. In this regard, with respect to detection of the center point of an infrastructure entity, the entity detector 126 may determine the weighted center for the entity candidate that has the largest filtered classification value, as the infrastructure entity position.

Based on the determination of the weighted center for the tower candidate that has a largest filtered classification value as the tower position, the entity detector 126 may determine a specified tower position on the image 1334.

Further, based on the determination of the weighted center for the tower candidate that has a largest filtered classification value as the tower position, the entity detector 126 may generate an image tower mask 1336.

Entity Recognizer 124—Tower Consolidation

With respect to consolidation, based on the detection results, a consolidation process may be performed for each infrastructure entity. For the example of the aerial monitoring of towers, with respect to the consolidation, based on the detection results, a consolidation process may be performed for each tower. The consolidation process may represent a final infrastructure entity detection result, and estimated center point determination for an infrastructure entity. With respect to consolidation, the average of GPS positions from all detection results may be determined. If an infrastructure entity is detected, for example, in greater than two separate images, the infrastructure entities that are too far (e.g., based on a given threshold) from the average of GPS positions may be removed, and the average may be re-determined (i.e., an average of the GPS positions based on the remaining entities). If some infrastructure entities' GPS positions remain, then the re-determined infrastructure entity average value may be assigned as the final center point of the infrastructure entity. However, if there are no infrastructure entity GPS positions left, this means that no infrastructure entity is detected, and the estimated infrastructure entity position from an entity map may be used for further processing.

Figure 14:
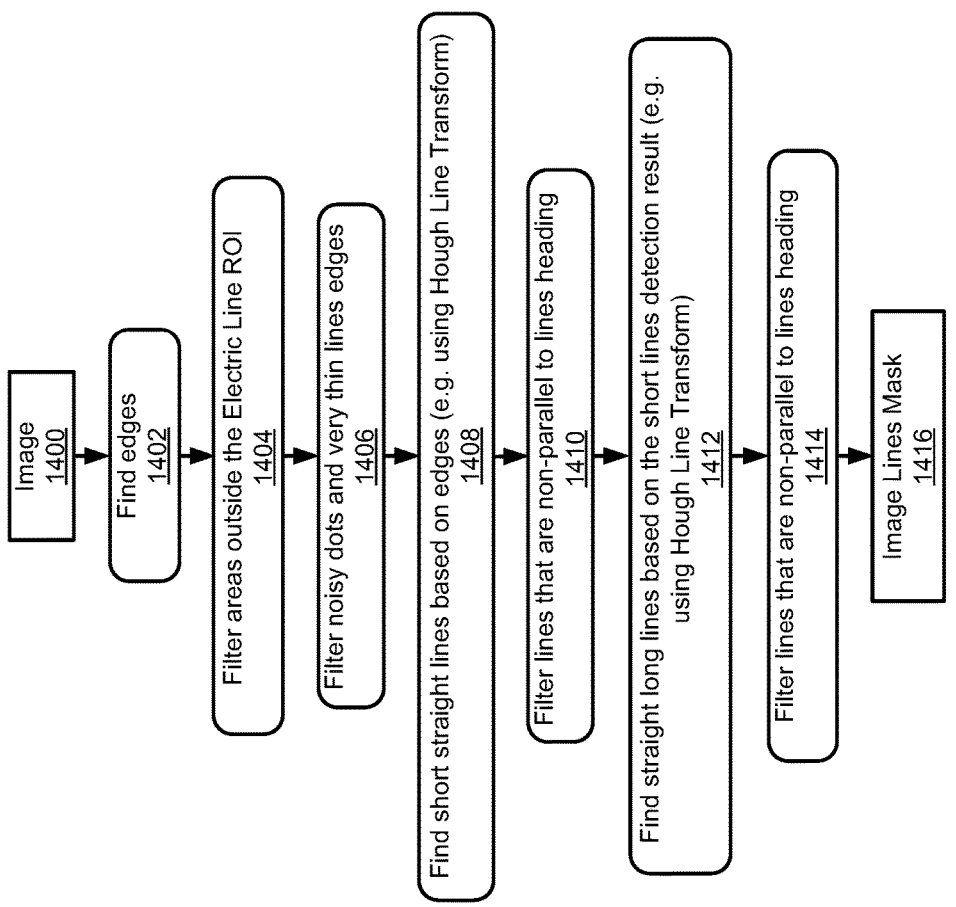
FIG. 14 illustrates electric lines detection and line region of interest (ROI) mask generation for the entity recognizer, according to an example of the present disclosure.

Entity Recognizer 124 (Entity Detector 126)—Electric Lines Detection and Power Lines Mask Generation FIG. 14 illustrates electric lines detection and power lines mask generation for the entity recognizer 124, according to an example of the present disclosure. The entity recognizer 124 may generate the power lines mask (e.g., for the example of the aerial monitoring of towers), and detect the electric lines (e.g., electric lines for the example of the aerial monitoring of towers) inside the electric line ROI.

The entity detector 126 may generate the power lines mask by using a fixed width corridor (e.g., 6.6 meters wide for the example of the aerial monitoring of towers) along the electric line heading. The electric line heading may be determined based on the two consecutive infrastructure entities and their GPS positions.

Referring to FIGS. 1 and 14, the entity detector 126 may receive an image (e.g., one of the images 104) 1400.

At block 1402, the entity detector 126 may determine edges in the image 1400.

At block 1404, for the example of the aerial monitoring of towers, the entity detector 126 may filter areas outside the electric line ROI.

At block 1406, the entity detector 126 may filter noisy dots and very thin lines edges. The entity detector 126 may remove noisy dots, and relatively thin electric line edges with median blur, for example, by using a kernel size depending on the cmperpixel value for the image. For the example of the aerial monitoring of power lines, an electric line may be expected to be 1.5-3.0 cm in width.

At block 1408, the entity detector 126 may locate short straight lines based on edges using short straight lines detection techniques. According to an example, the short straight lines detection techniques may be used for detection of power lines by its short pieces inside the electric line ROI.

At block 1410, the entity detector 126 may filter lines that are non-parallel to lines heading. According to an example, the electric lines which are more than s degrees (e.g., s=2°) deviated from the heading of the electric line ROI may be filtered out as noise.

At block 1412, the entity detector 126 may locate straight long lines based on the short straight lines detection result using, for example, short straight lines detection techniques. The electric line detection may be performed in passes. For example, first short electric lines including parts of real electric lines and additional edges may be detected inside the electric line ROI (e.g., block 1408), and then long complete electric lines may be detected using these short electric lines based on the premise that while an electric line is not expected to be completely straight through the entire image, a shorter part of the electric line should be relatively straight (e.g., block 1412). Further, while there may be many long gaps along the complete long electric line, short pieces of the electric line may include no gaps. According to an example, the short straight lines detection techniques may be used again over the short electric lines to locate longer electric lines (e.g., over 1500 pixels). Further, according to an example, electric lines deviated more than 2° may again be filtered out as noise. According to an example, the remaining electric lines may be considered as detected electric lines, and may be drawn to an image lines mask, for example, with two pixels width.

At block 1414, the entity detector 126 may filter lines that are non-parallel to lines heading. The entity detector 126 may apply a threshold to the given Laplace transformed image to filter out the insignificant ridge lines.

The entity detector 126 may generate an image lines mask 1416.

For the example of the aerial monitoring of towers, if there is a tower detected inside an image, the tower may negatively impact the next electric line detection. Thus, the entity detector 126 may remove the tower area from the analysis by masking out with a fixed width circle around a tower center position before further electric line detection.

Figure 15:
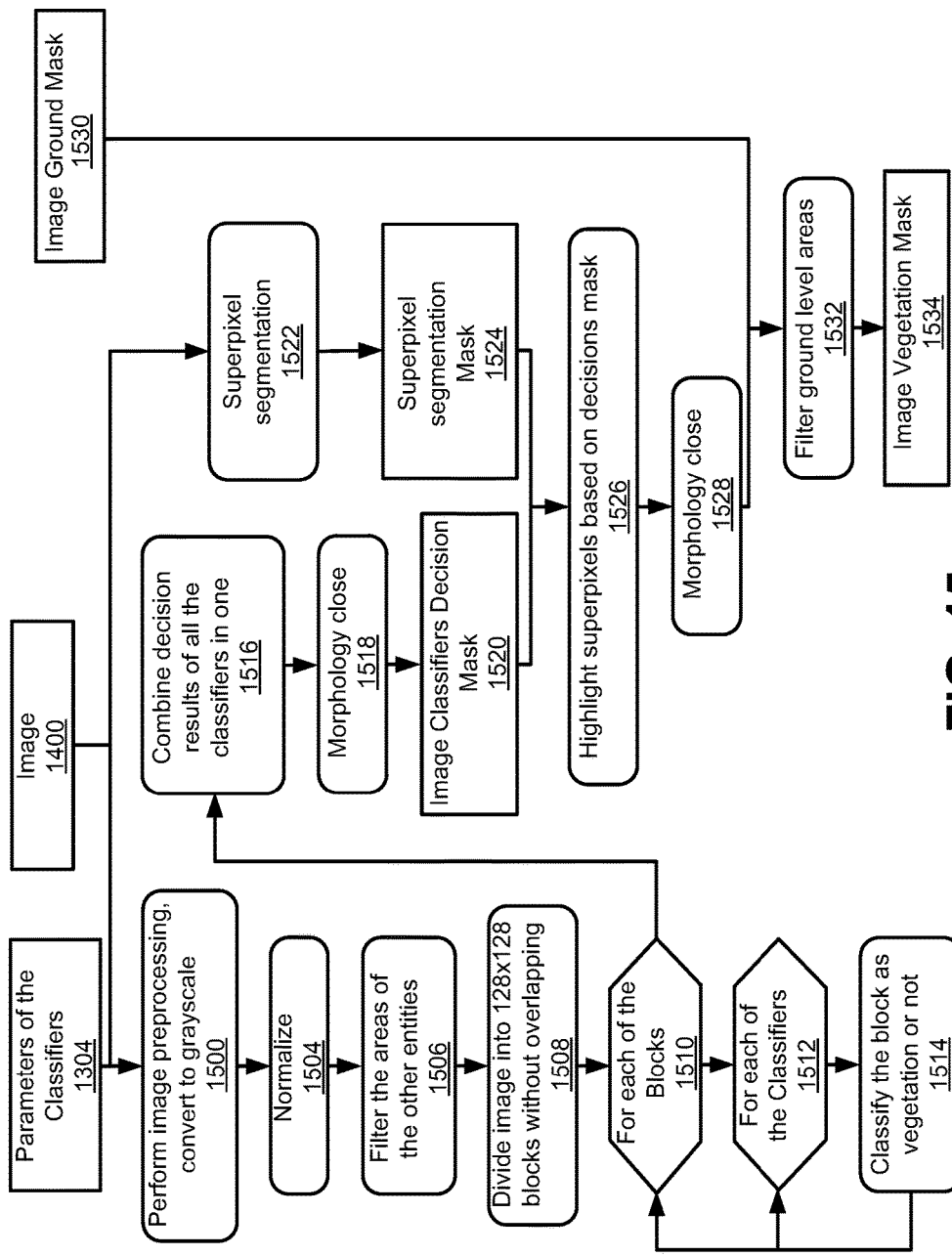
FIG. 15 illustrates vegetation detection and vegetation mask generation for the entity recognizer, according to an example of the present disclosure.

Entity Recognizer 124 (Entity Detector 126)—Vegetation Detection and Vegetation Mask Generation FIG. 15 illustrates vegetation detection and vegetation mask generation for the entity recognizer 124, according to an example of the present disclosure.

Referring to FIGS. 1 and 15, at block 1500, the entity detector 126 may receive the parameters of the classifiers 1304, and an image (of the images 104) 1400. At block 1500, the entity detector 126 may perform image preprocessing, for example, by converting the image to grayscale. With respect to vegetation detection and vegetation mask generation for winter and spring, the entity detector 126 may, for example, determine HOG and LBP features for the image and use a fully supervised learning framework for entities recognition. Next, the entity detector 126 may remove the area outside of the ROI from the preprocessed results. According to an example, the entity detector 126 may preprocess an image from RGB to grayscale, for example, emphasizing the green color for the summer season (e.g., input=R−0.5*(G+B)).

At block 1504, the entity detector 126 may normalize data related to the image at block 1500. With respect to vegetation detection and vegetation mask generation for winter and spring, the entity detector 126 may utilize a normalized green channel, where normalization may be performed by scaling the channel average, for example, to be 128. According to an example, the entity detector 126 may normalize luminance (e.g., normalized=input*128/mean(one_layer)).

At block 1506, the entity detector 126 may filter the areas of the other entities (e.g., non-vegetation entities). The entity detector 126 may generate a binary mask of an area for searching for vegetation, excluding infrastructure entity area, objects area, and area out of the ROI.

At block 1508, the entity detector 126 may divide the image 1400, for example, into K×K blocks without overlapping. At block 1510, for each of the K×K blocks at block 1508, and at block 1512, for each of the classifiers, at block 1514, the entity detector 126 may classify each of the K×K blocks as vegetation or not vegetation. With respect to vegetation detection and vegetation mask generation for winter and spring, according to an example, the processing may be performed for each block by first executing the classifiers for the blocks which have a sufficient number of edges inside the region (e.g., vegetation should have several edges). The ridges may be checked from the Laplace results. The classifiers may also ignore blocks, which are considered ground. In this case, to be considered not ground means that a difference of heights for this block is more than a minimum height of a tree, or the block has a sufficient number of high points (mean value of 0-255 notGround mask>64) to include an altitude-stable trees area. Each classifier may provide vegetation probability. The classifier with HOG features may be separately executed for a block. If the probability is sufficiently high, then LBP classification may provide a second probability. If both classifiers predict that the block is vegetation, then the block may be preliminary designated as vegetation. A block area may be considered vegetation if a mean of the Laplace of this area is more than a predetermined value, and classifiers with LBP and HOG features consider this area as vegetation.

With respect to vegetation detection and vegetation mask generation, vegetation classifiers may be trained as described above. Several classifiers may be used, and classifiers may be trained for each season. In order to obtain an optimal classifier, the training data may include approximately the same amount of positive and negative samples.

At block 1516, the entity detector 126 may combine decision results of all of the classifiers in one decision result.

At block 1518, the entity detector 126 may apply morphology close. With respect to vegetation detection and vegetation mask generation, a classifier may not accurately classify a block. In order to address any inaccuracies, the entity detector 126 may use morphological operations. If the surrounding blocks are classified as vegetation, then the block in the middle may also likely be vegetation. In this regard, morphology closing and morphology dilation may be used to correct any miss-predicted blocks. Infrastructure entity and object areas may be eroded (e.g., by morphology erosion) before exclusion from a search region. The entity detector 126 may apply morphology on the image, and then apply blurring.

At block 1520, the entity detector 126 may generate an image classifiers decision mask as an image vegetation mask.

At block 1522, the entity detector 126 may perform superpixel segmentation, and based on a decisions mask, the entity detector 126 may select superpixels, which are vegetation.

At block 1524, the entity detector 126 may generate a superpixel segmentation mask.

At block 1526, the entity detector 126 may select superpixels based on a decisions mask.

At block 1528, the entity detector 126 may perform morphology close.

At block 1532, the entity detector 126 may receive an image ground mask 1530 and the morphology close results of block 1528 to filter ground level areas. Further, the entity detector 126 may delete areas outside the search area from the vegetation mask, and add a final vegetation mask to the image mask.

The entity detector 126 may generate an image vegetation mask 1534

Entity Recognizer 124 (Entity Detector 126)—Superpixel Implementation

The entity detector 126 may map a preliminary classification into superpixels, and classify which superpixels belong to a class based on the preliminary classification. With respect to classification of superpixels to a class, an image may be divided into regions of superpixels. The entity detector 126 may collect relevant information about the superpixels. The division into superpixels may be based on RGB-image. The entity detector 126 may use an altitude image to collect some of the information into a superpixel class. The superpixel class may include a set of vectors listing the mean and maximum altitude of each superpixel, the left and right most column, and the top and bottom most rows. For each superpixel, the class may also list its neighbor superpixels in a vector.

The entity detector 126 may analyze the superpixels and generate a rectangle around the superpixel area. The entity detector 126 may determine how much preliminary classification overlaps with the superpixel rectangle (i.e., mean of the reference). If the overlap is sufficiently strong, then the superpixel may be positively classified.

If the altitude information is used in classification, an additional verification may be performed after the classification. The additional verification may be used to identify superpixels which are high from the ground inside a wide object (e.g., for example a large house). Those superpixels may be surrounded by high superpixels and may have been misclassified. If the overlap is sufficiently strong, and the neighboring superpixels are positively classified, then the superpixel may also be positively classified.

Figure 16:
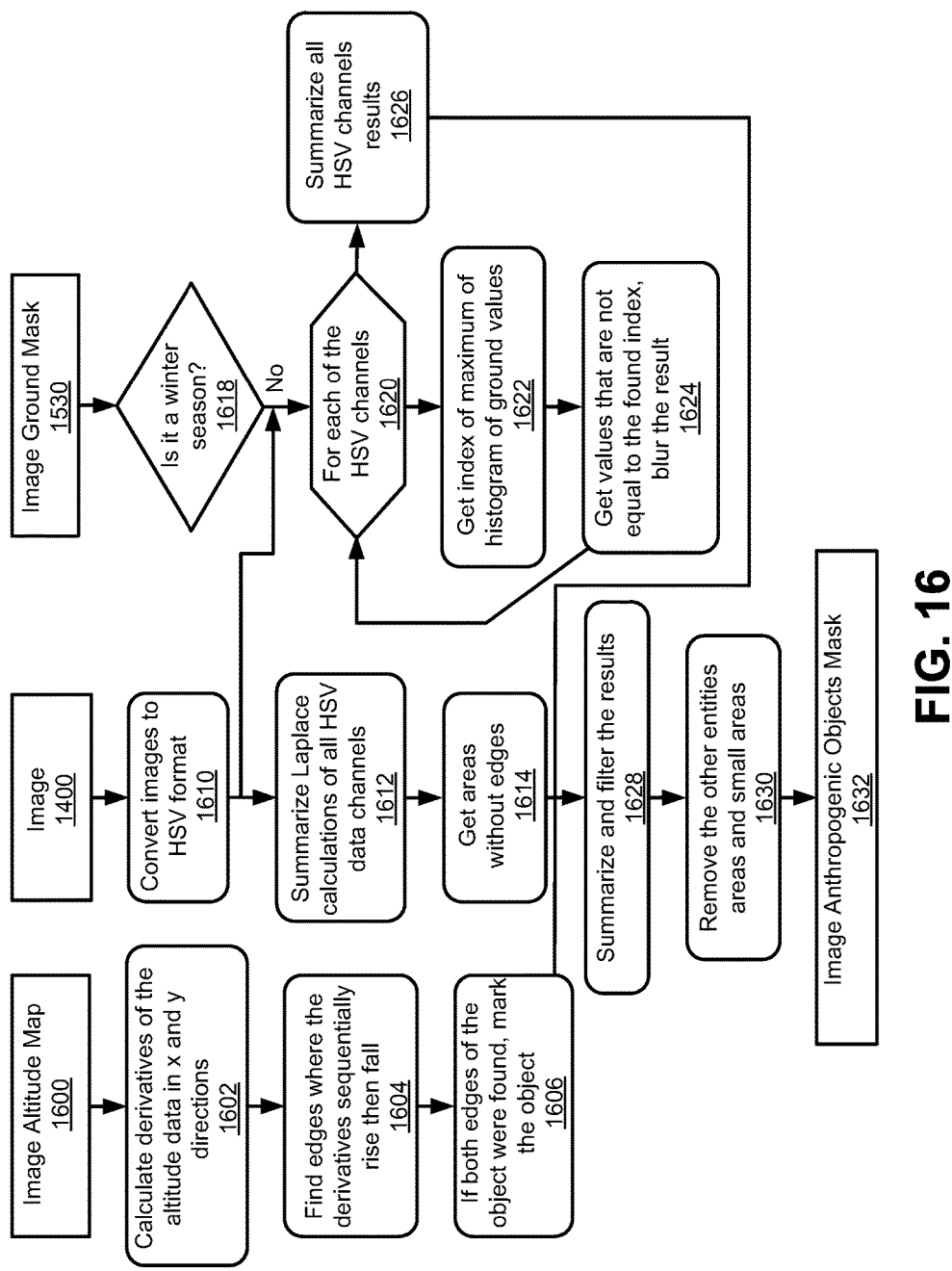
FIG. 16 illustrates unknown object detection and unknown object mask generation for the entity recognizer, according to an example of the present disclosure.

Entity Recognizer 124 (Entity Detector 126)—Anthropogenic Object Detection and Anthropogenic Object Mask Generation FIG. 16 illustrates anthropogenic object detection and anthropogenic object mask generation for the entity recognizer 124, according to an example of the present disclosure. With respect to anthropogenic object detection and anthropogenic object mask generation, the entity detector 126 may perform object detection for all seasons (e.g., summer, winter). The anthropogenic objects may generally include any type of object that may pose a risk against a monitored infrastructure entity (e.g., building, people, cars, etc.). Different techniques for anthropogenic objects detection may be used for different seasons.

With respect to anthropogenic object detection and anthropogenic object mask generation for the winter season, the winter season object detection process may be based on the assumption that generally everything is covered in snow, and therefore real colors of the objects are not visible and only the edges of the objects may be detected. The all seasons object detection process may also account for color information.

For the winter season object detection process, since relatively small objects may be ignored, the winter season object detection process may decrease the resolution of an image to decrease processing time related to images. The entity detector 126 may smooth a color image, and extract edges and ridges from the image. Edge detection may be performed separately for each color using a Canny or Sobel edge detector and ridge detection—using Laplace-based ridge detection. The entity detector 126 may remove unclear edges by using a threshold-based approach. For infrastructure entities (e.g., towers, buildings, etc.), an infrastructure entity region and an area outside of the ROI may be removed from preprocessed results. Assuming that human-made objects generally include straight lines, the entity detector 126 may detect lines by, for example, short straight line detection techniques. Further, the entity detector 126 may generate rectangles around the area of each line.

For the winter season object detection process, the entity detector 126 may count a number of edges from the rectangles. If the rectangles include too many edges, then the line may be determined to belong, for example, to vegetation. If the rectangles include too few edges, then the line may be determined to be an isolated line, and not part of any construction.

For the winter season object detection process, the entity detector 126 may generate superpixels from an image. The superpixels, which include part of the previously generated line rectangles, may be classified as belonging to an object. A preliminary object mask may be generated based on the classification.

For the winter season object detection process, the entity detector 126 may also perform morphology dilation on the preliminary classification in order to smooth the classification result. Further, infrastructure entities, vegetation, etc., and the area outside of the ROI may be removed from the preprocessed results so that each area is classified only to one class.

With respect to anthropogenic object detection and anthropogenic object mask generation for all other seasons (e.g., spring, summer, fall), the entity detector 126 may determine areas of objects by using color information, by using edges and altitude data, and by identifying areas where the color is relatively different than the most common color of the ground.

Referring to FIGS. 1 and 16, in order to generate an unknown object mask, the entity detector 126 may receive an image altitude map (e.g., of the images altitude maps 410) 1600.

At block 1602, the entity detector 126 may determine derivatives of the altitude data in x and y directions. The entity detector 126 may scale altitude data, for example, from 0 to 255 inclusively, and determine derivatives in x and y directions using, for example, a Sobel operation or finite difference scheme derivation.

At block 1604, the entity detector 126 may determine edges where the derivatives sequentially rise and then fall. In this regard, the entity detector 126 may analyze an image in vertical and in horizontal directions sequentially, and identify those non-zero Laplace areas where altitude rises or falls. If a fall is determined, a raised edge may be searched for in the nearest area. According to an example, this area may be limited, for example, to twenty meters (as a maximum length of any object to be identified).

At block 1606, if both edges of the object are located, the entity detector 126 may mark the object.

For the image (of the images 104) 1400, at block 1610, the entity detector 126 may convert the image to Hue-Saturation-Value (HSV) format. The entity detector 126 may resize a color image to the size of altitude data, and perform median blurring. As described herein, the entity detector 126 may extract ridge lines using, for example, Laplace operator.

At block 1612, the entity detector 126 may summarize Laplace calculations of all HSV data channels. The entity detector 126 may blur each channel, and extract ridges by Laplace operator. For example, for winter, the Laplace based techniques may use Value-channel (luminance) value, or every channel of the image as input.

At block 1614, the entity detector 126 may determine areas without edges. The entity detector 126 may determine areas without edges by threshold, dilate, and median blurring operations.

For the image ground mask 1530, at block 1618, the entity detector 126 may determine whether the season is a winter season. In response to a determination at block 1618 that the season is a winter season, the analysis related to blocks 1620, 1622, and 1624 as described below may not be performed.

The entity detector 126 may identify areas for which the color is relatively different than the most common color in the ground. In this regard, the image may be converted to a HSV format, and each channel may be processed. In response to a determination at block 1618 that the season is not a winter season, for each of the HSV channels at block 1620, at block 1622, the entity detector 126 may determine an index of maximum of histogram of image channel values at ground areas, and at block 1624, the entity detector 126 may determine values that are not equal to the found index, and blur the result.

At block 1626, the entity detector 126 may summarize all HSV channels results.

At block 1628, the entity detector 126 may receive the results from blocks 1606, 1614, and 1626, and summarize and filter the results. The results may be smoothed by median blurring. With respect to anthropogenic object detection and object mask generation for all other seasons, the entity detector 126 may determine the object mask by adding the aforementioned results together.

At block 1630, the entity detector 126 may remove the other entities areas and relatively small areas. Further, the entity detector 126 may remove the vegetation, tower, and out-of-ROI areas. The entity detector 126 may also remove objects that are too small or too large by using a shape classification operation.

The entity detector 126 may generate an image anthropogenic objects mask 1632.

Entity Recognizer 124—Regions Creation

Figure 17:
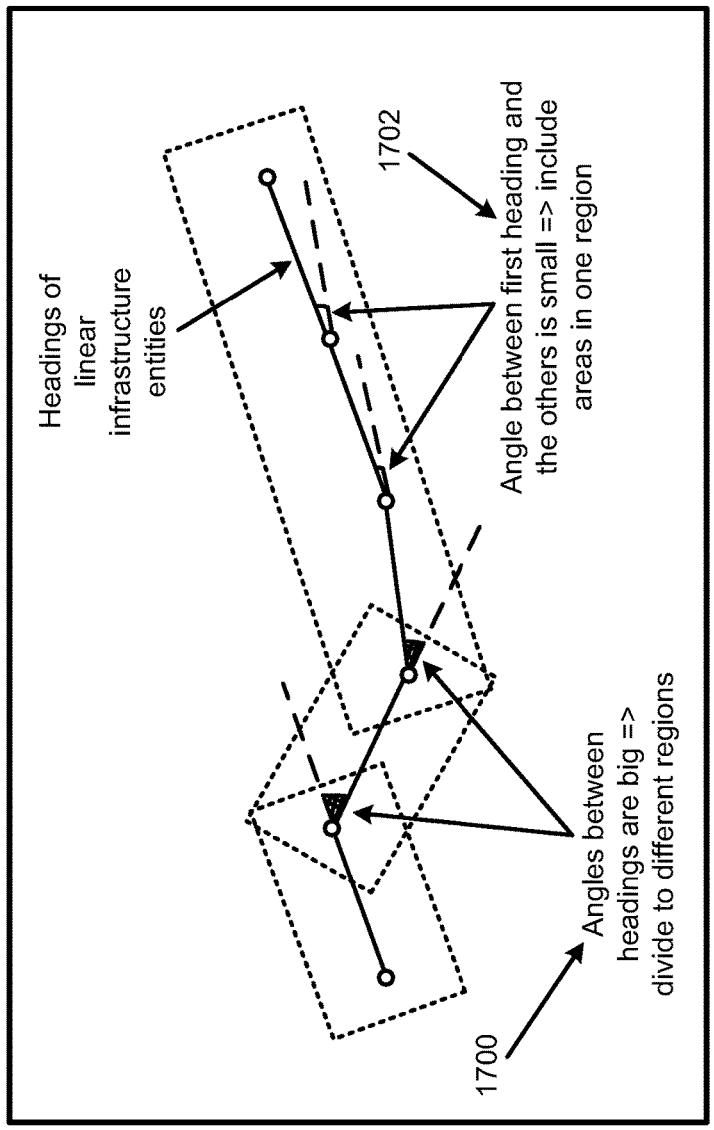
FIGS. 17 and 18 illustrate regions creation for the entity recognizer, according to an example of the present disclosure.
Figure 18:
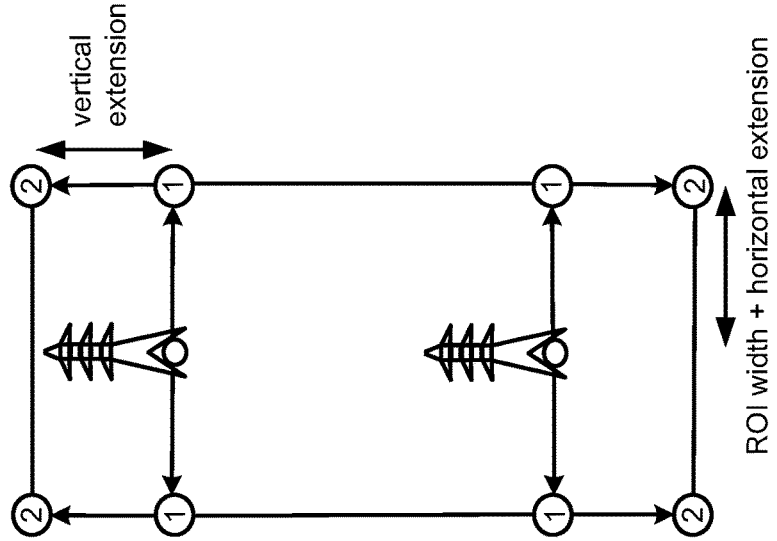

FIGS. 17 and 18 illustrate regions creation for the entity recognizer 124, according to an example of the present disclosure.

Referring to FIGS. 1, 17, and 18, with respect to region processing, the entity detector 126 may generate regions by identifying all of the infrastructure entities (e.g., towers, pipelines, buildings, etc.), and establishing regions around the infrastructure entities. The entity detector 126 may execute the image-based detection processes (e.g., line, vegetation, and object detection), and the entity region consolidator 128 may map the results to the region masks.

With respect to generation of regions, the entity region consolidator 128 may establish start and end entities. For the example of the aerial monitoring of towers, the entity region consolidator 128 may establish start and end towers so that the electric lines are directly inside a region. The region may be limited, for example, based on infrastructure entity (e.g., tower) detection results. If an infrastructure entity is either detected or missed, since there are images near the infrastructure entity, the region including the infrastructure entity may be processed.

With respect to region processing, a C++ region class may be responsible for allocating region matrices, determining transformation matrices between region pixels and GPS coordinates, mapping the image-based recognition results into a region, and consolidating the results from various images into one of the region matrices.

Referring to FIGS. 1 and 17, if angles between headings are sufficiently large, the areas may be divided into regions as shown at 1700. If the angles between a first heading and other headings are relatively small as shown at 1702, then the areas may be included in one region.

Referring to FIGS. 1 and 18, with respect to a C++ region class related to region processing, the entity region consolidator 128 may first establish the corner points of the region based on the starting position (e.g., a starting infrastructure entity, such as a starting tower), ending position (e.g., an ending infrastructure entity, such as an ending tower), ROI, and extension constants. For example, FIG. 18 illustrates determination of region corner points, according to an example of the present disclosure. As shown in FIG. 18, for the example of the aerial monitoring of towers, the corner points may be determined in two stages, the example results of first and second stages are marked in FIG. 18 with "1" and "2" correspondingly. During the first stage, the entity region consolidator 128 may determine the points that are located at a distance of ROI width plus horizontal extension from the starting and ending infrastructure points of a region, at the perpendicular to the straight line between starting and ending infrastructure points. During the second stage, the corner points may be extended to include some overlap between regions to avoid omitting objects residing close to an infrastructure entity (e.g., a tower). The entity region consolidator 128 may determine the final region corner points "2", by locating the points at a distance of vertical extension from the points "1" at a line parallel to the straight line between starting and ending infrastructure points.

With respect to a C++ region class related to region processing, the entity region consolidator 128 may determine transformation matrices from GPS to region pixel (and vice versa). The entity region consolidator 128 may use, for example, Affine Transformation, or other such techniques to determine the transformation matrices. With respect to the transformation matrices, based on the counting of the GPS positions of the corner points for the region, in order to minimize rounding error in the transformation, the GPS coordinates may be transferred to local region coordinates where the origin is the top-left corner for the region without extension.

The configuration of the entity region consolidator 128 may define the accuracy of the region mask. The width and height of the region mask (and pixel values of the corner points) may be counted based on the accuracy and the region corner points. The region corner points may be determined based on this width and height of the region mask.

Entity Recognizer 124—Region Consolidation

Figure 19:
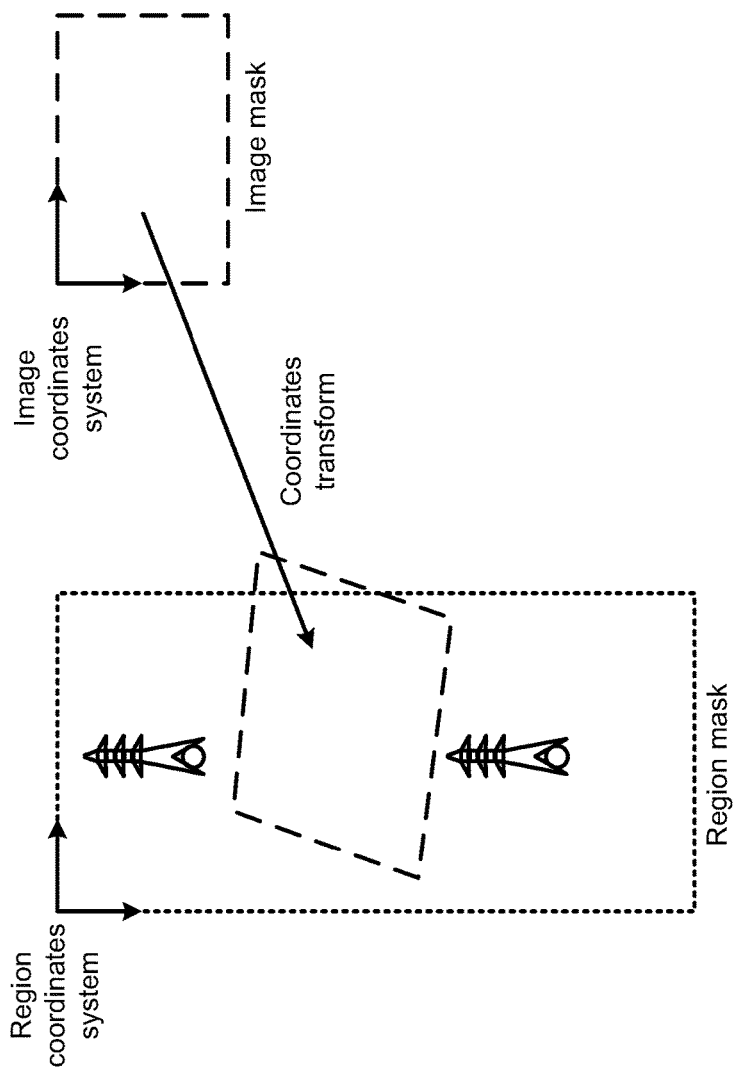
FIG. 19 illustrates region consolidation for the entity recognizer, according to an example of the present disclosure.

FIG. 19 illustrates region consolidation for the entity recognizer 124, according to an example of the present disclosure.

Referring to FIGS. 1 and 19, region consolidation for the entity recognizer 124 may include mapping of the image processing results to the region area, by counting of transformations of local image coordinates to local region coordinates, based on images GPS alignment data and regions GPS alignment data.

With respect to a C++ region class related to region processing, the entity region consolidator 128 may allocate region matrices. The region matrices may include a mask region matrix, an altitude region matrix, a ground region matrix and a transformed pixels number region matrix.

The mask region matrix may include, for example, four channels (consolidated/final result, infrastructure entity (e.g., tower) detection count, vegetation detection count, and objects detection count). The three count channels may include the sum of all the positive classifications collected from different images to the specific region pixel.

The altitude region matrix may include, for example, two channels (running average of altitude counts for the region pixel, and the count of altitude values collected for the pixel). The count of altitude values may be used to maintain the running average.

The ground region matrix may include, for example the count of positive ground classifications. The transformed pixels number region matrix may include, for example, the number of all image pixels that were mapped to each region pixel.

With respect to a C++ region class related to region processing, the entity region consolidator 128 may map the image based results into the region matrices. The image entities masks, image altitude maps, and image ground classification masks may be median filtered. Based on the filtering results, the entity region consolidator 128 may select sequential samples which represent the median value of the surrounding area. For example, every $5^{th}$ pixel of every $5^{th}$ row of the image may be selected to be processed.

For each selected pixel, the entity region consolidator 128 may ensure that the pixel is inside the image ROI to skip processing of unnecessary details. The selected pixels image coordinates may be transformed to pixel positions in region matrices by first transforming the image pixel coordinates to GPS position, and then transforming the GPS position to region pixel coordinates using the region's Affine transformation. The entity region consolidator 128 may further ensure that the resulting region pixel coordinates are inside the region mask.

With respect to processing of images, for each processed and transformed pixel, the positive image-mask classification result may increment the corresponding region pixel value in the region mask channel. For the example of the aerial monitoring of towers, if the image pixel has been classified as a tower, then the corresponding region pixel in the tower channel of the corresponding region mask pixel may be incremented by one.

With respect to processing of images, for each processed and transformed pixel, altitude information from the image-based altitude map may be added to the running average determination of the corresponding altitude region pixel. For example, if y is the running average (or modified moving average), n is the number of altitude values available for the region altitude pixel, and x is the pixel value in image-based altitude map, then the running average y may be determined as follows:

$$y_{n+1} = \frac{(n-1)y_n + x}{n} \qquad \text{Equation (26)}$$

For Equation (26), $y_n$ may represent the average of n elements.

With respect to processing of images, for each processed and transformed pixel, ground classification may also be updated. If the pixel has been classified as being at the ground level, the positive (e.g., being at the ground level) ground classification count may also be incremented.

With respect to processing of images, for each processed and transformed pixel, the value of corresponding region pixel in the transformed pixels number region matrix may be incremented.

With respect to a C++ region class related to region processing, the entity region consolidator 128 may consolidate the classification results of different images into a final region classification result. In this regard, the entity region consolidator 128 may perform median filtering for each channel to smooth outlier pixels, if for example all of the images have skipped one pixel. The entity region consolidator 128 may evaluate all of the pixels, determine a weighted probability of different classification options for the pixels, and select for each pixel the classification option with the highest score. The ground consolidation may select the most frequently occurring option.

With respect to region processing, the entity region consolidator 128 may use learning classifier implementation to generate automated feedback for the vegetation classifiers in order to re-train the vegetation classifiers. In this regard, the image area may be extracted from the consolidated region mask, and the entity region consolidator 128 may perform retraining of the classifiers using the extraction.

Three-Dimensional Curve Reconstructor

The three-dimensional curve reconstructor 130 may use the images entities masks, infrastructure GPS location data, images GPS alignment data, and regions GPS alignment data to build parametrized 3D representation models for some types of the entities. For the example of the monitoring of electric towers and power lines, the three-dimensional curve reconstructor 130 may use images power lines masks, towers GPS location data, images GPS alignment data, and regions GPS alignment data to build the equations which determine the location of each power line.

The three-dimensional curve reconstructor 130 may perform its operations in a coordinate system which preserves the real-world straight lines. For example, the coordinate system may be the geodetic ECEF coordinate system, or the regions' coordinate system, or another coordinate system with similar characteristics.

Figure 20A:
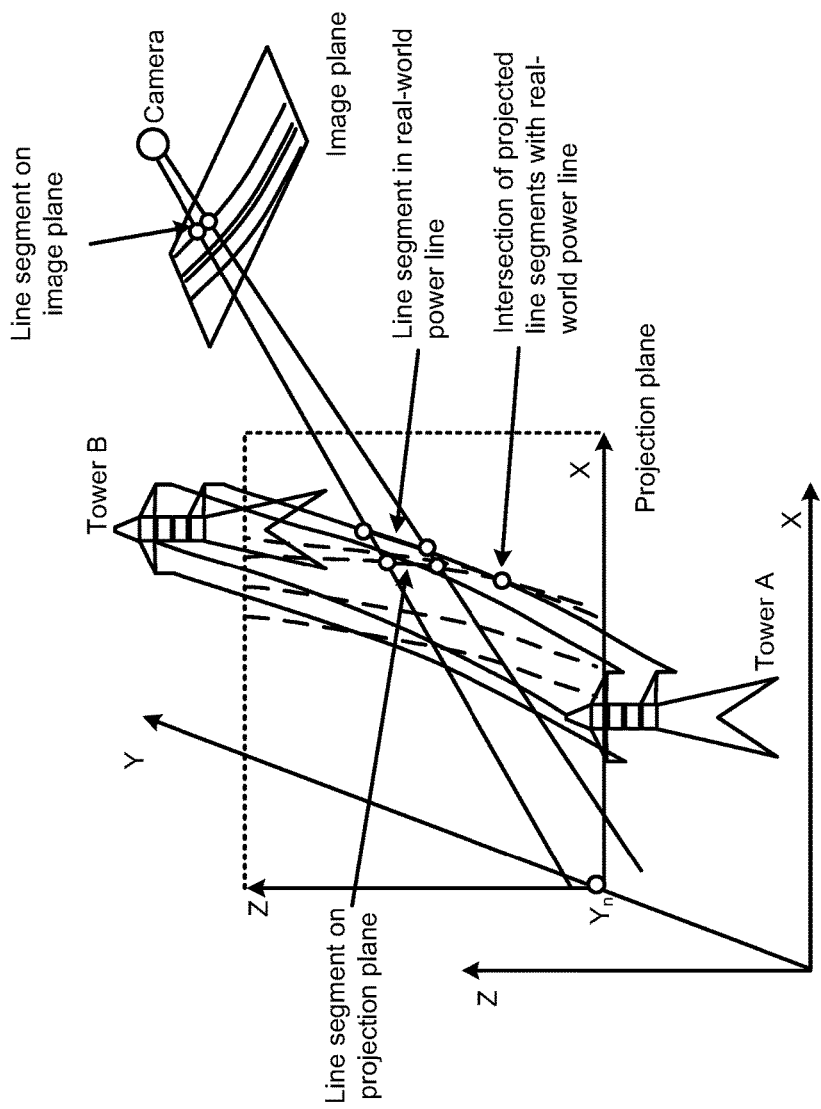
FIGS. 20A-20C illustrate a three-dimensional curve reconstructor for the condition detection using image processing system of FIG. 1, according to an example of the present disclosure.

For the example of power lines reconstruction, for the lines between each pair of towers, the coordinate system of the containing region may be used. In a region coordinate system, the power lines may be stretched along the Y axis, as illustrated in FIG. 20A. The positions of the towers ($X_A$, $Y_A$, altitude$_A$, and $X_B$, $Y_B$, altitude$_B$) may be derived from the towers' GPS locations and region GPS alignment data. The three-dimensional curve reconstructor 130 may then define the projection planes between the towers in the region coordinate system, on which the power lines located in the images may be projected. Each projection plane may include a fixed Y coordinate in region coordinate system, and the same X and Z (altitude or height) axes as in the region coordinate system. The fixed Y coordinates of projection planes may be uniformly distributed between the Y coordinates of the towers. The number of projection planes may be determined by a system parameter. The images, which include the power lines between selected towers, that should be projected on the projection planes, may be determined by checking their intersection with the region in the same manner as for the regions' creation.

In order to project the power lines detected in images to the defined projection planes, the line connecting camera position and power line pixel in the image plane may be determined for each or some of the line pixels. In order to determine this line's equation, some random point on this line, different from the camera position, may be determined in the similar way as during the usage of image GPS alignment data. The camera position ($X_0$, $Y_0$, $altitude_0$) and random point position ($X_1$, $Y_1$, $altitude_1$) in the region coordinate system may be derived from the image GPS alignment data and region GPS alignment data. For each such line, intersection coordinates with projected plane may be determined as follows:

$$t = \frac{Y_{fixed} - Y_0}{Y_1 - Y_0} \quad \text{Equation (27)}$$

$$altitude_{intersection} = (altitude_1 - altitude_0) * t + altitude_0 \quad \text{Equation (28)}$$

$$X_{intersection} = (X_1 - X_0) * t + X_0 \quad \text{Equation (29)}$$

The intersection points with too small or too high coordinates may be filtered to reduce the processing time. The neighbor intersection points may be connected by the line segments in the same way as they were connected in the initial images. After processing all of the images in the described manner, the projection plane may include the projections of all of the detected power lines, each in the form of a plurality of line segments.

Figure 20B:
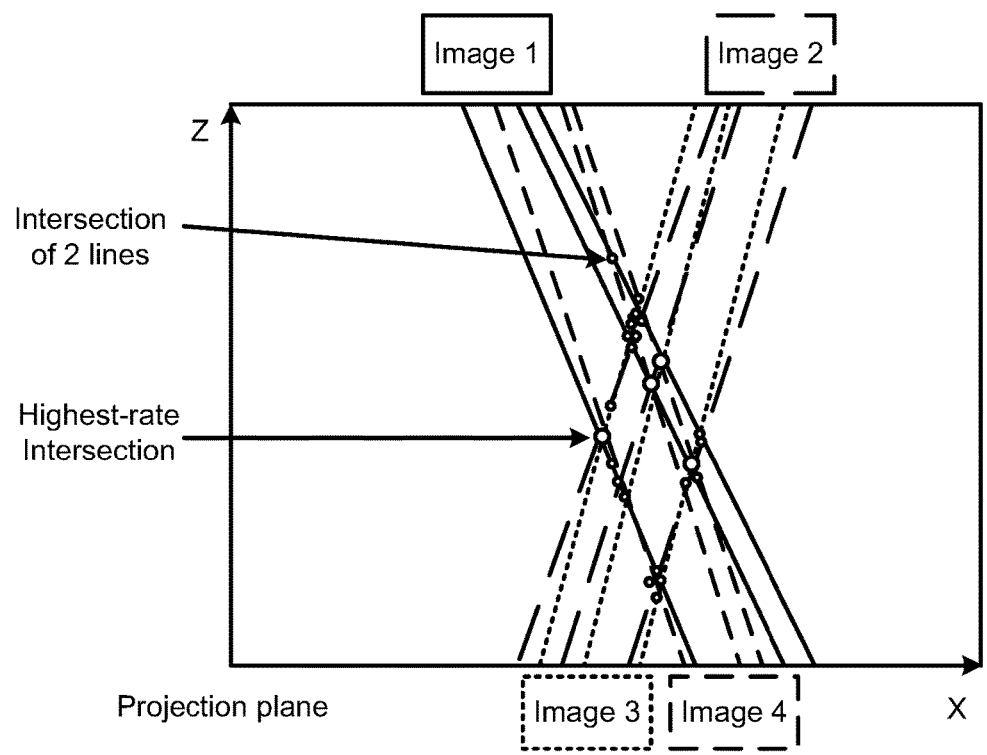

As illustrated in the FIG. 20B, in each projection plane, the lines from different images may intersect between each other, thus forming a set of points, where each point is an intersection between two lines. The real-world power lines may be located near the points where the most number of such intersections occur. In order to determine these points, each line's intersections with other lines may be analyzed. The intersections may be sorted by their altitude coordinates, and the longest sequence of the elements with small distances between each other (less than predetermined threshold) may be selected. The mean coordinates of this sequence's elements' coordinates may form the highest-rate intersection for each line.

Figure 20C:
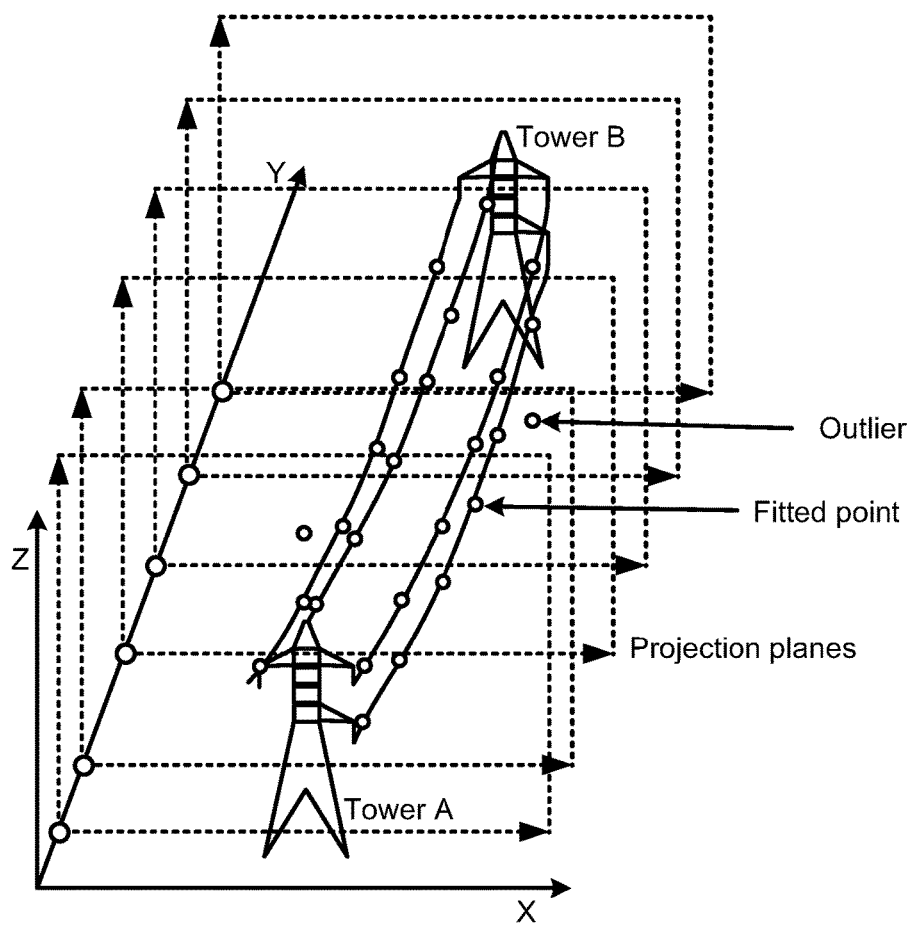

The highest-rate intersections inside the projection planes may form the point cloud, situated between the towers, as illustrated in the FIG. 20C. The point cloud's points may be fitted with two equations for each curve being detected. One equation may reflect the curve view from the top of the scene and reflect the dependence of X coordinate to the Y coordinate, and take the form of a linear equation. The second equation may reflect the dependence of curve's altitude to Y coordinate, and take the form of either a hyperbolic cosine line equation, or a parabolic line equation. In order to select the points that may be fitted with these two equations, the point cloud may first be transformed into a graph representation. The points may become the vertices, and the edges may be added for the points in the consecutive projection planes with small differences in X and altitude coordinates (less than predetermined thresholds). The points from non-consecutive projection planes may also be used to eliminate the possible gaps in the graph.

Inside the resulting graph, the connected components may be selected to produce the fitting lines. The connected components with the biggest number of points and/or with the longest length along the Y axis may be selected for the subsequent calculations. Inside each connected component, some number of random edges ("seeds") may be selected. The number of seeds may be a predetermined parameter. For each seed, the random adjacent edge may be determined for each of the seed's two vertices. The same procedure may be applied to the selected edges in a loop, until reaching the vertices from projection planes with minimum and maximum fixed Y coordinates. For each set of edges, derived from the initial seed, the vertices may be used for fitting to the curves. To fit the first equation (x=k*y+t), linear regression may be applied as follows:

$$k = \frac{\sum_{i=1}^{N}(X_i * Y_i) - \sum_{i=1}^{N} Y_i * \sum_{i=1}^{N} X_i / N}{\sum_{i=1}^{N}(Y_i^2) - \left(\sum_{i=1}^{N} Y_i\right)^2 / N} \quad \text{Equation (30)}$$

$$t = \frac{\sum_{i=1}^{N} X_i - k * \sum_{i=1}^{N} Y_i}{N} \quad \text{Equation (31)}$$

To fit the second equation (altitude=a*y²+b*y+c), linear regression may also be applied as follows:

$$Y = \begin{bmatrix} Y_1^2 & Y_1 & 1 \\ \vdots & \vdots & \vdots \\ Y_N^2 & Y_N & 1 \end{bmatrix} \quad \text{Equation (32)}$$

$$A = \begin{bmatrix} altitude_0 \\ \vdots \\ altitude_N \end{bmatrix} \quad \text{Equation (33)}$$

$$\begin{bmatrix} a \\ b \\ c \end{bmatrix} = (Y^T * Y)^{-1} * Y^T * A \quad \text{Equation (34)}$$

The resulting equations may then be re-fitted, using the points from the point cloud that are situated within the predetermined distance to the first estimated curve. Then the resulting fitted curves may be filtered. The curves with similar resulting parameters may be merged, or, for example, the curves may be processed one by one to determine the "best" curves. During each processing step, the curve with the most number of the points within the predetermined distance may be selected, and these points within the predetermined distance from a line may be deleted from the point cloud. In this manner, the nearby curves may not be selected during next iterations. All of the curves that would turn out to have too small a number of points after several iterations may be discarded. The points in the point cloud that weren't fitted by any lines may be considered outliers.

The resulting fitting curves may then be further filtered. For example, the three-dimensional curve reconstructor 130 may discard the curves that are situated far from the tower, or the curves that do not comply with the results from the neighbor segment between the towers. The plan of mounting power lines to the tower may also be used for the same purpose, if provided by a client system.

The resulting curves' parameters for each curve may be saved in a separate TXT file for each consecutive pair of towers. These parameters may later be used in the risks analyzer 132 of the system 100. The power line region masks may also be updated, according to the determined precise positions of power lines. For each pair of towers, the area limited by straight line equations and tower positions may be considered as the area of the power lines.

Risks Analyzer 132—Risks Analyzer Data Flow

Figure 21:
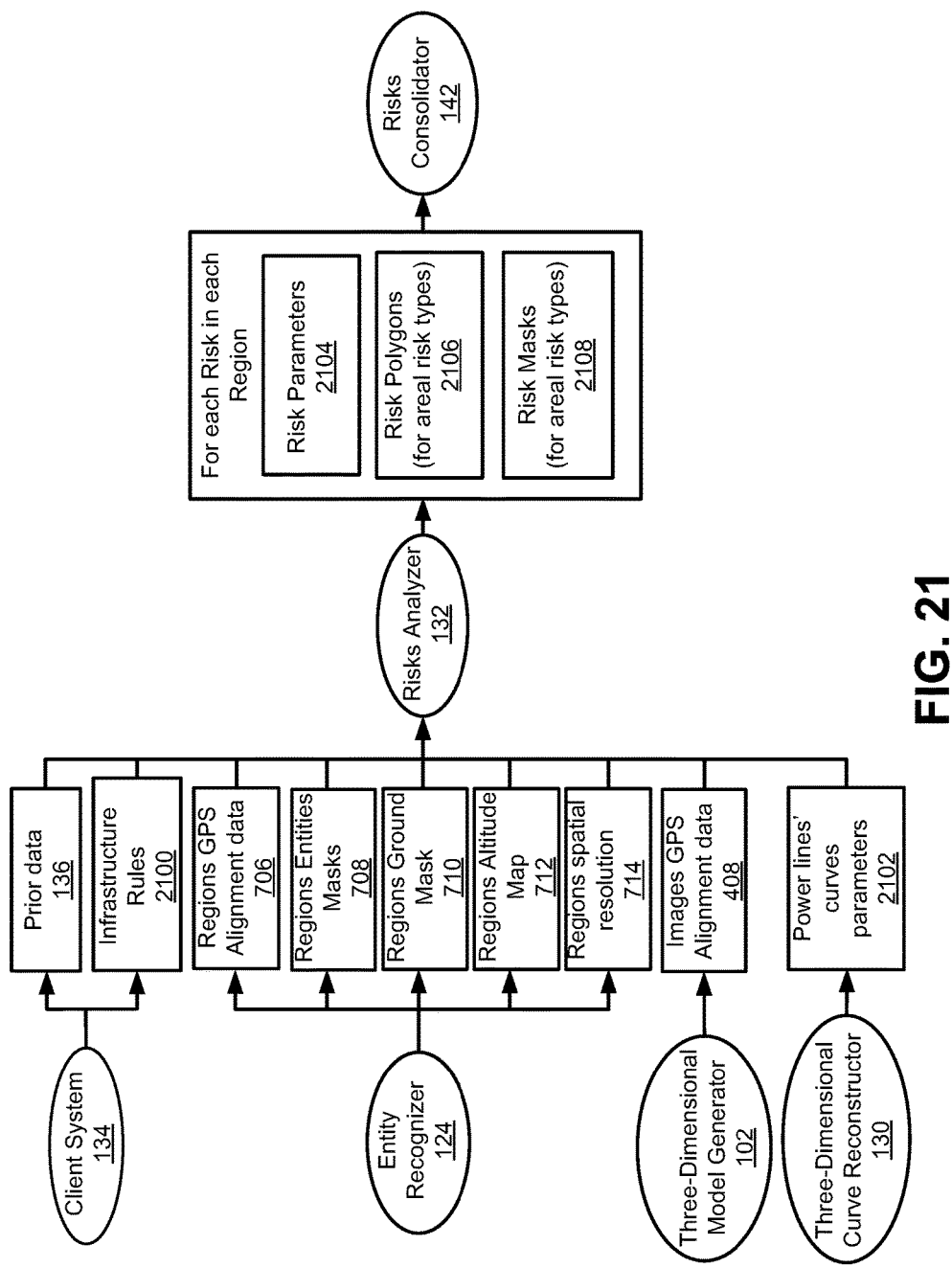
FIG. 21 illustrates risks analyzer data flow for a risks analyzer of the condition detection using image processing system of FIG. 1, according to an example of the present disclosure.

FIG. 21 illustrates risks analyzer data flow for the risks analyzer 132 of the system 100, according to an example of the present disclosure.

Referring to FIGS. 1 and 21, the risks analyzer 132 may analyze the prior data 136, infrastructure rules 2100, the regions GPS alignment data 706, the regions entities masks 708, the regions ground mask 710, the regions altitude map 712, the regions spatial resolution 714, the images GPS alignment data 408, and for the example of the aerial monitoring of towers, power lines' curves parameters 2102, to generate risk parameters 2104, risk polygons 2106, and risk masks 2108 for each risk in each region. The risk parameters 2104, the risk polygons 2106, and the risk masks 2108 may be forwarded to the risks consolidator 142 for further analysis.

Referring to FIGS. 1 and 21, with respect to risk assessment, the risks analyzer 132 may generally detect risks that include tall trees in the ROI that may fall under or over the electric lines (e.g., for the example of the aerial monitoring of power lines), vegetation in the RoW, tall anthropogenic objects in the ROI (in the RoW, or close to the RoW), anthropogenic objects, and/or vegetation under the electric lines (e.g., for the example of the aerial monitoring of power lines), identify whether there are missing power lines between the towers (e.g., for the example of the aerial monitoring of power lines), and measure minimum clearance of power lines (e.g., for the example of the aerial monitoring of power lines).

With respect to risk analytics, the risks analyzer 132 may generally receive as input, for each region, associated region IDs, altitude maps, ground masks, region alignment data, power lines three-dimensional curve parameters, and entities masks (e.g., vegetation, infrastructure entities (e.g., electric lines, towers, building, etc.), anthropogenic objects)). According to an example, the infrastructure rules 2100 may include RoW width, maximum allowed height for various non-infrastructure entities and distance from infrastructure entities thresholds, which may be in meters. The risks analyzer 132 may also receive as input an output report for detection results that includes GPS and/or region local coordinates of infrastructure entities, assumed number of input and output electric lines for each infrastructure entity (e.g., for the example of the aerial monitoring of towers), and spatial resolution (cm per pixel) for each region. The risks analyzer 132 may further receive as input the prior data 136 (e.g., risks information (type of risk, coordinates, region mask of areal risks, heights, area, etc.)), and the user feedback 138 (e.g., risk type and ID, incorrectly found, resolved risk, maintenance date and cost, etc.).

Risks Analyzer 132—Areal Risks Assessment

Figure 22:
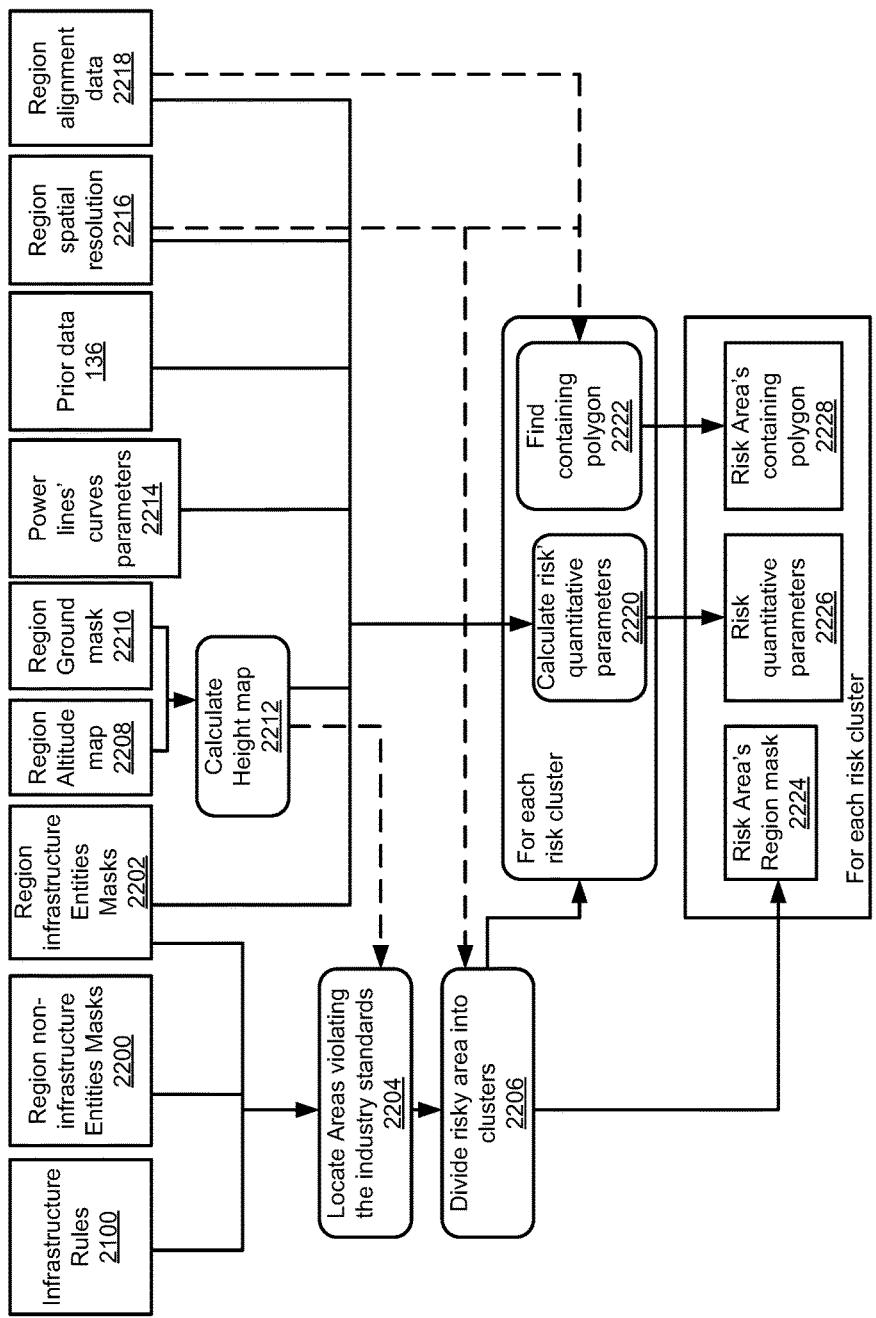
FIGS. 22-24 illustrate areal risks assessment for the risks analyzer, according to an example of the present disclosure.
Figure 23:
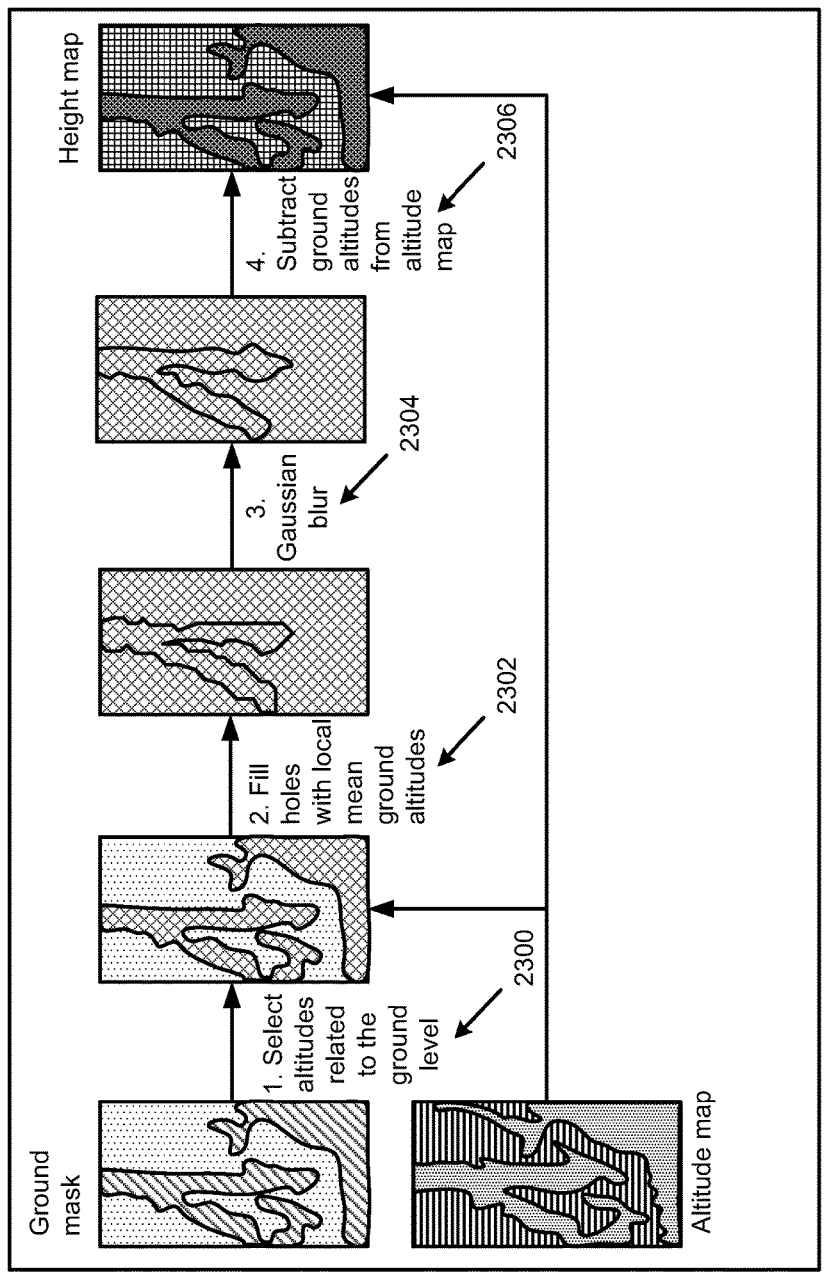
Figure 24:
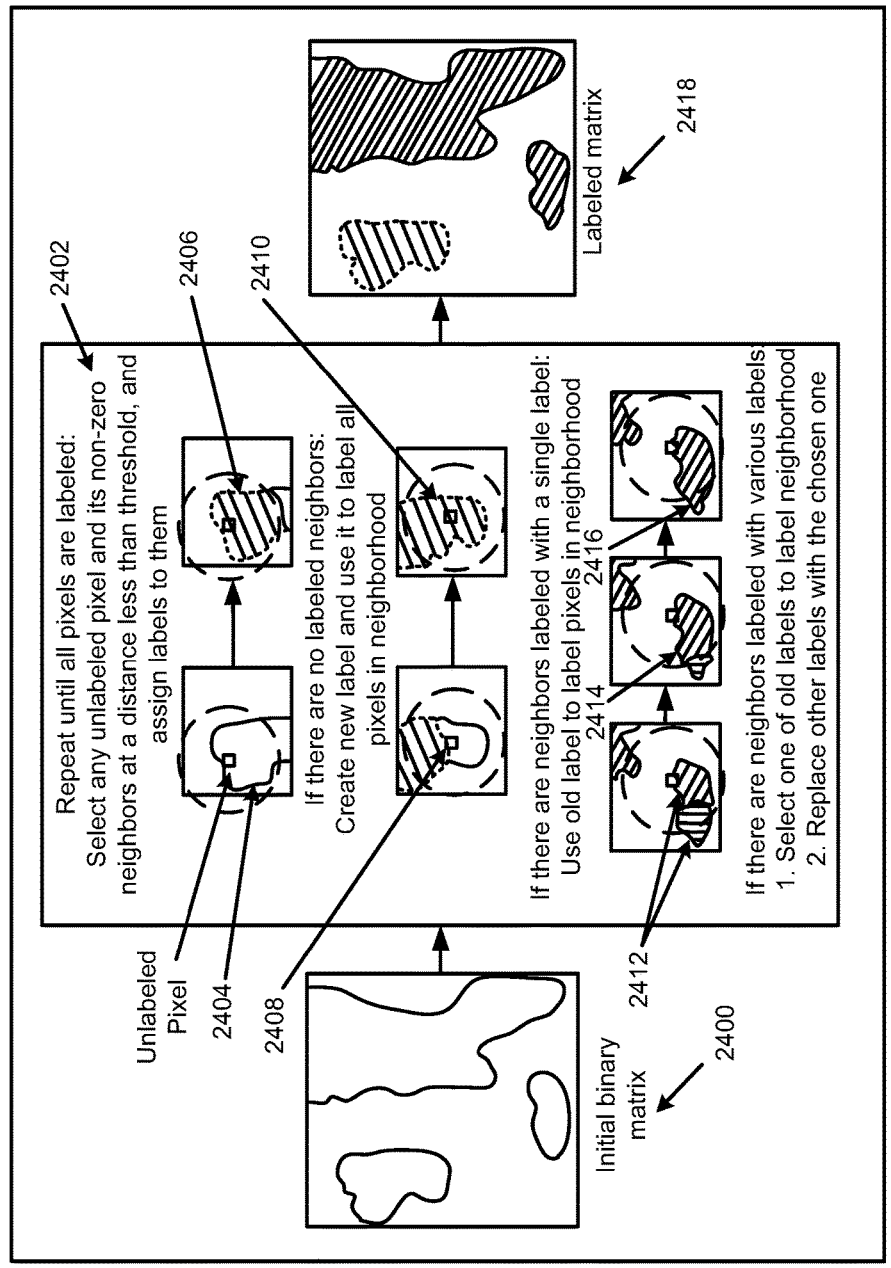

FIGS. 22-24 illustrate areal risks assessment for the risks analyzer 132, according to an example of the present disclosure.

The risks analyzer 132 may receive the region altitude map at block 2208 and the region ground mask at block 2210 to determine, at block 2212, a height map.

Referring to FIG. 22, the risks analyzer 132 may receive infrastructure rules 2100, region non-infrastructure entities masks at block 2200, region infrastructure entities masks at block 2202, and the height map determined at block 2212 to determine (e.g., locate), at block 2204, areas (and/or trees and/or objects) which violate industry standards (e.g., select areas with a height above a maximum height threshold).

At block 2206, the risks analyzer 132 may divide the risky area, determined at block 2204, into clusters. For example, the risks analyzer 132 may divide risk pixels into several clusters of risky areas, thus obtaining a risk mask for each area to be used in determination of a risk's quantitative parameters at block 2220, in finding the risk's containing polygon at block 2222, and for inclusion in the risk analyzer 132 output at block 2224.

For each risk cluster from block 2206, the risks analyzer 132 may receive the region infrastructure entities masks at block 2202, the height map at block 2212, power lines' curves parameters at block 2214, the prior data 136, region spatial resolution at block 2216, region alignment data at block 2218, the risk mask obtained at block 2206, and the height map obtained at block 2212 to determine risk quantitative parameters at block 2220, which may be included in the risk analyzer 132 output at block 2226. In this regard, with respect to the prior data 136, the risks analyzer 132 may determine whether a case may be considered as a case of risk or not. For example, the risks analyzer 132 may compare GPS coordinates of risks clusters pixels found in previous flights (e.g., identify whether the risk had been detected in previous flights), compare the height of the risks (e.g., identify whether there exists an increasing trend, identify whether the case of risk persists even though it has already been addressed (eliminated)), and/or provide information according to the frequency of occurrence, increasing trend, and/or user feedback.

For each risk cluster from block 2206, the risks analyzer 132 may receive the risk mask obtained at block 2206, the region spatial resolution at block 2216, and the region alignment data at block 2218 to determine a containing polygon at block 2222 to be included in the risk analyzer 132 output at block 2228.

Thus, with respect to estimation of each detected risk cluster, the risks analyzer 132 may determine an area mask (e.g., mask for risky areas), risks quantitative parameters (e.g., radius, area, height, etc.), and risk vector representation (e.g., containing polygon).

With respect to blocks 2204 and 2220, the analysis for these blocks may be specific to a risk type.

Referring to FIG. 23, in order to generate a height map (e.g., block 2212 of FIG. 22) the risks analyzer 132 may receive an altitude map (e.g., block 2208 of FIG. 22) and a ground mask (e.g., block 2210 of FIG. 22). At 2300, the risks analyzer 132 may select altitudes related to the ground level. At 2302, the risks analyzer 132 may fill holes (areas which were not classified as being at a ground level and thus do not include altitude information) with local mean ground altitudes. The local altitudes may be obtained by considering the altitudes at the distance from the initial pixel that does not exceed some predefined or computed (i.e., by taking a maximum distance from hole to non-hole pixel in the altitude map) threshold. At 2304, the risks analyzer 132 may perform Gaussian blur to smooth the resulting ground altitudes. At 2306, the risks analyzer 132 may subtract ground altitudes from the altitude map to determine the height map.

Referring to FIG. 24, with respect to clustering of risks, the risks analyzer 132 may group blocks of pixels that belong to the same risk, and are closer than a specified distance (e.g., threshold n, which may be six meters). The risks analyzer 132 may receive an initial binary matrix at 2400. At 2402, the risks analyzer 132 may select any unlabeled pixel and its non-zero neighbors at a distance less than a predetermined threshold (e.g., the distance nn in pixels may be obtained from threshold n using the region spatial resolution), and assign labels to the unlabeled pixel and its non-zero neighbors, and repeat until all pixels are labeled. These labels may indicate to which cluster the pixel belongs. At 2404, if there are no labeled neighbors, the risks analyzer 132 may create a new label and use the new label to label all pixels in a neighborhood at 2406. At 2408, if there are neighbors labeled with a single label, the risks analyzer 132 may use a previous label to label pixels in the neighborhood as shown at 2410. At 2412, if there are neighbors labeled with various labels, the risks analyzer 132 may select one of previous labels to label the neighborhood at 2414, and replace other labels with the chosen label at 2416. At 2418, the risks analyzer 132 may generate a labeled matrix.

To further merge the clusters the connectivity of which may be lost during the described process, the risks analyzer 132 may further process each of the clusters. The cluster mask may be dilated with a circle of radius nn as a structuring element, and the neighboring clusters which include pixels in the dilated area may be determined. The determined neighboring clusters' pixels may be reassigned with the label value of the dilated cluster. Thus, the resulting labeled matrix may include labeled areas at a distance greater than nn between each other. The risk masks may be obtained from the labeled matrix by defining a new matrix of the same size, and assigning a "1" value for the specific label and a "0" value for the other values in the labeled matrix.

The risk clusters' containing polygons may be determined using risks' masks and regions GPS alignment data. The risks' masks may be dilated with a circle of a predetermined radius as a structuring element. Then the sequence of coordinates of the dilated mask's borders may be retrieved and processed, for example, by using the Ramer-Douglas-Peucker technique, using as the parameter the same value as for the radius of dilation operation structuring element. The usage of the same parameter value may ensure that the polygon includes all of the mask's pixels and may only touch the risk's borders. The resulting pixels coordinates of the containing polygon may be converted to a GPS coordinate system using region GPS alignment data.

The detected risks clusters may also be compared to the risks clusters from the results of the previous monitoring analysis. For this purpose, the risk masks, risk parameters lists, regions GPS alignment data, and region height maps from the historical processing may be used, depending on the type of risk. The prior regions that represent the same areas as the current region may be determined by using the IDs of infrastructure entities to which positions the region masks are bound, or by using the regions GPS alignment data and coordinates of region corners. The pixel coordinates in region space <X, Y> of the new region's corners may be translated to GPS positions using region GPS alignment data. The resulting GPS positions may be translated to the coordinate systems of the prior regions, using corresponding region GPS alignment data. The resulting coordinates may first be checked for being inside the corresponding prior region's frames and vice versa, and secondly the sides of a new region may be checked for intersection with the sides of the prior regions. If one of the checks shows intersection, the regions may be considered intersected and thus representing the same area. The subsequent analysis may depend on the risk type.

Risks Analyzer 132—Detection of Vegetation in the RoW

Figure 25:
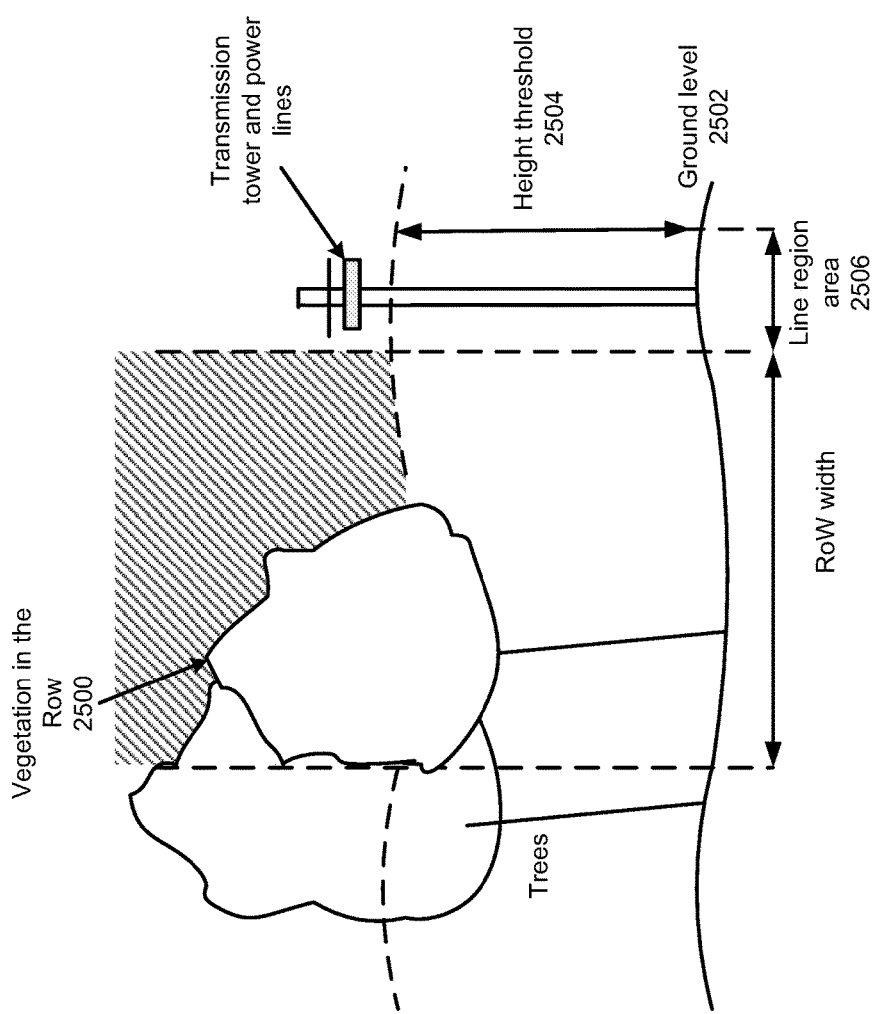
FIG. 25 illustrates detection of vegetation in the right-of-way (RoW) for the risks analyzer, according to an example of the present disclosure.

FIG. 25 illustrates detection of vegetation in the RoW for the risks analyzer 132, according to an example of the present disclosure.

For the example of the aerial monitoring of towers, with respect to the safety of electric lines, the RoW region should be clear of vegetation or any other object, that is, any invasive species or plants should be removed from the RoW region, for example, according to industry standards.

In order to determine if there are blocks of vegetation in the RoW at 2500, the risks analyzer 132 may use the region vegetation mask and region height map, deduced from the region altitude map and region ground mask. The risks analyzer 132 may determine the vegetation areas with a height higher than a given threshold, thr_height, at 2504 (i.e., height threshold). The risks analyzer 132 may group all vegetation areas that are close to each other, for example, within a distance of six meters.

For each group of vegetation in the RoW, the risks analyzer 132 may determine a minimum distance (minimum_distance) between the block of vegetation in the RoW and the electric lines region, using the risk's mask, region power line mask, and the region spatial resolution. The risks analyzer 132 may determine a maximum height (maximum_height) of the block of vegetation, using the risk's mask, and the region height map. The risks analyzer 132 may determine an area (area_value) of the vegetation block using risk's mask, and region spatial resolution, for example, in square meters. The risks analyzer 132 may determine a center point of the block using risk's mask, and determine the GPS coordinates of the center_point using region GPS alignment data.

With respect to historical data analysis related to the prior data 136, the risks analyzer 132 may analyze and compare each detected risk's maximum height with the maximum height of the same area from the prior data. For this purpose, the region GPS alignment data and the region height maps from the prior data may be used. The additional height map matrix for a new region may be allocated to store the height values from the prior data (region prior height map). The values for each pixel of the prior height map may be determined as follows: the coordinates of the new region's pixel may be transformed to GPS position, and then transformed to the pixel coordinates of the prior regions. If the resulting pixel coordinates are inside the prior regions' frames, the values of the pixels from the prior regions height map may be used for the region prior height map. The maximum value of the region prior height map pixels inside the risk cluster may be used for comparison with the new maximum height value, and the result of the comparison (difference between the values) may be used as one more quantitative parameter of the risk. If the increase in height is significant, an alert may be generated.

Risks Analyzer 132—Detection of Tall Trees

Figure 26:
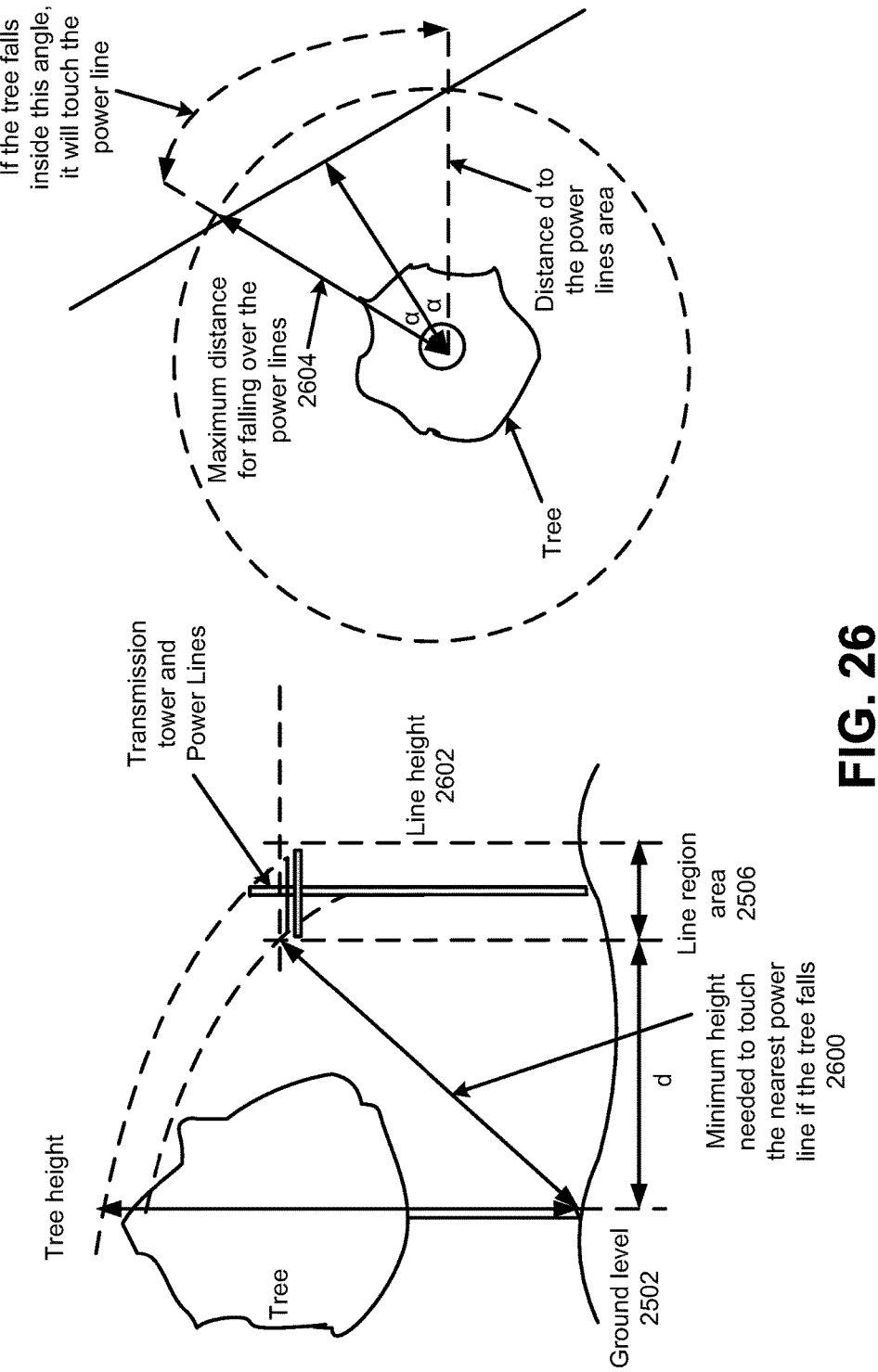
FIG. 26 illustrates detection of tall trees for the risks analyzer, according to an example of the present disclosure.

FIG. 26 illustrates detection of tall trees for the risks analyzer 132, according to an example of the present disclosure.

In order to identify when there are tall trees around the electric lines and estimate the risk associated to such trees, the risks analyzer 132 may include a function that detects tall trees.

Referring to FIG. 26, in order to identify those trees that may be a case of risk, the risks analyzer 132 may use the region vegetation mask, the region power line mask, the power lines curve parameters, and region height map, deduced from the region altitude map and region ground mask. The risks analyzer 132 may discard the vegetation pixels, where the trees cannot fall under the power line, by selecting the pixels with a corresponding height less than a distance to lines (d). The remaining pixels may be included in the risks, as the trees corresponding to these pixels may fall under the electric lines (and the trees that may fall over the electric lines will be included in this set). For all "risky" vegetation pixels, the risks analyzer 132 may determine a minimum height 2600 for which a tree resided at this pixel may fall over the electric lines, as follows:

$$\text{min\_height\_fall} = \sqrt{d^2 + \text{lines\_height}^2} \qquad \text{Equation (35)}$$

For Equation (35), d may represent the distance between the tree and electric lines region (i.e., line region area 2506), and line height 2602 may represent the height of electric lines, determined with the use of power line curve parameters. The risks analyzer 132 may identify pixels that have a height value greater than the min_height_fall, and group the pixels that are near each other, within a predetermined distance (e.g., six meters). For all pixels in each group, the risks analyzer 132 may determine the maximum distance 2604 at which a given tree may fall over the electric lines, as follows:

$$\text{max\_fall\_distance} = \sqrt{\text{tree\_height}^2 - \text{lines\_height}^2} \qquad \text{Equation (36)}$$

For all tall trees in each group, the risks analyzer 132 may determine the likelihood of falling over the electric lines region, L, as follows:

$$L = \frac{\alpha}{\pi} \times 100 \qquad \text{Equation (37)}$$

For Equation (37), α may be estimated as follows:

$$\alpha = \arccos\left(\frac{d}{\text{max\_fall\_distance}}\right) \qquad \text{Equation (38)}$$

For all tall trees in each group, the risks analyzer 132 may identify the most dangerous trees, which correspond to those trees with the maximum likelihood in each group as follows:

$$L_{max} = \max(L) \qquad \text{Equation (39)}$$

In order to estimate the quantitative parameters of the risks, the risks analyzer 132 may determine the distance between the most dangerous tree in each cluster and the electric lines region (distance) by using the risk's mask, electric lines region mask, and region spatial resolution. The pixel coordinates of the most dangerous tree may be estimated, and converted to GPS positions (dangerous_point) using the GPS alignment data of the analyzed region. By using the height map, the risks analyzer 132 may identify the height of the most dangerous tree (dangerous_height). By using the height map, the risks analyzer 132 may determine the maximum height (maximum_height) of the group of tall trees. The risks analyzer 132 may determine the minimum distance (distance) between the block of dangerous trees and the electric lines region using the risk's mask, region power lines mask, and region spatial resolution. The area (area_value) of the block of hazardous trees may be determined using the risk's mask and region spatial resolution.

In order to analyze and compare each detected risk with historical risks from the prior data 136, the risks analyzer 132 may use the region GPS alignment data and risk lists from prior data. The risk analyzer 132 may select tall trees from the prior regions that represent the same area. The GPS coordinates of these trees may be transformed to the pixel coordinates in the current region, and if any of these coordinates belong to the analyzed risk, the maximum prior likelihood to fall over the electric lines among them may be processed. The difference in the new and the prior likelihood to fall over the electric lines for the risks may be stored as an additional risk quantitative parameter.

Risks Analyzer 132—Detection of Tall Anthropogenic Objects

In a similar manner as trees may pose a risk to entities related to electrical installations, tall objects of any other type may pose a similar risk to entities (e.g., electrical installations, towers, buildings, pipelines, etc.) generally. In this regard, the risks analyzer 132 may detect when there are anthropogenic objects that have a height above a specified value.

In order to determine if there are blocks of tall anthropogenic objects in the region, the risks analyzer 132 may use the region anthropogenic objects mask and region height map. The risks analyzer 132 may determine those points of anthropogenic objects with a height higher than a given height threshold (thr_height). The risks analyzer 132 may group those anthropogenic objects areas that are closer than a predetermined distance (e.g., six meters).

For each block of anthropogenic objects, the risks analyzer 132 may determine the coordinates of a center point (center_point) of the block of anthropogenic objects using the risk mask, and determine the GPS coordinates of the center_point using region GPS alignment data. The risks analyzer 132 may determine a height (maximum_height) of the tallest point in the block using the risk's mask and region height map. The risks analyzer 132 may determine a total area (area_value) of the block of anthropogenic objects based on the risk's mask and region spatial resolution. The risks analyzer 132 may determine a minimum distance (distance) between the risk's area and the electric lines region using risk's mask, region power line mask, and region spatial resolution.

With respect to historical data analysis (e.g., from the prior data 136), the risks analyzer 132 may analyze and compare each detected risk with those risks found in the past (historical risks). The GPS coordinates of the prior risks from the prior regions which represent the same area may be used to find the corresponding anthropogenic objects. If there are prior risks close enough to the new risk with the similar parameters (i.e., maximum height, area), the user feedback or client system marks for the prior risk may be used to similarly mark the new risk (for example, "error in detection" or "authorized object"). Alternatively, the GPS coordinates of the authorized buildings from the client system may be used.

Risks Analyzer 132—Detection of Anthropogenic Objects and Vegetation within the Electric Lines Region For the example of the aerial monitoring of towers, a risk case for the electric lines includes whether there are anthropogenic objects or growing vegetation under the electric lines, which may generate danger or damage to the electric lines. In this regard, ideally, the area under the electric lines should be clean. In this regard, the risks analyzer 132 may detect whether there are anthropogenic objects or/and vegetation in the electric lines region.

In order to determine whether there exist blocks of anthropogenic objects or/and vegetation in the electric lines region, the risks analyzer 132 may use region vegetation mask, region anthropogenic objects mask, region power lines mask and region height map, derived from region altitude map and region ground mask. The risks analyzer 132 may identify the points of anthropogenic objects/vegetation under the power lines with a height higher than a given height threshold, thr_height. The risks analyzer 132 may group blocks of anthropogenic objects/vegetation when they are separated less than a predetermined distance, such as six meters.

For each block of anthropogenic objects/vegetation, the risks analyzer 132 may identify the coordinates of the center_point of the block of anthropogenic objects/vegetation, using the risk's mask, and determine the center_point GPS coordinates using region GPS alignment data. The risks analyzer 132 may determine a height (maximum_height) of the tallest anthropogenic object/tree in the block using the risk's mask and the region height map. Further, the risks analyzer 132 may determine a total area (area_value) of the block of anthropogenic objects/vegetation using the risk's mask and the region spatial resolution.

With respect to historical data analysis (i.e., based on the prior data 136), the risks analyzer 132 may analyze each detected risk in a same manner as for vegetation and anthropogenic objects, depending on a particular type of a cluster.

Risks Analyzer 132—Minimum Power Line Clearance Determination

Figure 27:
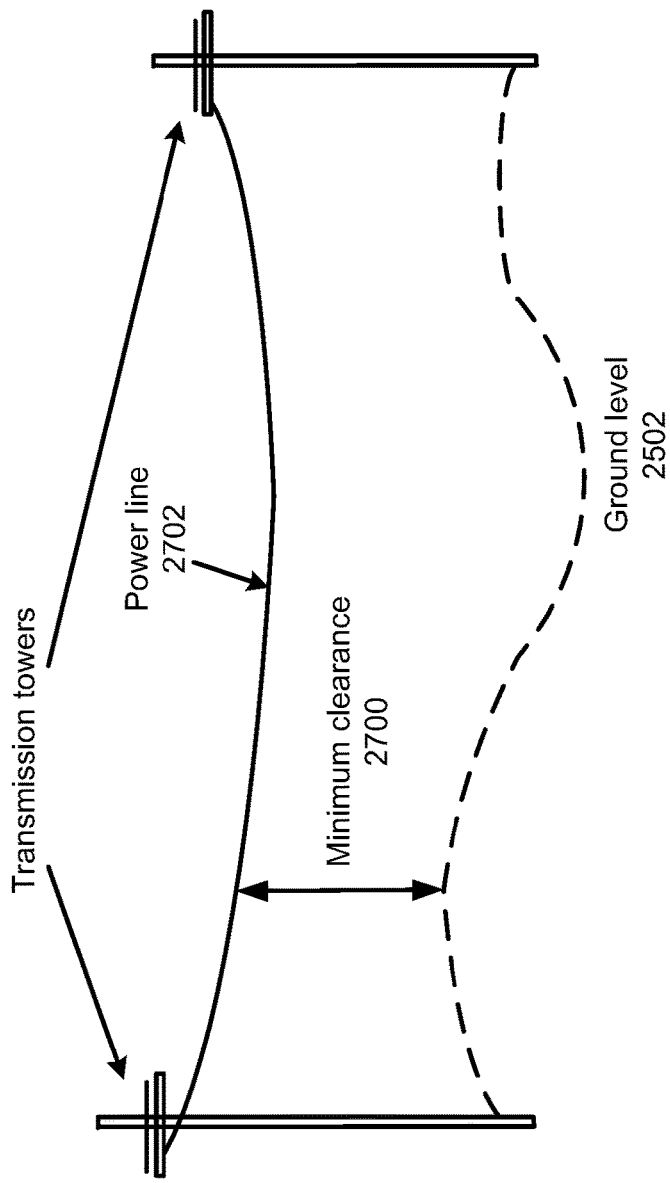
FIG. 27 illustrates minimum power line clearance determination for the risks analyzer, according to an example of the present disclosure.

FIG. 27 illustrates minimum power line clearance determination for the risks analyzer 132, according to an example of the present disclosure.

Referring to FIG. 27, with respect to minimum power line clearance determination, the risks analyzer 132 may determine the ground level 2502 in the analyzed region by using a ground mask and an altitude map. The risks analyzer 132 may determine the minimum clearance 2700 based on the least distance from a power line 2702 to the ground level 2502 for all power lines.

For each of the power line curve parameters, received from the three-dimensional curve reconstructor 130, the risks analyzer 132 may extract ground altitude values $a_{ground}$ from composed region ground altitudes map, for the pixels lying on the line x=k*y+t, limited by Y coordinates of the corresponding towers. For each such pixel, the corresponding power line altitude may be determined, using the second curve equation: $a_{line}=a*y^2+b*y+c$. The minimum clearance for this power line may then be determined as the minimum value among all $(a_{line}-a_{ground})$ values for the chosen pixels.

If the number of detected curves is less than the expected number of power lines between the towers, or if the resulting curve turns out to be too close to the ground (minimum clearance value for this line is less than a predetermined threshold), the parameters of the number of missing or damaged lines between the towers may also be updated accordingly.

Risks Consolidator 142—Risks Consolidation

Figure 28:
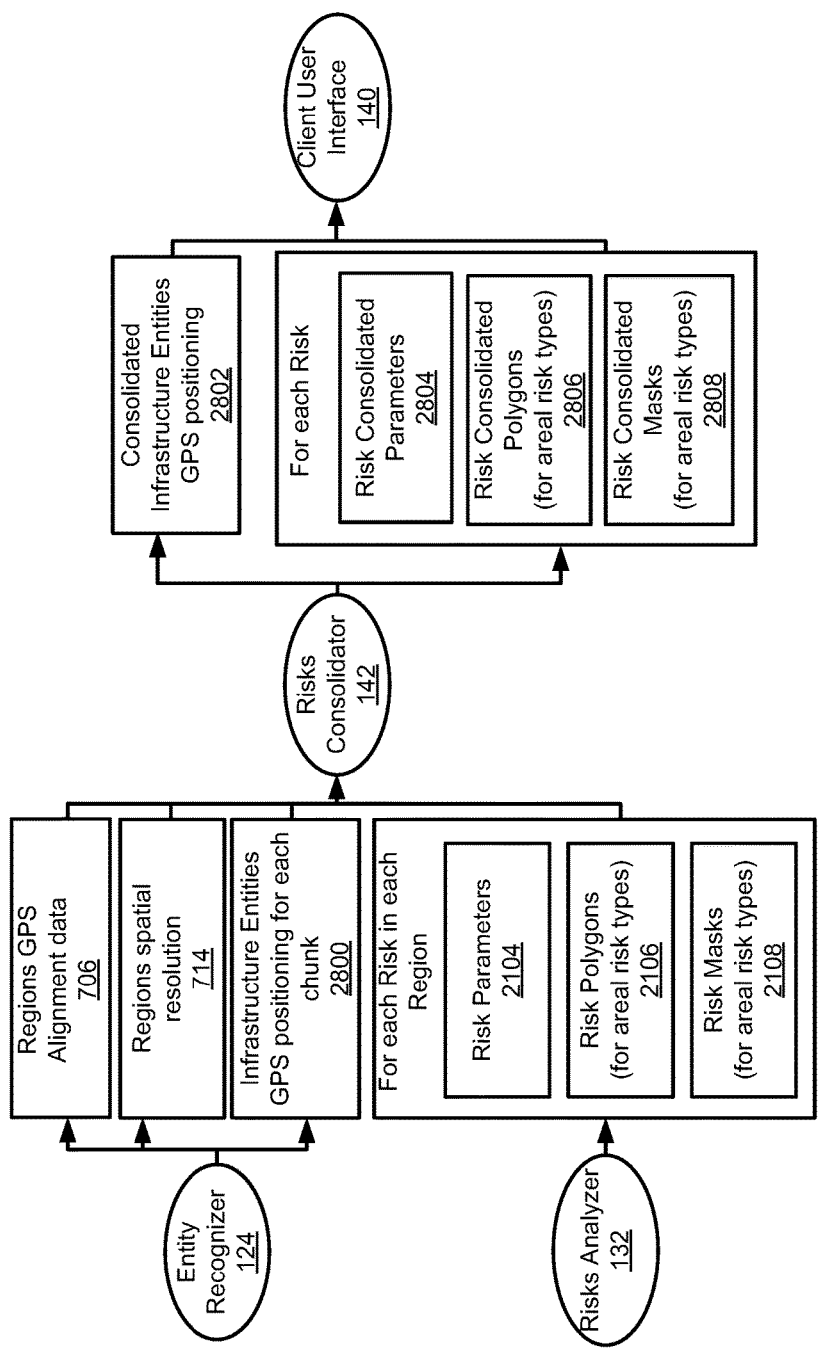
FIGS. 28 and 29 illustrate risks consolidation for a risks consolidator of the condition detection using image processing system of FIG. 1, according to an example of the present disclosure.
Figure 29:
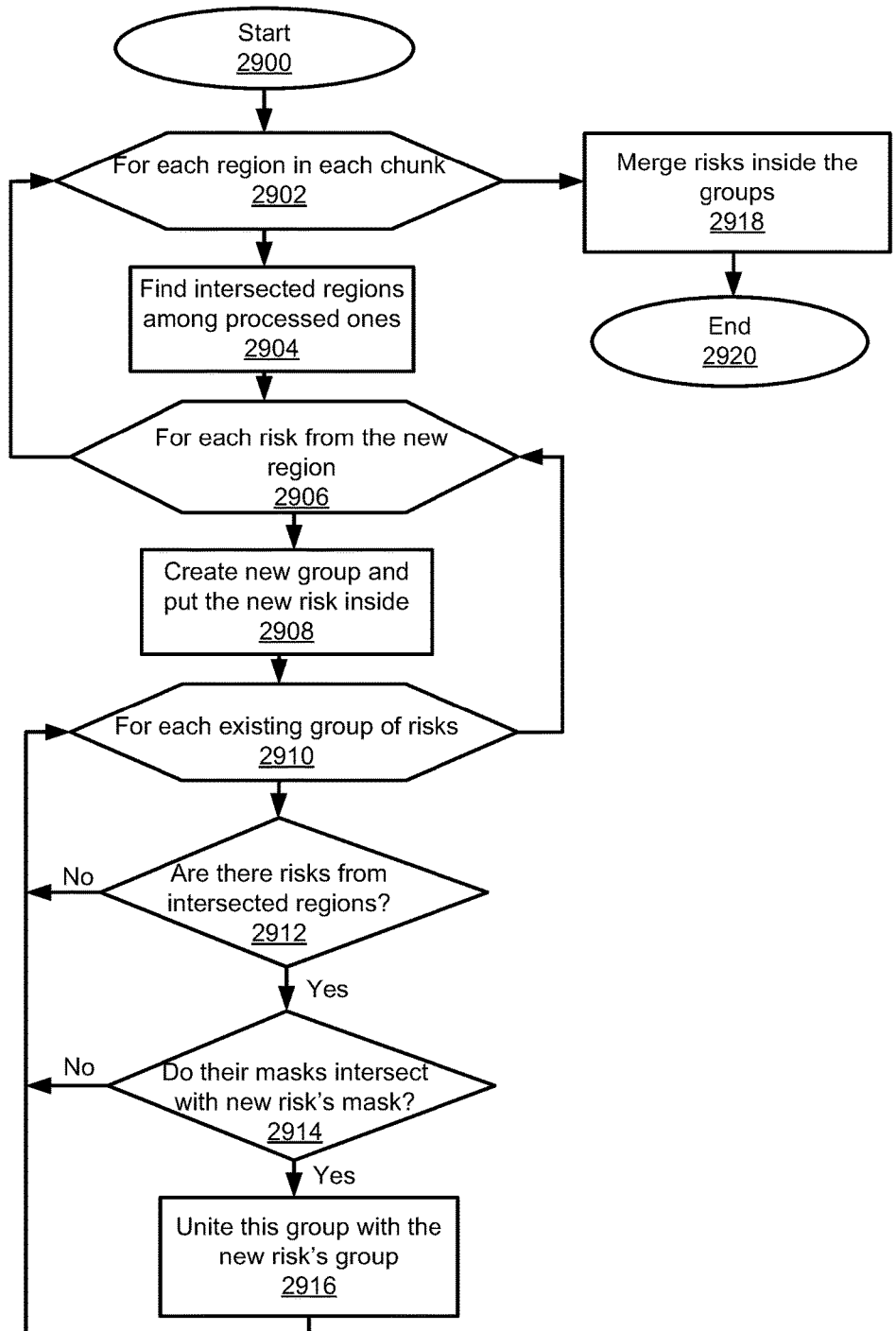

FIGS. 28 and 29 illustrate risks consolidation for a risks consolidator 142 of the system 100, according to an example of the present disclosure.

With respect to risks consolidation, referring to FIG. 28, the inputs of the risks consolidator 142 may include the regions GPS alignment data 706, the regions spatial resolution 714, infrastructure entities GPS positioning for each chunk 2800, the risk parameters 2104 for each risk in each region, and the risk polygons 2106 and the risk masks 2108 for areal types of risks. The risks consolidator 142 may generate a consolidated infrastructure entities GPS positioning 2802, and for each risk, risk consolidated parameters 2804, risk consolidated polygons 2806, and risk consolidated masks 2808. The consolidated infrastructure entities GPS positioning 2802, the risk consolidated parameters 2804, the risk consolidated polygons 2806, and the risk consolidated masks 2808 may be forwarded to the client user interface 140.

FIG. 29 illustrates a high-level flow of "area" type risks consolidation, according to an example of the present disclosure. With respect to processing related to risks consolidation, generally, for each "area" type of risk (tall tree, vegetation, anthropogenic objects, etc.), the risks consolidator 142 may determine the risks that intersect with each other and thus should be merged into one.

Referring to FIG. 29, processing related to risks consolidation may start at block 2900. For each region inside each chunk (block 2902), the risks consolidator 142 may process the regions one by one and maintain the list of previously processed regions and groups of intersected risks from the previously processed regions. For each new region which is being added, the risks consolidator 142 may determine the previously processed regions which intersect with the new region. For the intersection check, the region corners may be used. The pixel coordinates in region space <X, Y> of the new region's corners may be translated to GPS positions using region GPS alignment data. The resulting GPS positions may be translated to the coordinate systems of the previously processed regions, using corresponding region GPS alignment data. The resulting coordinates may be first checked for being inside the corresponding other region's frames and vice versa, and secondly, the sides of a new region may be checked for intersection with the sides of the other regions. If one of the checks shows intersection, the regions may be considered intersected. For each risk in the new region (block 2906), the risks consolidator 142 may create a new group of risks and place the new risk inside the new group (block 2908). According to an example, the total area of this new group is assumed to be the same as the new risk's area. For each existing group of risks (block 2910), the risks consolidator 142 may determine if there are risks from intersected regions (block 2912). In response to a determination that there are risks from intersected regions at block 2912, the risks consolidator 142 may determine if the masks for the risks determined at block 2912 intersect with new risk's mask (block 2914). In order to determine the intersection, the new risk's mask's pixels with value "1" may be processed. The coordinates of each such pixel may be converted to the GPS position, and then converted to the other risk's mask coordinate system using region GPS alignment data. If the other risk's mask's value at the resulting coordinates is "1", the pixel may be considered to be intersected with other risk's mask. Using the number of intersected pixels and region spatial resolution, the total intersection area in square meters may be determined. In response to a determination that the masks for the risks determined at block 2912 intersect with the new risk's mask at block 2914, the risks consolidator 142 may unite this group with the new risk's group (block 2916). The total area of the group may then be increased by the new risk's group area, with subtraction of the intersection area. If the new risk intersects with more than one group, all these groups may be added. Further, at block 2918, the risks consolidator 142 may merge risks inside the groups, and processing related to risks consolidation may be completed at block 2920. This technique may ensure that the total area of the group remains correct, and that all the overlapped risks appear to be in the same group.

In order to determine merged risk's parameters, the parameters of all of the initial risks may be used. For example, in order to determine the maximum height of the risk, the maximum of all of the maximum heights of initial risks may be used. The GPS coordinates and other parameters of the most dangerous tree (for tall tree risk type) may be determined from the risk with the most dangerous tree of falling over the lines likelihood (or the highest ratio between height and distance to lines for the most dangerous trees in the initial risks, if the fall over the lines likelihood is zero). The risk may be discarded, if at least one of the initial risks was considered discarded during risk analysis by the risks analyzer 132 (for example, if the risk has label "error in detection" or "authorized object").

For determination of the merged risk's containing polygon, the containing polygons of initial risks may be merged. The resulting containing polygon and the risk's attributes may be saved, for example, in a SHAPEFILE file format to be displayed, for example, at client user interface 140.

The usage of merged risks' masks may also be helpful for improving the performance of the client user interface 140, as the simultaneous display of many polygons may be too resource-consuming for online maps viewers. In order to prepare the data for the client user interface 140, the risks consolidator 142 may transform the region risk's masks, so that pixels with value "0" become fully transparent, and pixels with value "1" obtain the predetermined color. The risks consolidator 142 may use different colors for the masks of risks from different groups, or the single color may be used for all of the masks.

For each infrastructure type of risk (e.g., missing electric lines risk, minimum clearance risk, electric tower tilting risk etc.), the risks consolidator 142 may merge all of the risks that represent the same infrastructure entities (e.g., towers or power lines between the pair of towers), where numerical parameters of the merged risk may be arithmetical means, minimum, or maximum of the initial values depending on the system preferences for each risk type.

Client User Interface 140—Data Flow

Figure 30:
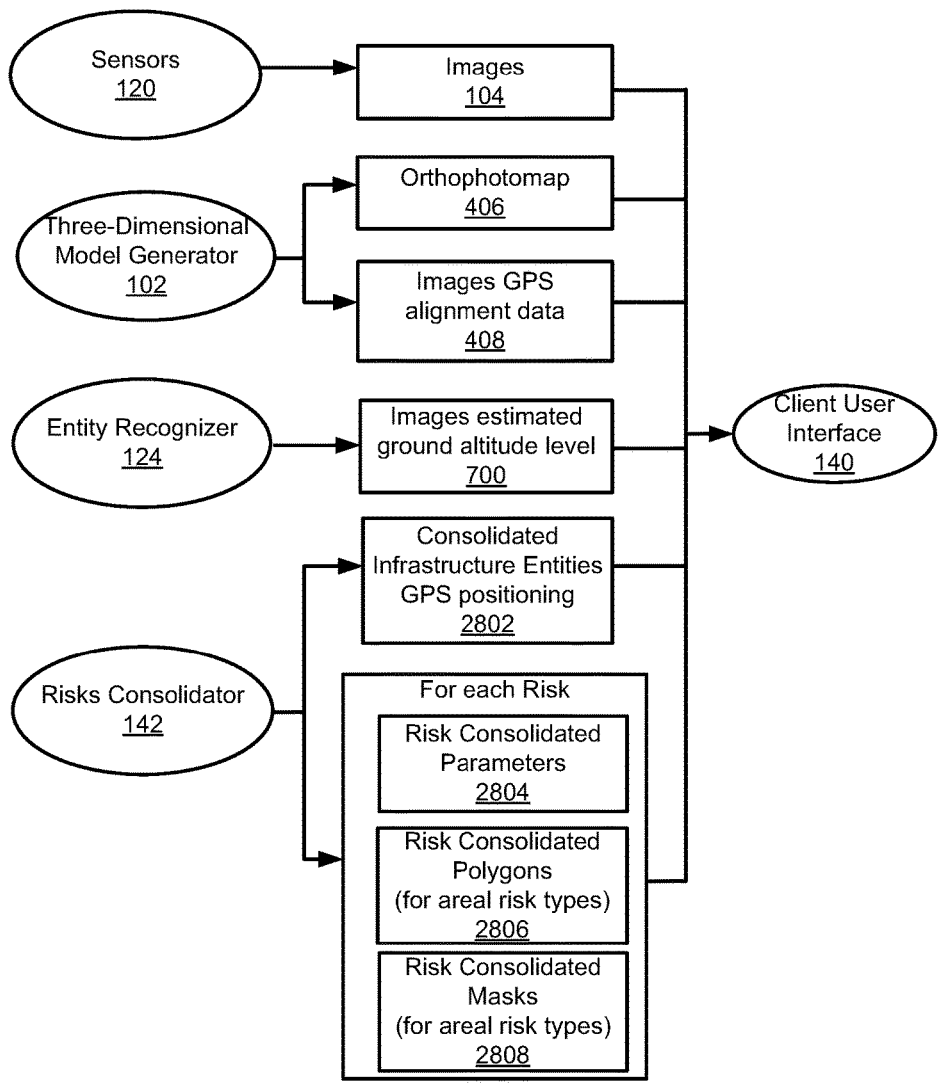
FIG. 30 illustrates data flow of a client user interface related to the condition detection using image processing system of FIG. 1, according to an example of the present disclosure.

FIG. 30 illustrates data flow of the client user interface 140 related to the system 100, according to an example of the present disclosure.

Referring to FIG. 30, the data flow of the client user interface 140 may include receiving and displaying (as needed) the images 104 from the vehicle sensors 120 of the vehicle 106, the orthophotomap 406 and the images GPS alignment data 408 from the three-dimensional model generator 102, the images estimated ground altitude level 700 from the entity recognizer 124, and the consolidated infrastructure entities GPS positioning 2802, the risk consolidated parameters 2804 and the risk consolidated polygons 2806, and the risk consolidated masks 2808 from the risks consolidator 142 for "areal" types of risks.

The client user interface 140 may be implemented, for example, using Java programming language and Apache Tomcat Web server, and may utilize the input data during offline data preparation and online runtime execution.

Client User Interface 140—Data Preparation

With respect to data preparation, some of the system data may be prepared in advance for display, for example, on the public online world maps. For example, the orthophotomap and consolidated risks masks may be converted to the appropriate format (i.e. GOOGLE KMZ, Georeferenced TIFF, or other format for geo-referenced images), and the initial images 104 may be scaled for faster transfer to a user's browser.

In order to display a raster layer over the satellite or other background (like orthophotomap or risky areas), the data may be divided into a mosaic representation, where each mosaic piece may represent a georeferenced image. For some online maps, the mosaic pieces may be square. The orthophotomaps in KMZ format may be dearchived into images and files in a Keyhole Markup Language (KML) format, including the GPS referencing information for the images. The resulting images and region risk masks may be processed separately in order to obtain the mosaic representation for each image and each mask, according to the requirements of the chosen online maps. The resulting mosaic representations may be merged together, for example, by choosing a pixel color with minimum transparency value for each pixel of each mosaic piece.

Client User Interface 140—Runtime Execution

Figure 31:
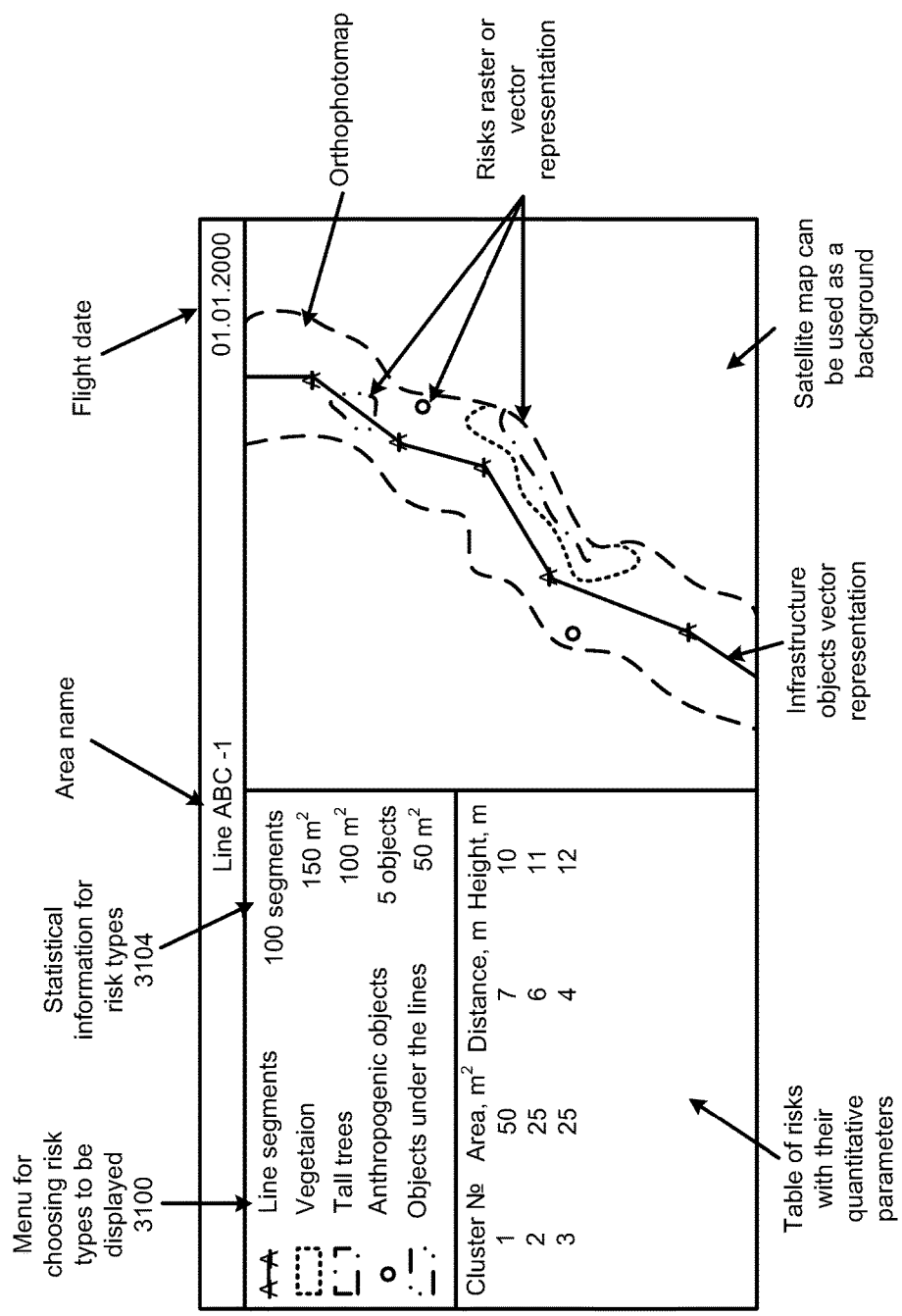
FIG. 31 illustrates the client user interface, according to an example of the present disclosure.

FIG. 31 illustrates the client user interface 140, according to an example of the present disclosure.

Referring to FIG. 31, the client user interface 140 may include a menu at 3100 for choosing risk types to be displayed at 3102. Statistical information for risk types from the menu at 3100 may be displayed at 3104. The client user interface 140 may include other aspects such as a monitored area name, flight data, orthophotomap, risks (raster or vector) representation, satellite map, and infrastructure objects vector representation as shown in FIG. 31.

The user may view the initial images using the client user interface 140. In order to view the list of images that include the specific GPS position that may interest the user, the user may click on the map. In order to obtain the desired list of images, the client user interface 140 may use the images GPS alignment data and images estimated ground altitude level. For each image, coordinates of the center of the image may be transformed to the GPS position. If the coordinate is too far from the image, the subsequent analysis may not be performed. In the other case the GPS position may be transformed to the image coordinate system, and the coordinates of the resulting point may be checked for inclusion in the image boundaries. The user may select images from the list of images for the specific GPS position for a closer review on a separate page.

The user may select risks on a map by clicking on their vector representation (either containing polygon, or on an icon representing their center point, or, for example, the most dangerous tree depending on the risk type), and the corresponding risk details from the table 3102 may be highlighted and the corresponding risk's containing polygon may be displayed (if the corresponding risk's containing polygon was not displayed initially) or highlighted with color change. The user may also select risks from the table 3102, and the corresponding risk may be highlighted in the map with either containing polygon color change, or by displaying the containing polygon (if the containing polygon was not displayed initially).

The user may select the areas of interest on a map with a polygon selection tool, by consecutively selecting the vertices of the polygon. The polygon (or several polygons entered by the user) may be simplified, and the total selected area and area of included vegetation and/or tall trees risks or other risks (using risk's containing polygons) may be determined. The selection and its determined parameters may be transferred to the client systems for managing the orders for forest cutting.

The elements of the system 100 may be machine readable instructions stored on a non-transitory computer readable medium. In this regard, the system 100 may include or be a non-transitory computer readable medium. In addition, or alternatively, the elements of the apparatus 100 may be hardware or a combination of machine readable instructions and hardware.

Method for Condition Detection Using Image Processing

Figure 33:
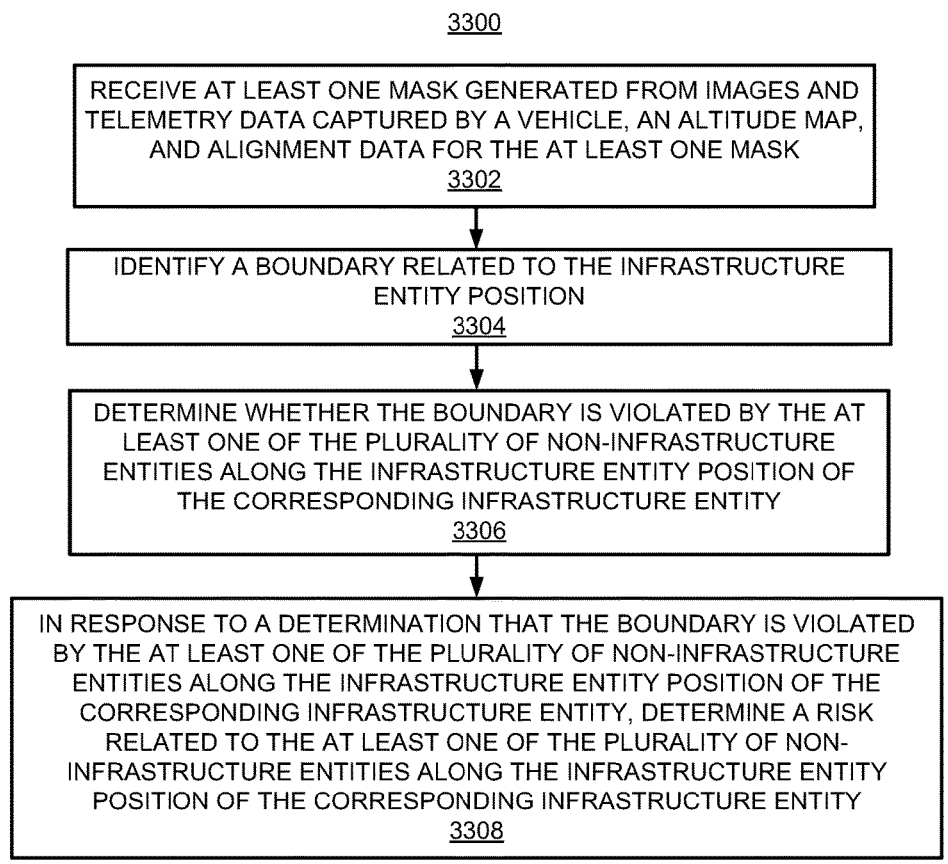
FIG. 33 illustrates a method for condition detection using image processing, according to an example of the present disclosure.

FIGS. 32 and 33 illustrate flowcharts of methods 3200 and 3300 for condition detection using image processing, according to examples. The methods 3200 and 3300 may be implemented on the condition detection using image processing system 100 described above with reference to FIGS. 1-31 by way of example and not limitation. The methods 3200 and 3300 may be practiced in other systems.

Referring to FIGS. 1-32, and particularly FIG. 32, at block 3202, the method 3200 may include receiving (e.g., by the risks analyzer 132) at least one mask generated from images 104 and telemetry data 110 captured by a vehicle 106, an altitude map, and alignment data for the at least one mask. The images 104 may be related to movement of the vehicle 106 along a vehicle path 108 and at least one of a plurality of non-infrastructure entities along an infrastructure entity position of a corresponding infrastructure entity, and the telemetry data 110 may include movement log information related to the movement of the vehicle 106 along the vehicle path 108.

At block 3204, the method 3200 may include using (e.g., by the risks analyzer 132) the at least one mask related to the vehicle path 108 and the at least one of the plurality of non-infrastructure entities along the infrastructure entity position of the corresponding infrastructure entity, and an infrastructure rule to detect a risk related to the infrastructure entity by analyzing the at least one mask related to the vehicle path 108 and the at least one of the plurality of non-infrastructure entities along the infrastructure entity position of the corresponding infrastructure entity, and the infrastructure rule, and determining whether the infrastructure rule is violated.

According to examples, for the method 3200, the risks analyzer 132 may use the at least one mask related to the vehicle path 108 and the at least one of the plurality of non-infrastructure entities along the infrastructure entity position of the corresponding infrastructure entity, the alignment data for the at least one mask, and the infrastructure rule to detect the risk related to the infrastructure entity by identifying at least one infrastructure rule condition related to the infrastructure entity, and determining whether the infrastructure rule condition is satisfied or not satisfied by the at least one of the plurality of non-infrastructure entities along the infrastructure entity position of the corresponding infrastructure entity. Further, in response to a determination that the infrastructure rule condition is satisfied or not satisfied by the at least one of the plurality of non-infrastructure entities along the infrastructure entity position of the corresponding infrastructure entity, the risks analyzer 132 may determine the risk related to the infrastructure entity by the at least one of the plurality of non-infrastructure entities along the infrastructure entity position of the corresponding infrastructure entity.

According to examples, for the method 3200, the at least one infrastructure rule condition may include satisfying a height threshold, and where the risks analyzer 132 may further determine whether the height threshold is met or exceeded by the at least one of the plurality of non-infrastructure entities along the infrastructure entity position of the corresponding infrastructure entity by determining a ground level in a region of analysis by using a ground mask and the altitude map related to the region of analysis, determining a height map by using the ground level and the altitude map related to the region of analysis, and identifying, by using the height map, the at least one of the plurality of non-infrastructure entities along the infrastructure entity position of the corresponding infrastructure entity that includes a height that exceeds the height threshold.

According to examples, for the method 3200, the risks analyzer 132 may use the at least one mask related to the vehicle path 108 and the at least one of the plurality of non-infrastructure entities along the infrastructure entity position of the corresponding infrastructure entity, a height map, the alignment data for the at least one mask, and the infrastructure rule to detect the risk related to the infrastructure entity by determining a height for which the at least one of the plurality of non-infrastructure entities along the infrastructure entity position of the corresponding infrastructure entity is to fall over the infrastructure entity, where the risk may include the at least one of the plurality of non-infrastructure entities along the infrastructure entity position of the corresponding infrastructure entity falling over the infrastructure entity, and generating a group by grouping the at least one of the plurality of non-infrastructure entities along the infrastructure entity position of the corresponding infrastructure entity for which an actual height exceeds the height for which the at least one of the plurality of non-infrastructure entities along the infrastructure entity position of the corresponding infrastructure entity is to fall over the infrastructure entity.

According to examples, for the method 3200, the risks analyzer 132 may use the at least one mask related to the vehicle path 108 and the at least one of the plurality of non-infrastructure entities along the infrastructure entity position of the corresponding infrastructure entity, a height map, the alignment data for the at least one mask, and the infrastructure rule to detect the risk related to the infrastructure entity by determining a height for which the at least one of the plurality of non-infrastructure entities along the infrastructure entity position of the corresponding infrastructure entity is to fall to a specified region, where the risk may include the at least one of the plurality of non-infrastructure entities along the infrastructure entity position of the corresponding infrastructure entity falling to the specified region.

According to examples, for the method 3200, the risks analyzer 132 may use the at least one mask related to the vehicle path 108 and the at least one of the plurality of non-infrastructure entities along the infrastructure entity position of the corresponding infrastructure entity, a height map, the alignment data for the at least one mask, and the infrastructure rule to detect the risk related to the infrastructure entity by determining a likelihood of the at least one of the plurality of non-infrastructure entities along the infrastructure entity position of the corresponding infrastructure entity of falling over the infrastructure entity, where the risk may include the at least one of the plurality of non-infrastructure entities along the infrastructure entity position of the corresponding infrastructure entity falling over the infrastructure entity.

According to examples, for the method 3200, the risks analyzer 132 may use the at least one mask related to the vehicle path 108 and the at least one of the plurality of non-infrastructure entities along the infrastructure entity position of the corresponding infrastructure entity, a height map, the alignment data for the at least one mask, and the infrastructure rule to detect the risk related to the infrastructure entity by determining a likelihood of the at least one of the plurality of non-infrastructure entities along the infrastructure entity position of the corresponding infrastructure entity of falling over the infrastructure entity, where the risk may include the at least one of the plurality of non-infrastructure entities along the infrastructure entity position of the corresponding infrastructure entity falling over the infrastructure entity. Further, the risks analyzer 132 may generate a group by grouping the at least one of the plurality of non-infrastructure entities along the infrastructure entity position of the corresponding infrastructure entity for which the likelihood is more than a predetermined threshold, and determining the at least one of the plurality of non-infrastructure entities along the infrastructure entity position of the corresponding infrastructure entity in the group that includes a maximum likelihood of the risk of falling over the infrastructure entity.

According to examples, for the method 3200, the risks analyzer 132 may determine a distance between the at least one of the plurality of non-infrastructure entities along the infrastructure entity position of the corresponding infrastructure entity in the group that includes the maximum likelihood of the risk of falling over the infrastructure entity.

According to examples, for the method 3200, the risks analyzer 132 may use the at least one mask related to the vehicle path 108 and the at least one of the plurality of non-infrastructure entities along the infrastructure entity position of the corresponding infrastructure entity, a height map, the alignment data for the at least one mask, historical masks, historical height maps, and the infrastructure rule to detect the risk related to the infrastructure entity by comparing a risk of the at least one of the plurality of non-infrastructure entities along the infrastructure entity position of the corresponding infrastructure entity of falling over the infrastructure entity to historical risks of falling over the infrastructure entity. Further, the risks analyzer 132 may determine whether a maximum likelihood of the at least one of the plurality of non-infrastructure entities along the infrastructure entity position of the corresponding infrastructure entity of falling over the infrastructure entity exceeds a historical risk of the historical risks of falling over the infrastructure entity, and in response to a determination that the maximum likelihood of the at least one of the plurality of non-infrastructure entities along the infrastructure entity position of the corresponding infrastructure entity of falling over the infrastructure entity exceeds the historical risk of the historical risks of falling over the infrastructure entity, generate an alert related to the risk of the at least one of the plurality of non-infrastructure entities along the infrastructure entity position of the corresponding infrastructure entity of falling over the infrastructure entity.

According to examples, for the method 3200, a risks consolidator 142 may use risk masks derived from the at least one mask related to the vehicle path 108 and the at least one of the plurality of non-infrastructure entities along the infrastructure entity position of the corresponding infrastructure entity, and the alignment data for the at least one mask, to merge, based on an analysis of the risk masks and regions alignment data, risks of a same type located in different regions to a same location.

According to examples, for the method 3200, the infrastructure entities may include the infrastructure entity including a tower and a power line for a power system.

According to examples, for the method 3200, the vehicle 106 may be a UAV, and the movement log may include a flight log.

According to examples, for the method 3200, a user-interface may generate a display of the risk from a plurality of available risks and the at least one of the plurality of non-infrastructure entities along the infrastructure entity position of the corresponding infrastructure entity.

Referring to FIGS. 1-33, and particularly FIG. 33, at block 3302, the method 3300 may include receiving, by a risks analyzer 132, at least one mask generated from images 104 and telemetry data 110 captured by a vehicle 106, an altitude map, and alignment data for the at least one mask. The images 104 may be related to movement of the vehicle 106 along a vehicle path 108 and at least one of a plurality of non-infrastructure entities along an infrastructure entity position of a corresponding infrastructure entity, and the telemetry data 110 may include movement log information related to the movement of the vehicle 106 along the vehicle path 108.

At block 3304, the method 3300 may include identifying, by the risks analyzer 132, a boundary related to the infrastructure entity position.

At block 3306, the method 3300 may include determining, by the risks analyzer 132, whether the boundary is violated by the at least one of the plurality of non-infrastructure entities along the infrastructure entity position of the corresponding infrastructure entity.

At block 3308, the method 3300 may include in response to a determination that the boundary is violated by the at least one of the plurality of non-infrastructure entities along the infrastructure entity position of the corresponding infrastructure entity, determining, by the risks analyzer 132, a risk related to the at least one of the plurality of non-infrastructure entities along the infrastructure entity position of the corresponding infrastructure entity.

According to examples, the method 3300 may include using, by a risks consolidator 142 that is executed by the at least one hardware processor, risk masks derived from the at least one mask related to the at least one of the plurality of non-infrastructure entities along the infrastructure entity position of the corresponding infrastructure entity to merge, based on an analysis of the risk masks and regions alignment data, risks of a same type located in different regions to a same location.

According to examples, a method 3300 for condition detection using image processing may include receiving, by a risks analyzer 132 that is executed by at least one hardware processor, at least one mask generated from images 104 and telemetry data 110 captured by a vehicle 106. The images 104 may be related to movement of the vehicle 106 along a vehicle path 108 and at least one of a plurality of non-infrastructure entities along an infrastructure entity position of a corresponding infrastructure entity. The method for condition detection using image processing may further include identifying, by the risks analyzer 132, a threshold related to the infrastructure entity, and determining, by the risks analyzer 132, whether the threshold is met or exceeded by the at least one of the plurality of non-infrastructure entities along the infrastructure entity position of the corresponding infrastructure entity. The method for condition detection using image processing may further include in response to a determination that the threshold is met or exceeded by the at least one of the plurality of non-infrastructure entities along the infrastructure entity position of the corresponding infrastructure entity, determining, by the risks analyzer 132, a risk related to the at least one of the plurality of non-infrastructure entities along the infrastructure entity position of the corresponding infrastructure entity. For the method for condition detection using image processing, the threshold may include an angular threshold, and where determining, by the risks analyzer 132, whether the threshold is met or exceeded by the at least one of the plurality of non-infrastructure entities along the infrastructure entity position of the corresponding infrastructure entity may include identifying, by the risks analyzer 132, the at least one of the plurality of non-infrastructure entities along the infrastructure entity position of the corresponding infrastructure entity that is fully or partially located within the angular threshold for contacting the infrastructure entity. For the method for condition detection using image processing, determining, by the risks analyzer 132, the risk related to the at least one of the plurality of non-infrastructure entities along the infrastructure entity position of the corresponding infrastructure entity may include determining, by the risks analyzer 132, a height for which the at least one of the plurality of non-infrastructure entities along the infrastructure entity position of the corresponding infrastructure entity is to fall over the infrastructure entity, where the risk may include the at least one of the plurality of non-infrastructure entities along the infrastructure entity position of the corresponding infrastructure entity falling over the infrastructure entity, and generating, by the risks analyzer 132, a group by grouping the at least one of the plurality of non-infrastructure entities along the infrastructure entity position of the corresponding infrastructure entity for which an actual height exceeds the height for which the at least one of the plurality of non-infrastructure entities along the infrastructure entity position of the corresponding infrastructure entity is to fall over the infrastructure entity. For the method for condition detection using image processing determining, by the risks analyzer 132, the risk related to the at least one of the plurality of non-infrastructure entities along the infrastructure entity position of the corresponding infrastructure entity may further include determining, by the risks analyzer 132, a likelihood of the at least one of the plurality of non-infrastructure entities along the infrastructure entity position of the corresponding infrastructure entity of falling to a specified region, where the risk may include the at least one of the plurality of non-infrastructure entities along the infrastructure entity position of the corresponding infrastructure entity falling to the specified region. For the method for condition detection using image processing, determine, by the risks analyzer 132, the risk related to the at least one of the plurality of non-infrastructure entities along the infrastructure entity position of the corresponding infrastructure entity may further include comparing, by the risks analyzer 132, a risk of the at least one of the plurality of non-infrastructure entities along the infrastructure entity position of the corresponding infrastructure entity of falling over the infrastructure entity to historical risks of falling over the infrastructure entity, determining, by the risks analyzer 132, whether a maximum likelihood of the at least one of the plurality of non-infrastructure entities along the infrastructure entity position of the corresponding infrastructure entity of falling over the infrastructure entity exceeds a historical risk of the historical risks of falling over the infrastructure entity, and in response to a determination that the maximum likelihood of the at least one of the plurality of non-infrastructure entities along the infrastructure entity position of the corresponding infrastructure entity of falling over the infrastructure entity exceeds the historical risk of the historical risks of falling over the infrastructure entity, generating, by the risks analyzer 132, an alert related to the risk of the at least one of the plurality of non-infrastructure entities along the infrastructure entity position of the corresponding infrastructure entity of falling over the infrastructure entity.

Computer System

Figure 34:
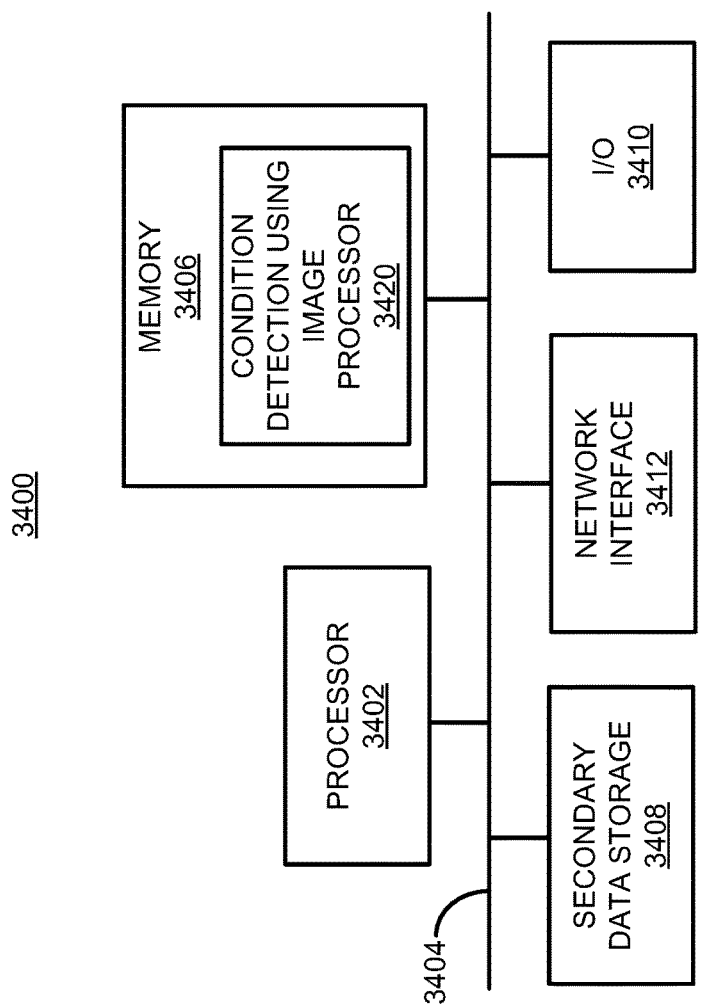
FIG. 34 illustrates a computer system, according to an example of the present disclosure.

FIG. 34 shows a computer system 3400 that may be used with the examples described herein. The computer system may represent a generic platform that includes components that may be in a server or another computer system. The computer system 3400 may be used as a platform for the system 100. The computer system 3400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 3400 may include a processor 3402 that may implement or execute machine readable instructions performing some or all of the methods, functions and other processes described herein. Commands and data from the processor 3402 may be communicated over a communication bus 3404. The computer system may also include a main memory 3406, such as a random access memory (RAM), where the machine readable instructions and data for the processor 3402 may reside during runtime, and a secondary data storage 3408, which may be non-volatile and stores machine readable instructions and data. The memory and data storage are examples of computer readable mediums. The memory 3406 may include a condition detection using image processor 3420 including machine readable instructions residing in the memory 3406 during runtime and executed by the processor 3402. The condition detection using image processor 3420 may include the elements of the system 100 shown in FIG. 1.

The computer system 3400 may include an I/O device 3410, such as a keyboard, a mouse, a display, etc. The computer system may include a network interface 3412 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A condition detection using image processing system comprising:
 a risks analyzer, executed by at least one hardware processor, to
  receive at least one mask generated from images and telemetry data captured by a vehicle, an altitude map, and alignment data for the at least one mask, wherein the images are related to movement of the vehicle along a vehicle path and at least one of a plurality of non-infrastructure entities along an infrastructure entity position of a corresponding infrastructure entity, and the telemetry data includes movement log information related to the movement of the vehicle along the vehicle path, and use the at least one mask related to the vehicle path and the at least one of the plurality of non-infrastructure entities along the infrastructure entity position of the corresponding infrastructure entity, a height map, the alignment data for the at least one mask, and an infrastructure rule to detect a risk related to the infrastructure entity by analyzing the at least one mask related to the vehicle path and the at least one of the plurality of non-infrastructure entities along the infrastructure entity position of the corresponding infrastructure entity, and the infrastructure rule, determining whether the infrastructure rule is violated, and determining a likelihood of the at least one of the plurality of non-infrastructure entities along the infrastructure entity position of the corresponding infrastructure entity of falling over the infrastructure entity, wherein the risk includes the at least one of the plurality of non-infrastructure entities along the infrastructure entity position of the corresponding infrastructure entity falling over the infrastructure entity.

2. The condition detection using image processing system according to claim 1, wherein the risks analyzer is to use the at least one mask related to the vehicle path and the at least one of the plurality of non-infrastructure entities along the infrastructure entity position of the corresponding infrastructure entity, the height map, the alignment data for the at least one mask, and the infrastructure rule to detect the risk related to the infrastructure entity by identifying at least one infrastructure rule condition related to the infrastructure entity, determining whether the infrastructure rule condition is satisfied or not satisfied by the at least one of the plurality of non-infrastructure entities along the infrastructure entity position of the corresponding infrastructure entity, and in response to a determination that the infrastructure rule condition is satisfied or not satisfied by the at least one of the plurality of non-infrastructure entities along the infrastructure entity position of the corresponding infrastructure entity, determining the risk related to the infrastructure entity by the at least one of the plurality of non-infrastructure entities along the infrastructure entity position of the corresponding infrastructure entity.

3. The condition detection using image processing system according to claim 2, wherein the at least one infrastructure rule condition includes satisfying a height threshold, and wherein the risks analyzer is to further determine whether the height threshold is met or exceeded by the at least one of the plurality of non-infrastructure entities along the infrastructure entity position of the corresponding infrastructure entity by determining a ground level in a region of analysis by using a ground mask and the altitude map related to the region of analysis, determining a height map by using the ground level and the altitude map related to the region of analysis, and identifying, by using the height map, the at least one of the plurality of non-infrastructure entities along the infrastructure entity position of the corresponding infrastructure entity that includes a height that exceeds the height threshold.

4. The condition detection using image processing system according to claim 1, wherein the risks analyzer is to use the at least one mask related to the vehicle path and the at least one of the plurality of non-infrastructure entities along the infrastructure entity position of the corresponding infrastructure entity, the height map, the alignment data for the at least one mask, and the infrastructure rule to detect the risk related to the infrastructure entity by determining a height for which the at least one of the plurality of non-infrastructure entities along the infrastructure entity position of the corresponding infrastructure entity is to fall over the infrastructure entity, wherein the risk includes the at least one of the plurality of non-infrastructure entities along the infrastructure entity position of the corresponding infrastructure entity falling over the infrastructure entity, and generating a group by grouping the at least one of the plurality of non-infrastructure entities along the infrastructure entity position of the corresponding infrastructure entity for which an actual height exceeds the height for which the at least one of the plurality of non-infrastructure entities along the infrastructure entity position of the corresponding infrastructure entity is to fall over the infrastructure entity.

5. The condition detection using image processing system according to claim 1, wherein the risks analyzer is to use the at least one mask related to the vehicle path and the at least one of the plurality of non-infrastructure entities along the infrastructure entity position of the corresponding infrastructure entity, the height map, the alignment data for the at least one mask, and the infrastructure rule to detect the risk related to the infrastructure entity by determining a height for which the at least one of the plurality of non-infrastructure entities along the infrastructure entity position of the corresponding infrastructure entity is to fall to a specified region, wherein the risk includes the at least one of the plurality of non-infrastructure entities along the infrastructure entity position of the corresponding infrastructure entity falling to the specified region.

6. The condition detection using image processing system according to claim 1, wherein the risks analyzer is to use the at least one mask related to the vehicle path and the at least one of the plurality of non-infrastructure entities along the infrastructure entity position of the corresponding infrastructure entity, the height map, the alignment data for the at least one mask, and the infrastructure rule to detect the risk related to the infrastructure entity by generating a group by grouping the at least one of the plurality of non-infrastructure entities along the infrastructure entity position of the corresponding infrastructure entity for which the likelihood is more than a predetermined threshold, and determining the at least one of the plurality of non-infrastructure entities along the infrastructure entity position of the corresponding infrastructure entity in the group that includes a maximum likelihood of the risk of falling over the infrastructure entity.

7. The condition detection using image processing system according to claim 6, wherein the risks analyzer is to further determine a distance between the at least one of the plurality of non-infrastructure entities along the infrastructure entity position of the corresponding infrastructure entity in the group that includes the maximum likelihood of the risk of falling over the infrastructure entity.

8. The condition detection using image processing system according to claim 1, wherein the risks analyzer is to use the at least one mask related to the vehicle path and the at least one of the plurality of non-infrastructure entities along the infrastructure entity position of the corresponding infrastructure entity, the height map, the alignment data for the at least one mask, historical masks, historical height maps, and the infrastructure rule to detect the risk related to the infrastructure entity by
   comparing the risk of the at least one of the plurality of non-infrastructure entities along the infrastructure entity position of the corresponding infrastructure entity of falling over the infrastructure entity to historical risks of falling over the infrastructure entity,
   determining whether a maximum likelihood of the at least one of the plurality of non-infrastructure entities along the infrastructure entity position of the corresponding infrastructure entity of falling over the infrastructure entity exceeds a historical risk of the historical risks of falling over the infrastructure entity, and
   in response to a determination that the maximum likelihood of the at least one of the plurality of non-infrastructure entities along the infrastructure entity position of the corresponding infrastructure entity of falling over the infrastructure entity exceeds the historical risk of the historical risks of falling over the infrastructure entity, generating an alert related to the risk of the at least one of the plurality of non-infrastructure entities along the infrastructure entity position of the corresponding infrastructure entity of falling over the infrastructure entity.

9. The condition detection using image processing system according to claim 1, further comprising:
   a risks consolidator, executed by the at least one hardware processor, to use risk masks derived from the at least one mask related to the vehicle path and the at least one of the plurality of non-infrastructure entities along the infrastructure entity position of the corresponding infrastructure entity, and the alignment data for the at least one mask, to
      merge, based on an analysis of the risk masks and regions alignment data, risks of a same type located in different regions to a same location.

10. The condition detection using image processing system according to claim 1, wherein infrastructure entities including the infrastructure entity include a tower and a power line for a power system.

11. The condition detection using image processing system according to claim 1, wherein the vehicle is an unmanned aerial vehicle (UAV), and the movement log includes a flight log.

12. The condition detection using image processing system according to claim 1, further comprising:
   a user-interface, executed by the at least one hardware processor, to generate a display of the risk from a plurality of available risks and the at least one of the plurality of non-infrastructure entities along the infrastructure entity position of the corresponding infrastructure entity.

13. A method for condition detection using image processing, the method comprising:
   receiving, by a risks analyzer that is executed by at least one hardware processor, at least one mask generated from images and telemetry data captured by a vehicle, an altitude map, and alignment data for the at least one mask, wherein
      the images are related to movement of the vehicle along a vehicle path and at least one of a plurality of non-infrastructure entities along an infrastructure entity position of a corresponding infrastructure entity, and
      the telemetry data includes movement log information related to the movement of the vehicle along the vehicle path;
   identifying, by the risks analyzer, a boundary related to the infrastructure entity position;
   determining, by the risks analyzer, whether the boundary is violated by the at least one of the plurality of non-infrastructure entities along the infrastructure entity position of the corresponding infrastructure entity;
   in response to a determination that the boundary is violated by the at least one of the plurality of non-infrastructure entities along the infrastructure entity position of the corresponding infrastructure entity, determining, by the risks analyzer, a risk related to the at least one of the plurality of non-infrastructure entities along the infrastructure entity position of the corresponding infrastructure entity; and
   using, by a risks consolidator that is executed by the at least one hardware processor, risk masks derived from the at least one mask related to the at least one of the plurality of non-infrastructure entities along the infrastructure entity position of the corresponding infrastructure entity to
      merge, based on an analysis of the risk masks and regions alignment data, risks of a same type located in different regions to a same location.

14. The method for condition detection using image processing according to claim 13, wherein determining, by the risks analyzer, the risk related to the at least one of the plurality of non-infrastructure entities along the infrastructure entity position of the corresponding infrastructure entity, further comprises:
   determining, by the risks analyzer, a height for which the at least one of the plurality of non-infrastructure entities along the infrastructure entity position of the corresponding infrastructure entity is to fall over the infrastructure entity, wherein the risk includes the at least one of the plurality of non-infrastructure entities along the infrastructure entity position of the corresponding infrastructure entity falling over the infrastructure entity; and
   generating, by the risks analyzer, a group by grouping the at least one of the plurality of non-infrastructure entities along the infrastructure entity position of the corresponding infrastructure entity for which an actual height exceeds the height for which the at least one of the plurality of non-infrastructure entities along the infrastructure entity position of the corresponding infrastructure entity is to fall over the infrastructure entity.

15. The method for condition detection using image processing according to claim 13, wherein determining, by the risks analyzer, the risk related to the at least one of the plurality of non-infrastructure entities along the infrastructure entity position of the corresponding infrastructure entity, further comprises:
   determining, by the risks analyzer, a likelihood of the at least one of the plurality of non-infrastructure entities along the infrastructure entity position of the corresponding infrastructure entity of falling to a specified region, wherein the risk includes the at least one of the plurality of non-infrastructure entities along the infrastructure entity position of the corresponding infrastructure entity falling to the specified region.

16. The method for condition detection using image processing according to claim 13, wherein determining, by the risks analyzer, the risk related to the at least one of the plurality of non-infrastructure entities along the infrastructure entity position of the corresponding infrastructure entity, further comprises:
   comparing, by the risks analyzer, a risk of the at least one of the plurality of non-infrastructure entities along the infrastructure entity position of the corresponding infrastructure entity of falling over the infrastructure entity to historical risks of falling over the infrastructure entity;
   determining, by the risks analyzer, whether a maximum likelihood of the at least one of the plurality of non-infrastructure entities along the infrastructure entity position of the corresponding infrastructure entity of falling over the infrastructure entity exceeds a historical risk of the historical risks of falling over the infrastructure entity; and
   in response to a determination that the maximum likelihood of the at least one of the plurality of non-infrastructure entities along the infrastructure entity position of the corresponding infrastructure entity of falling over the infrastructure entity exceeds the historical risk of the historical risks of falling over the infrastructure entity, generating, by the risks analyzer, an alert related to the risk of the at least one of the plurality of non-infrastructure entities along the infrastructure entity position of the corresponding infrastructure entity of falling over the infrastructure entity.

17. A non-transitory computer readable medium having stored thereon machine readable instructions for condition detection using image processing, the machine readable instructions when executed cause at least one hardware processor to:
   receive, by a risks analyzer that is executed by at least one hardware processor, at least one mask generated from images and telemetry data captured by a vehicle, wherein the images are related to movement of the vehicle along a vehicle path and at least one of a plurality of non-infrastructure entities along an infrastructure entity position of a corresponding infrastructure entity;
   identify, by the risks analyzer, an angular threshold related to the infrastructure entity;
   determine, by the risks analyzer, whether the angular threshold is met or exceeded by the at least one of the plurality of non-infrastructure entities along the infrastructure entity position of the corresponding infrastructure entity by identifying the at least one of the plurality of non-infrastructure entities along the infrastructure entity position of the corresponding infrastructure entity that is fully or partially located within the angular threshold for contacting the infrastructure entity; and
   in response to a determination that the angular threshold is met or exceeded by the at least one of the plurality of non-infrastructure entities along the infrastructure entity position of the corresponding infrastructure entity, determine, by the risks analyzer, a risk related to the at least one of the plurality of non-infrastructure entities along the infrastructure entity position of the corresponding infrastructure entity.

18. The non-transitory computer readable medium according to claim 17, wherein the machine readable instructions to determine, by the risks analyzer, the risk related to the at least one of the plurality of non-infrastructure entities along the infrastructure entity position of the corresponding infrastructure entity, further comprise machine readable instructions that when executed cause the least one hardware processor to:
   determine, by the risks analyzer, a height for which the at least one of the plurality of non-infrastructure entities along the infrastructure entity position of the corresponding infrastructure entity is to fall over the infrastructure entity, wherein the risk includes the at least one of the plurality of non-infrastructure entities along the infrastructure entity position of the corresponding infrastructure entity falling over the infrastructure entity; and
   generate, by the risks analyzer, a group by grouping the at least one of the plurality of non-infrastructure entities along the infrastructure entity position of the corresponding infrastructure entity for which an actual height exceeds the height for which the at least one of the plurality of non-infrastructure entities along the infrastructure entity position of the corresponding infrastructure entity is to fall over the infrastructure entity.

19. The non-transitory computer readable medium according to claim 17, wherein the machine readable instructions to determine, by the risks analyzer, the risk related to the at least one of the plurality of non-infrastructure entities along the infrastructure entity position of the corresponding infrastructure entity, further comprise machine readable instructions that when executed cause the least one hardware processor to:
   determine, by the risks analyzer, a likelihood of the at least one of the plurality of non-infrastructure entities along the infrastructure entity position of the corresponding infrastructure entity of falling to a specified region, wherein the risk includes the at least one of the plurality of non-infrastructure entities along the infrastructure entity position of the corresponding infrastructure entity falling to the specified region.

20. The non-transitory computer readable medium according to claim 17, wherein the machine readable instructions to determine, by the risks analyzer, the risk related to the at least one of the plurality of non-infrastructure entities along the infrastructure entity position of the corresponding infrastructure entity, further comprise machine readable instructions that when executed cause the least one hardware processor to:
   compare, by the risks analyzer, a risk of the at least one of the plurality of non-infrastructure entities along the infrastructure entity position of the corresponding infrastructure entity of falling over the infrastructure entity to historical risks of falling over the infrastructure entity;
   determine, by the risks analyzer, whether a maximum likelihood of the at least one of the plurality of non-infrastructure entities along the infrastructure entity position of the corresponding infrastructure entity of falling over the infrastructure entity exceeds a historical risk of the historical risks of falling over the infrastructure entity; and
   in response to a determination that the maximum likelihood of the at least one of the plurality of non-infrastructure entities along the infrastructure entity position of the corresponding infrastructure entity of falling over the infrastructure entity exceeds the historical risk of the historical risks of falling over the infrastructure entity, generate, by the risks analyzer, an alert related to the risk of the at least one of the plurality of non-infrastructure entities along the infrastructure entity position of the corresponding infrastructure entity of falling over the infrastructure entity.

* * * * *